(12) United States Patent
Sandman et al.

(10) Patent No.: US 8,322,758 B2
(45) Date of Patent: Dec. 4, 2012

(54) TUBE COUPLING AND RELATED METHODS

(75) Inventors: Joseph P. Sandman, Morrow, OH (US); Michael N. Sandman, Morrow, OH (US)

(73) Assignee: Langdon Incorporated, Cincinnati, OH (US)

( * ) Notice: Subject to any disclaimer, the term of this patent is extended or adjusted under 35 U.S.C. 154(b) by 428 days.

(21) Appl. No.: 12/604,503

(22) Filed: Oct. 23, 2009

(65) Prior Publication Data

US 2010/0038902 A1 Feb. 18, 2010

Related U.S. Application Data

(63) Continuation of application No. 12/270,172, filed on Nov. 13, 2008, and a continuation-in-part of application No. 12/167,310, filed on Jul. 3, 2008, now abandoned, and a continuation-in-part of application No. 11/862,472, filed on Sep. 27, 2007, now Pat. No. 7,997,112.

(51) Int. Cl.
*F16L 23/00* (2006.01)

(52) U.S. Cl. .......................... 285/424; 285/365; 285/420

(58) Field of Classification Search .................. 285/424, 285/365, 366, 367, 420, 110
See application file for complete search history.

(56) References Cited

U.S. PATENT DOCUMENTS

| | | | |
|---|---|---|---|
| 1,298,656 A | 4/1919 | Brinkman | |
| 1,304,939 A | 5/1919 | Brinkman | |
| 1,826,133 A * | 10/1931 | Hatch | 52/772 |
| 2,183,757 A * | 12/1939 | Van Der Graaf | 285/365 |
| 2,473,102 A * | 6/1949 | Krooss | 285/420 |
| 2,491,700 A * | 12/1949 | Zwerling | 285/424 |
| 2,611,413 A | 9/1952 | Molinare | |
| 2,840,136 A | 6/1958 | Bellarts | |
| 2,878,041 A * | 3/1959 | Hobbs | 285/367 |
| 3,001,805 A * | 9/1961 | Jones et al. | 285/424 |
| 3,415,543 A * | 12/1968 | Keating | 285/424 |
| 3,439,406 A * | 4/1969 | Wallin | 285/424 |
| 3,451,696 A * | 6/1969 | Hagelin et al. | 285/424 |
| 3,630,549 A * | 12/1971 | Grimm | 285/424 |
| 3,762,204 A | 10/1973 | Socier | |
| 3,765,351 A | 10/1973 | Kubacki et al. | |
| 3,791,681 A * | 2/1974 | Moldow | 285/424 |
| 4,008,592 A | 2/1977 | Hall et al. | |

(Continued)

OTHER PUBLICATIONS

Nordfab, Technical Manual 2011, Quick-Fit Clamp-Together Ducting, The World's Fastest Ducting, Thomasville, NC, www.nordfab.com, ID: 030111 (44 pages).

(Continued)

*Primary Examiner* — David E Bochna
(74) *Attorney, Agent, or Firm* — Wood, Herron & Evans, LLP

(57) ABSTRACT

A juncture assembly is provided between first and second ends of respective first and second tubes. The assembly includes a first flange that is located at the first end and a second flange that is located at the second end, with the second flange being in confronting relationship with the first flange. The first and second flanges define a gap between them. A gasket member contacts the first and second flanges and is configured to prevent flow of fluids through the gap. A clamp member of the assembly secures the gasket member to the first and second flanges with the clamp member including a channel for receiving the first and second flanges and first and second restriction elements that extend into the channel for positioning the first and second flanges within the channel.

24 Claims, 40 Drawing Sheets

U.S. PATENT DOCUMENTS

| | | | |
|---|---|---|---|
| 4,070,886 A | | 1/1978 | Nyssen |
| 4,185,858 A | * | 1/1980 | Peash .......................... 285/367 |
| 4,369,911 A | | 1/1983 | Blumenberg |
| 4,461,499 A | * | 7/1984 | Hunter et al. ................. 285/424 |
| 4,469,354 A | * | 9/1984 | Caldwell ....................... 285/367 |
| 4,590,785 A | | 5/1986 | Morris |
| 4,715,581 A | | 12/1987 | Myers |
| 4,840,026 A | * | 6/1989 | Nash et al. .................... 285/367 |
| 4,995,648 A | * | 2/1991 | Jackson ......................... 285/424 |
| 5,014,424 A | | 5/1991 | Takasugi |
| 5,275,449 A | * | 1/1994 | Hunter .......................... 285/424 |
| 5,355,722 A | | 10/1994 | Socier |
| 5,983,496 A | | 11/1999 | Hermanson |
| 6,267,417 B1 | * | 7/2001 | Fan ............................... 285/420 |
| 6,550,823 B1 | * | 4/2003 | Siegwart ....................... 285/424 |
| 6,935,153 B2 | | 8/2005 | Frigo et al. |
| 7,073,826 B2 | * | 7/2006 | Meinig .......................... 285/365 |
| 7,121,129 B2 | | 10/2006 | Binggeli |
| 7,124,611 B2 | | 10/2006 | Baulier et al. |
| 7,661,730 B2 | * | 2/2010 | Meinig .......................... 285/365 |
| 2002/0100304 A1 | | 8/2002 | Price et al. |
| 2002/0153725 A1 | | 10/2002 | Myers |

OTHER PUBLICATIONS

Nordfab, New and Improved Quick-Seal Clamps [on-line], Nordfab Ducting 2011 [retrieved on Mar. 17, 2011], retrieved from the Internet: <URL: http://www.nordfab.com/index.cfm/do/pages.view/id/124/page/Quick-Seal-Clamps>, 1 page.

Kirk & Blum, Duct and Components for Industrial Air Systems, CECO Environmental, Greensboro, NC, Jul. 2010, 45 pages.

Sheet Metal Connectors, Inc., E-Z Flange Jr. Spiral Pipe System [online], 2011, [retrieved on Mar. 17, 2011], retrieved from the Internet: <URL: http://www.smcduct.com/e-z-flange-spiral-pipe-system/e-z-flange-jr-spiral-pipe-system>, 2 pages.

Spinfinity, Inc., AccuFlange TM [online], 2006 [retrieved on Mar. 19, 2009], retrieved from the Internet; <URL: http://www.spinfinity.net/accuflange/index.html>, 2 pages.

Eastern Sheet Metal, L.L.C., Spiral Pipe & Fittings, Connectors [online], Jun. 2005 [retrieved on Mar. 19, 2009], retrieved from the Internet: <URL: http://www.easternsheetmetal.com/mainpages/productguides/productguides/Connectors.pdf>, 4 pages.

* cited by examiner

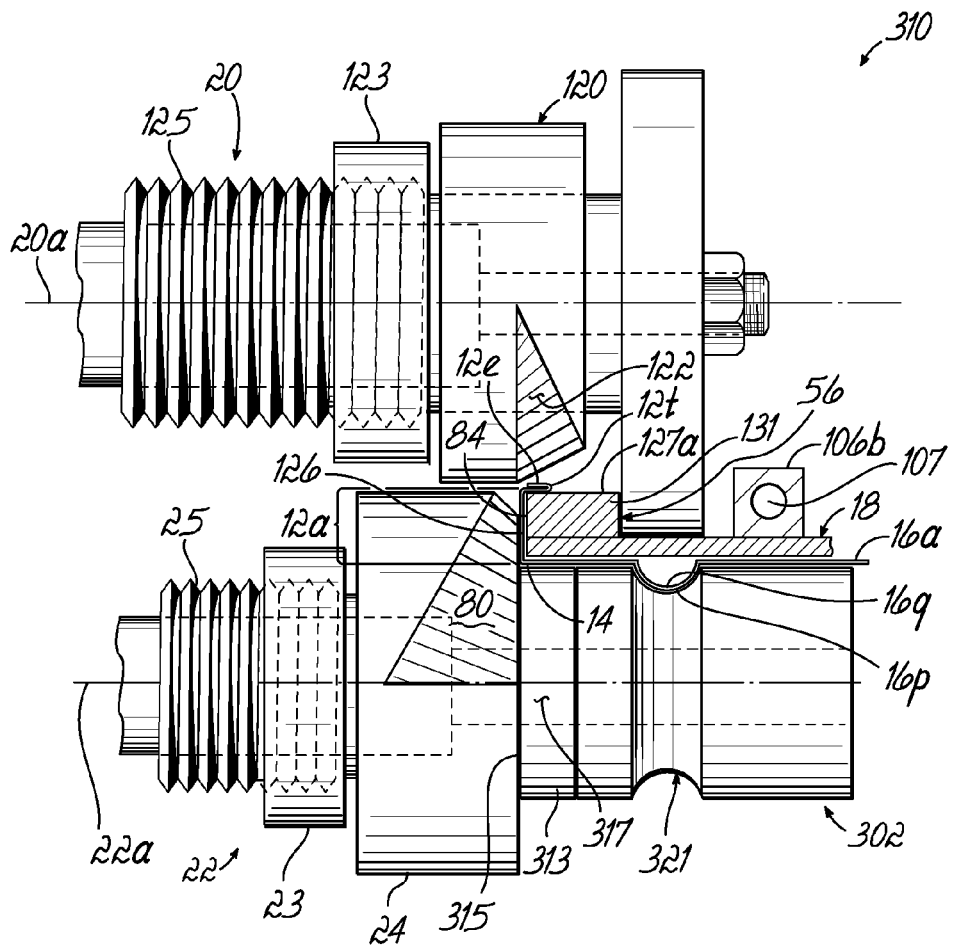
FIG. 13
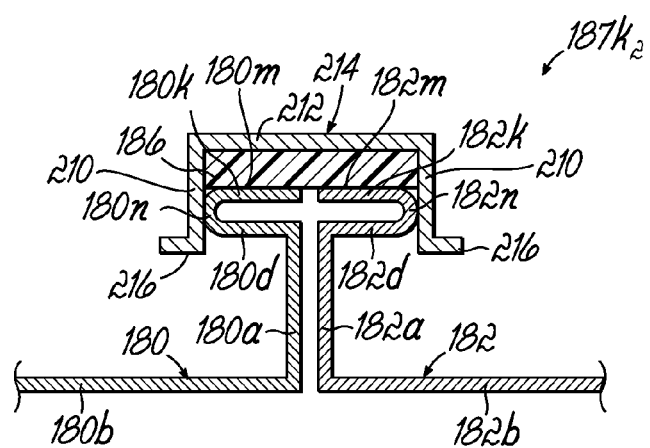
FIG. 12-K$_2$

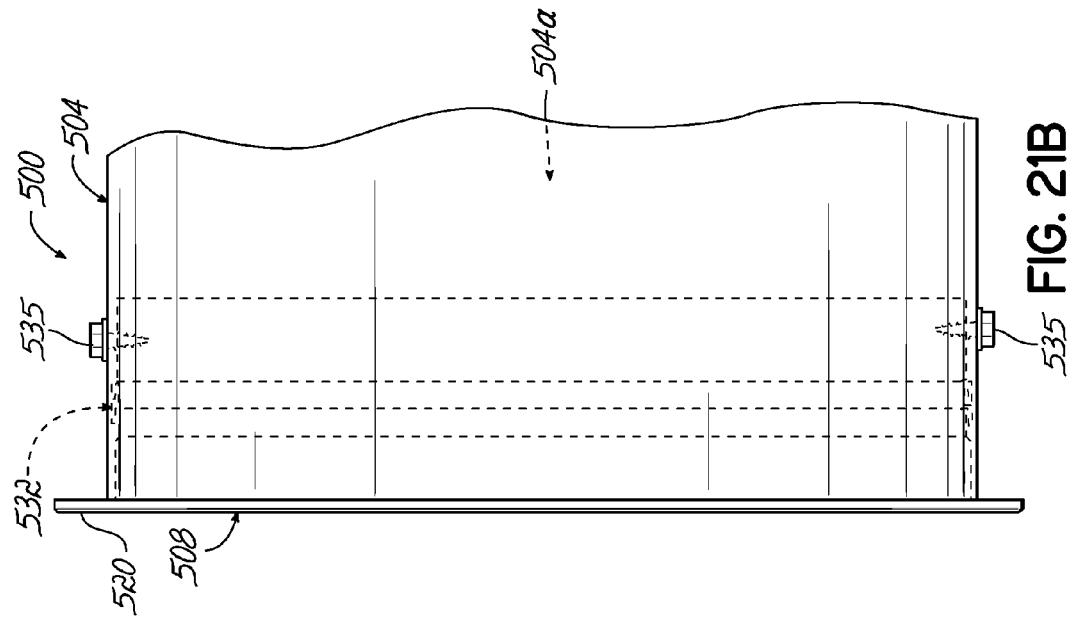
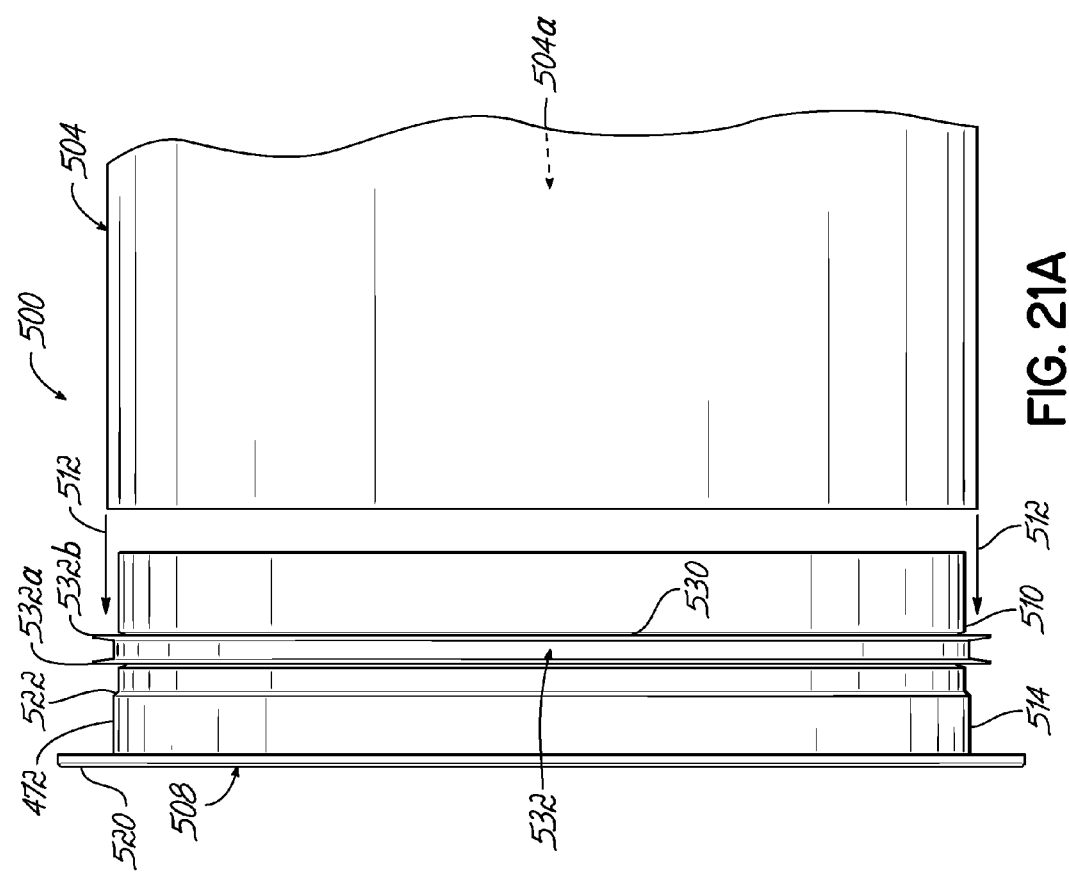

TUBE COUPLING AND RELATED METHODS

This application is a continuation-in-part of U.S. Ser. No. 12/270,172, filed Nov. 13, 2008, which is a continuation-in-part of U.S. Ser. No. 12/167,310, filed Jul. 3, 2008, which is a continuation-in-part of U.S. Ser. No. 11/862,472, filed Sep. 27, 2007, each disclosure of which is hereby expressly incorporated herein by reference in its entirety.

FIELD OF THE INVENTION

The present invention relates generally to devices for forming tubes and, more particularly, to devices for forming a flange at an end of a metal tube such as ductwork.

BACKGROUND OF THE INVENTION

Metal tubes are used in different applications. For example, hollow tubes are used in heating, ventilation, air conditioning or dust collection systems, such that processed air (e.g., heated, cooled, or return air) or particle-carrying air streams can be directed through an interior of the ducts to different locations within a building.

For example, ventilation ductwork may include two or more ducts connected in series, such as to facilitate distribution and/or directing of air. To this end, the ducts may be manufactured to include a flange at one or both of the ends of the ducts. Confronting flanges from two ducts are then fastened together to secure a connection between the ducts. Conventional methods and apparatus used to connect two ducts may include, for example, securing the two flanges with a clamp. Conventional clamps, however, may permit the flow of fluid between the interior of the ducts and the surrounding environment, which may not be desirable.

Consequently, there is a need for an apparatus and related methods for coupling the ends of a pair of tubes so as to form a leak-free connection and which address the drawbacks of conventional apparatus and methods.

SUMMARY OF THE INVENTION

The various embodiments of this invention offer advantages over known systems and processes for forming a flange at an end of a tube.

In one embodiment, a juncture assembly is provided between first and second ends of respective first and second tubes. The assembly includes a first flange that is located at the first end and a second flange that is located at the second end, with the second flange being in confronting relationship with the first flange. The first and second flanges define a gap between them. A gasket member contacts the first and second flanges and is configured to prevent flow of fluids through the gap. A clamp member of the assembly secures the gasket member to the first and second flanges, with the clamp member including a channel for receiving the first and second flanges and first and second restriction elements that extend into the channel for positioning the first and second flanges within the channel.

The first and second restriction elements may be disposed on opposite sides of the channel across a cross-sectional axis of the clamp member. The first and second restriction elements may be disposed in a confronting relationship with one another across the cross-sectional axis of the clamp member. Alternatively, the clamp member may extend along a generally close-ended path, with the first and second restriction elements being spaced from one another along the generally close-ended path of the clamp member. In a specific embodiment, the close-ended path is generally circular, with the first and second restriction elements being spaced from one another along the circumference of the clamp member. The gasket member may be disposed in the gap between the first and second flanges, with the first and second restriction elements contacting the first and second flanges to retain the gasket member in place.

The gasket member may be supported by respective first and second ends of the first and second flanges and may be deformable about the first and second ends of the first and second flanges, and the first and second restriction elements may be positioned to prevent movement of the gasket member relative to the channel. The gasket member may have one of a generally round or a generally half-round cross-sectional profile when the gasket member is in its undeformed condition. At least one of the first or second restriction elements may include a protruding deformed portion of the clamp member. The protruding deformed portion may have a generally rounded cross-sectional profile or a generally quadrilateral cross-sectional profile. At least one of the first or second restriction elements may protrude from a notch that is formed in the clamp member. At least one of the first or second restriction elements may include a plate that is coupled to the clamp member and which has a bent portion that extends into the channel.

In another embodiment, a clamp member is provided for securing respective ends of first and second tubes to one another. The clamp member includes a channel for receiving, respectively, first and second flanges of the first and second tubes therein. First and second restriction elements of the clamp member extend into the channel and are configured to position the first and second flanges within the channel. In a specific embodiment, the first and second restriction elements are positioned to center the first and second flanges within that channel. Additionally or alternatively, the first and second restriction elements may be positioned to contact the first and second flanges to thereby retain a gasket member in a gap defined between the first and second flanges.

In yet another embodiment, a method is provided for building a duct system. The method includes placing a gasket member in physical contact with first and second flanges of first and second tubes, respectively, to thereby restrict the flow of fluids between the first and second tubes and the surroundings. The method includes positioning the first and second flanges within a channel of a clamp member, with the clamp member including a restriction element that extends into the channel for positioning the first and second flanges within the channel.

In another embodiment, a method is provided for making a clamp member for securing respective ends of first and second tubes. The method includes obtaining a clamp member having a channel therein for receiving first and second flanges respectively of the first and second tubes. The method includes deforming the clamp member at first and second locations to define first and second deformed portions of the clamp member, with the deformed portions extending into the channel. The method may include moving at least one of a pair of dies relative to one another to deform the clamp member respectively at the first and second locations.

BRIEF DESCRIPTION OF THE DRAWINGS

The objectives and features of the invention will become more readily apparent from the following detailed description taken in conjunction with the accompanying drawings in which:

FIG. 13 is an elevational, partial cross-sectional view of a flange-forming system according to another embodiment of the present invention;

FIGS. 21A-21B are partially broken away elevational views of a different embodiment of an air duct assembly;

DETAILED DESCRIPTION OF THE INVENTION

Figure 1:
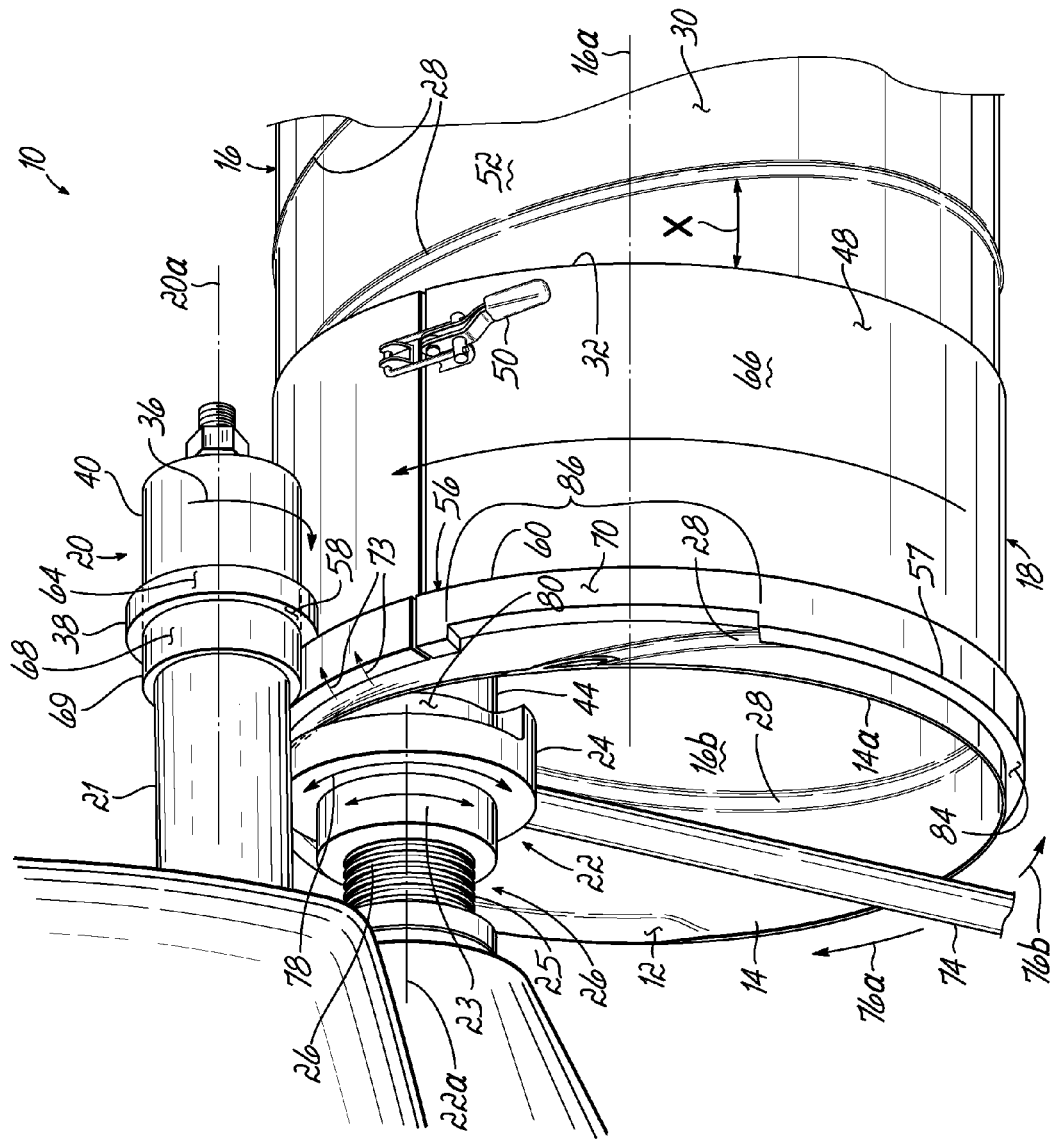
FIG. 1 is a perspective view of a flange-forming system according to one embodiment of the present invention.
Figure 2:
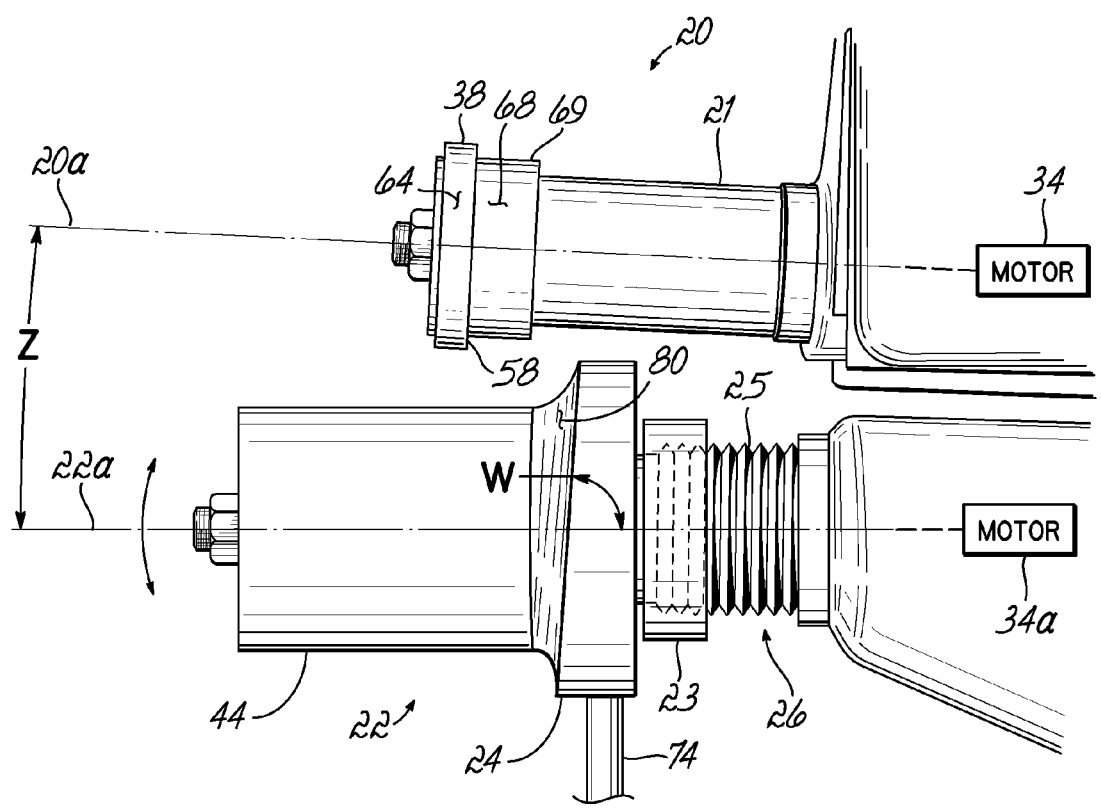
FIG. 2 is a perspective view of a pair of rollers and a rotatable cam of the system of FIG. 1.

With reference to the figures and, more particularly to FIGS. 1-2, a system 10 is shown for forming a flange 12 at a longitudinal end 14 of a tube 16, such as a ventilation duct, by way of example, formed from a sheet of metal. The system 10 includes a collar 18 that engages the tube 16, as well as a pair of rollers 20, 22, and a rotatable cam 24. The collar 18 cooperates with the rollers 20, 22, as explained in further detail below, to enable formation of the flange 12. More specifically, the rollers 20, 22 and collar 18 cooperate with one another to restrict and rotate the tube 16 such the rotatable cam 24 can engage end 14 to thereby form the flange 12.

In the exemplary embodiment of FIG. 1, the tube 16 is shown having a helically-directed seam 28 extending on a wall 30 of the tube 16, although other types of tubes are contemplated. In the view depicted in FIG. 1, and when the tube is engaged by the collar 18, the seam 28 defines an acute angle "X" with a first end 32 of the collar 18.

As described above, the system 10 includes a pair of rollers 20, 22. The first roller 20 extends along and rotates about an axis 20a. The first roller may further be driven by a motor 34 operatively coupled to first roller 20 in ways well known to those of ordinary skill in the art. Motor 34, which is diagrammatically depicted in FIG. 2, accordingly rotates the first roller 20, for example, in the direction indicated by arrow 36. The first roller 20 moreover includes a shaft 21 and a lip 38 radially protruding from a main body portion 40 of the lip 38. As explained in further detail below, the lip 38 enables engagement of first roller 20 with collar 18.

With further reference to FIGS. 1-2, the second roller 22 includes a shaft 26 and is rotatable about an axis 22a defined by second roller 22. Accordingly, the second roller 22 may be rotatable, for example, clockwise, counter-clockwise, or both, as indicated by double-headed arrow 23. In one aspect of this embodiment, the second roller 22 is rotatable at least in a direction opposite that of first roller 20, as explained below, to enable rotation of the collar 18 and tube 16.

When the first and second rollers 20, 22 engage the collar 18, the first and second rollers 20, 22 may further be approximately parallel to one another, as shown in FIG. 1. More specifically, orientation of the axes 20a, 22a may define a relatively small angle between them when rollers 20, 22 engage the collar 18. In order to receive the collar 18 between rollers 20, 22, the first roller 20 is movable to an open position relative to the second roller 22 (FIG. 2) where an acute angle "Z" is defined between axes 20a, 22a. Alternatively, the second roller 22 may be movable relative to a fixed first roller 20 or both rollers 20, 22 may be movable relative to one another.

With further reference to FIGS. 1-2, when the first and second rollers 20, 22 engage the collar 18, the second roller 22 supports the tube 16 being held by the collar 18. More particularly, a distal portion 44 of the shaft 26 contacts an interior surface 16b of the tube 16, thereby supporting at least a portion of the tube 16 thereon.

The configurations of the first roller 20 and collar 18 facilitate locking engagement and restriction tube 16 from relative movement, to enable forming of the flange 12. More particularly, the collar 18 lockingly engages the tube 16 to at least restrict rotational and axial movement (i.e., respectively about and along axis 16a) of the tube 16 relative to the collar 18. To this end, collar 18 substantially conforms to an outer surface 52 of the tube 16 and further includes a clamp 50 that lockingly engages the collar 18 against outer surface 52. More specifically, collar 18 includes a channel 46 (FIG. 4) disposed on an inner surface of a wall 48 defining the collar 18. The channel 46 has a helically-directed shape substantially matching the shape of the seam 28 of the tube 16. Accordingly, the channel 46 receives at least a portion of the seam 28 therein to restrict movement of the tube 16 relative to the collar 18. Similarly, the clamp 50 frictionally engages the wall 48 of the collar 18 with the outer surface 52 to further restrict movement of the tube 16 relative to collar 18.

Moreover, first roller 20 restricts the collar 18 from movement relative to the first roller 20, thereby further restricting tube 16 from relative movement. More particularly, a lip 56 positioned at a second end 57 of the collar 18 cooperates with the lip 38 of the first roller 20 to restrict movement of the collar 18. Specifically, as shown in FIG. 1, an end face 58 of the first roller 20 engages an oppositely oriented end face 60 of the lip 56, such that relative movement of the collar 18 and tube 16 is restricted as described above. Accordingly, the axial position (along axis 16a) of end 14 of tube 16 is relatively fixed, which facilitates forming of the flange 12 as explained in more detail below.

FIGS. 1-4 best describe the operation of system 10 in the formation of the flange 12. The system 10 rotates the tube 16 generally about the axis 16a thereof to facilitate forming of the flange by engagement of rotatable cam 24. Rotation of tube 16 is facilitated by engagement of first roller 20 with confronting portions of the collar 18. More particularly, lip 38 of first roller 20 includes a circumferentially directed surface 64 that contacts and frictionally engages an outer surface 66 of the wall 48 of collar 18. Rotation of first roller 20 rotates the collar 18, which, in turn, rotates tube 16. Moreover, a circumferentially directed surface 68 of a proximal portion 69 of first roller 20 may cooperate with surface 64 to further facilitate rotation of collar 18. More particularly, the surface 68 may contact and frictionally engage, for example, a rim surface 70 of the lip 56 to facilitate such rotation.

Second roller 22 cooperates with first roller 20 to rotate collar 18 and tube 16. As described above, the distal portion 44 of second roller 22 supports the tube 16 by contacting the interior surface 16b of the tube 16. When the first and second rollers 20, 22 engage the collar 18 (as shown in FIG. 1), the lip 38 and distal portion 44 cooperatively nip the collar 18 and tube 16. The resulting nipped engagement facilitates rotation of the tube 16 and collar 18 as rollers 20, 22 rotate. To this end, the second roller 22 may be suitably motorized, via motor 34a (FIG. 2), such that rotation of the distal portion 44 effectively matches (though in opposite directions) a surface speed of the lip 38. Alternatively, the second roller 22 may be made to follow the surface speed of the interior surface 16b, which is induced by motorized rotation of first roller 20.

With further reference to FIGS. 1-4, rotation of the tube 16 enables formation of the flange 12 by engagement of the rotatable cam 24 with end 14 of tube 16. More particularly, such engagement bends the end 14 in a direction generally indicated by arrows 73 (FIG. 1). Rotatable cam 24 is disposed about and cooperates with the second roller 22 and is rotatable, about axis 22a, relative to second roller 22. Moreover, the position of rotatable cam 24 along axis 22a is determined by the position of an adjustment collar 23 threadably engaged with a threaded portion 25 of second roller 22. In this regard, adjustment collar 23 prevents movement of the rotatable cam 24 away from the tube 16. Rotation of rotatable cam 24 advances a cam surface 80 of rotatable cam 24 against end 14 to form flange 12. To this end, cam surface 80 extends circumferentially about axis 22a of second roller 22 and is oriented on a plane defining an acute angle "W" relative to axis 22a. The rotatable cam is explained in further detail below, with reference to FIGS. 8-11.

In one aspect of the embodiment depicted in FIGS. 1-4, the length (i.e., radial dimension) of the resulting flange 12 is determined by a position of an end face 84, at second end 57 of collar 18, relative to an end edge 14a of tube 16. More specifically, the end face 84 provides a limiting surface against which cam surface 80 is restricted from advancing along axis 22a when rotatable cam 24 is rotated. Accordingly, a user may be able to control the length of the resulting flange 12 by choosing the length of tube 16 that extends beyond the second end 57.

Rotation of rotatable cam 24 is facilitated by suitably chosen components. In this exemplary embodiment, and by way of example, rotatable cam 24 is manually rotatable by suitable motion of a handle 74 coupled to rotatable cam 24. Handle 74 is in the form of a generally elongate element oriented transverse to the axis 22a. Accordingly, rotation of handle 74 in the general directions of arrows 76a, 76b cause a corresponding rotation of rotatable cam 24 in the general direction of arrow 78, which engages tube 16 to form flange 12. Those of ordinary skill in the art will readily appreciate other types of handles or the like that can be alternatively used to rotate rotatable cam 24. Moreover, rotatable cam 24 may alternatively be motorized or otherwise have other non-manual types of actuation.

Figure 3:
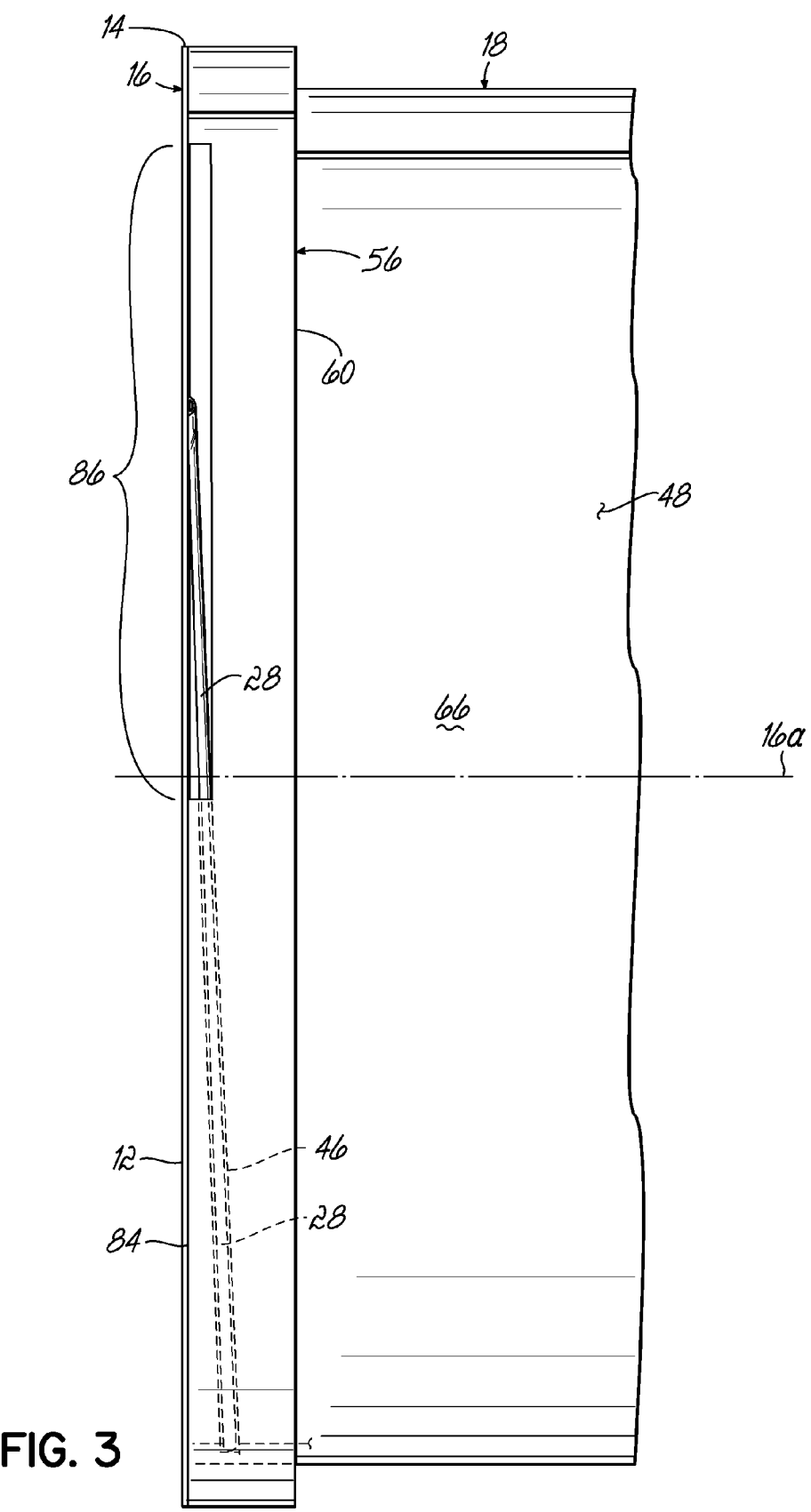
FIG. 3 is an elevational view of a groove of a collar of the system of FIG. 1, showing a portion of a seam of a tube therein.

With particular reference to FIG. 3, collar 18 is configured to facilitate formation of flange 12 in the presence of seam 28. More particularly, lip 56 of collar 18 includes a groove 86 that extends along a portion of the lip 56. The groove 86 is configured to receive the seam 28 as the flange 12 is being formed. As the end 14 of tube 16 is bent in the direction indicated by arrows 73 (FIG. 1), the portion of seam 28 that protrudes beyond the end face 84 is received within the groove 86. To this end, the length (the circumferential dimension along lip 56) and depth (i.e., the direction along axis 16a) of the groove 86 are suitably chosen to accommodate the portion of seam 28 extending beyond end face 84.

Figure 4:
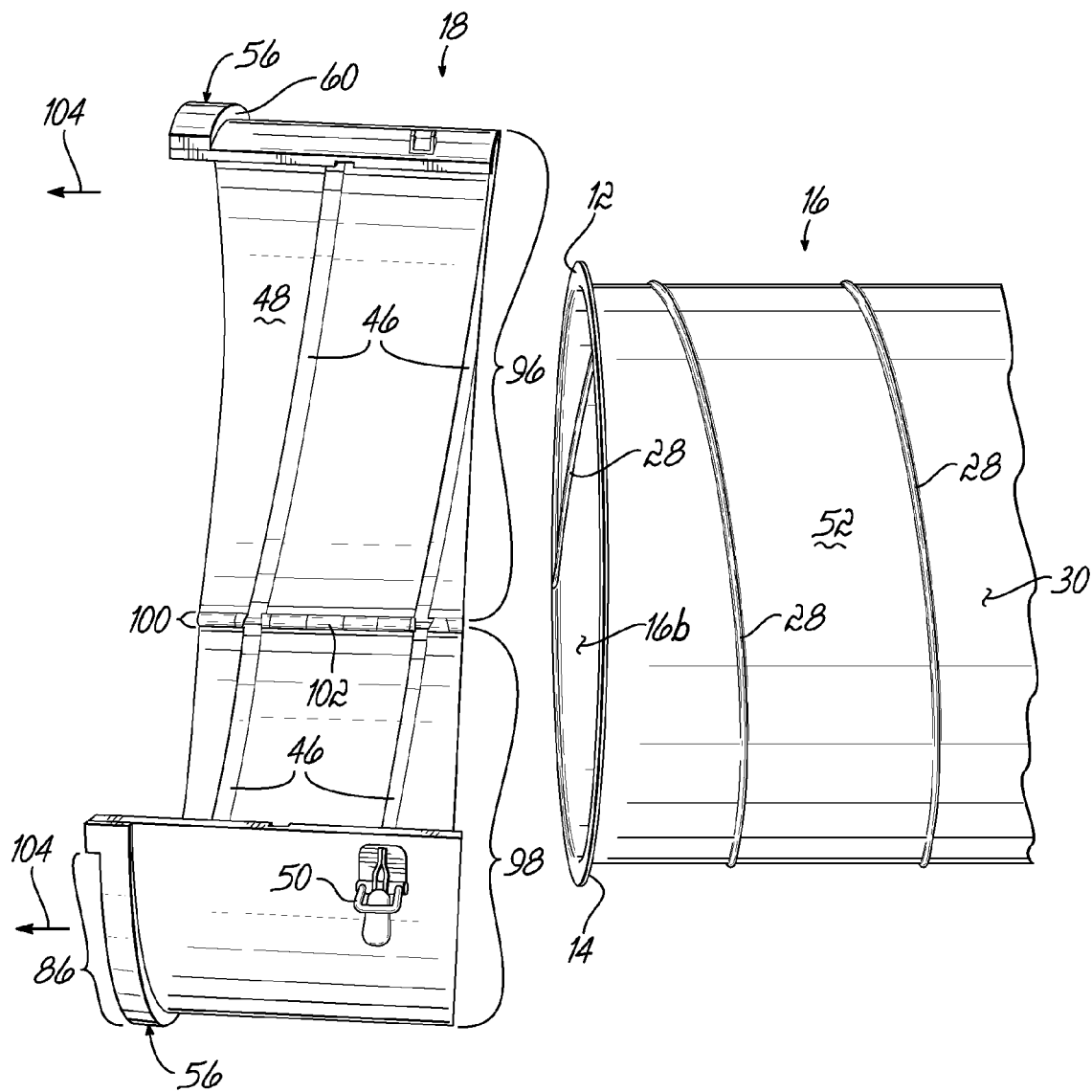
FIG. 4 is a perspective view of a collar and tube of FIG. 1, illustrating the collar disassembled from the tube.

With particular reference to FIG. 4, the collar 18 may be disengaged and separated from tube 16 (in the general direction of arrow 104) after formation of the flange 12. To this end, the collar 18 includes two shells 96, 98 coupled along a juncture 100 that facilitate engagement and disengagement of collar 18 from tube 16. Coupling between shells 96, 98 is suitably chosen and may include conventional hinges 102 of types well known in the art. Engagement and disengagement are further facilitated by clamp 50, which selectively moves the two shells 96, 98 into locking engagement with outer surface 52 of the tube 16.

Those of ordinary skill in the art will readily appreciate that other types of collars may be used in combination with the other components of the system 10 herein described. For example, and without limitation, an alternative collar may have more than two shells or even include a single shell, so long as the collar includes features to restrict movement of the tube 16 relative to the collar. Similarly, a collar may take on a different form. For example, and with reference to the embodiments of FIGS. 4A-4B, a pair of alternative embodiments of a flange-forming system include collars 99a, 99b that are different from the collar 18 of the embodiment of FIGS. 1-4. For ease of understanding, like reference numerals in FIGS. 4A-4B refer to like features in FIGS. 1-4. Collars 99a, 99b are similar in structure and function to lip 56 of collar 18, and include, in that regard, a groove 86a, having a function similar to that of groove 86 of FIG. 1. In this regard, the description of lip portion 56 may be referred-to for an understanding of collars 99a, 99b as well.

Figure 4A:
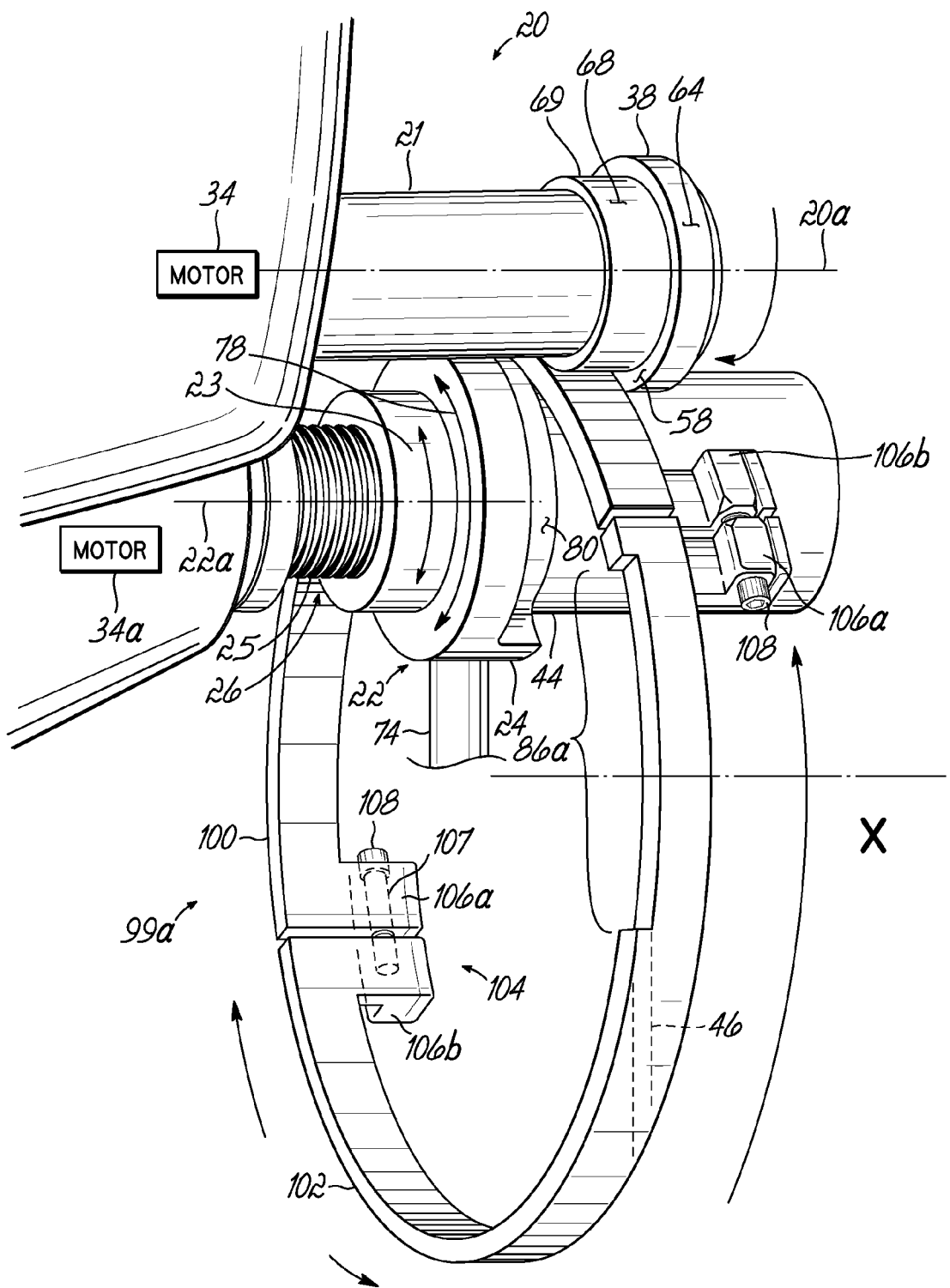
FIG. 4A is a perspective view of a flange-forming system including an alternative collar in accordance with another embodiment of the present invention.
Figure 4B:
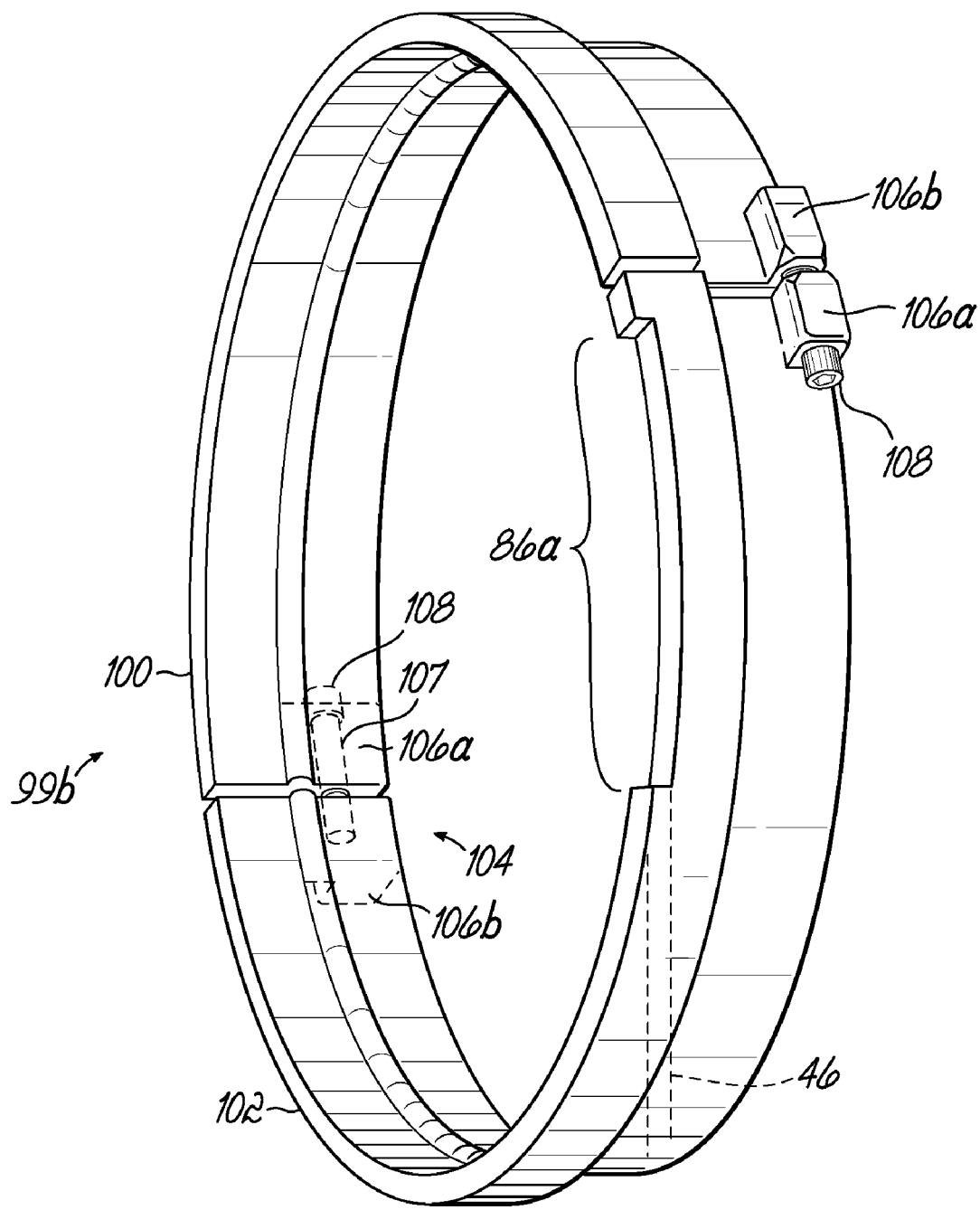
FIG. 4B is a perspective view of a flange-forming system including an alternative collar in accordance with yet another embodiment of the present invention.

With continued reference to FIGS. 4A-4B, each of collars 99a, 99b includes two lip halves 100, 102 that are joined via diametrically opposed clamps 104. Each clamp 104 includes a pair of opposed blocks 106a, 106b extending from lip halves 100, 102. A threaded bore 107 extends through each block 106a, 106b and is configured to receive a bolt 108 or similar connector to thereby secure each pair of confronting blocks 106a, 106b against one another. When the two lip halves 100, 102 are wrapped about an end portion of a tube 16 (not shown) and the two pairs of blocks 106a, 106b are fastened via bolts 108, the collar 99a, 99b lockingly engages the tube 16.

Figure 5:
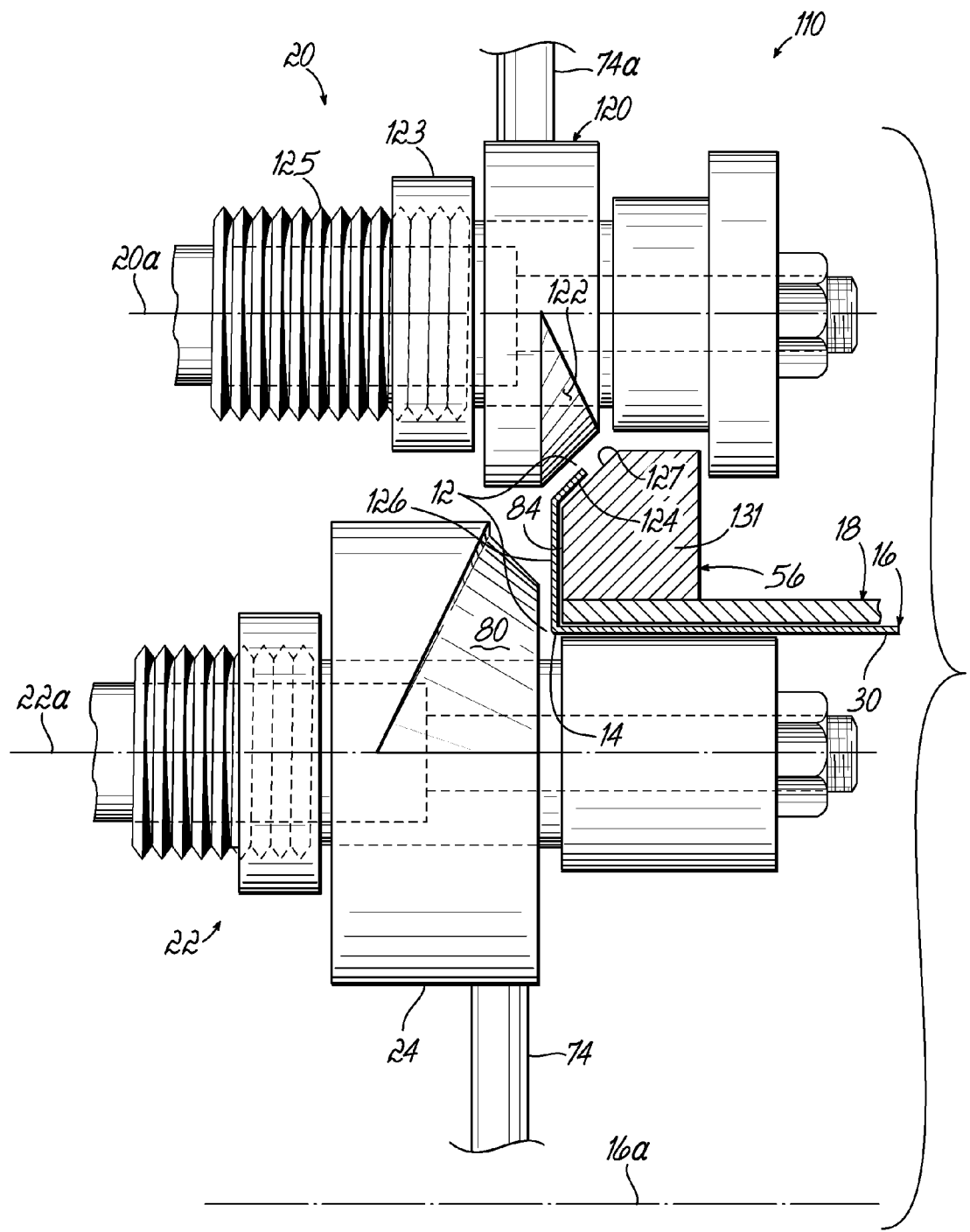
FIG. 5 is an elevational, partial cross-sectional view of a flange-forming system according to another embodiment of the present invention.

With reference to FIG. 5, in which like reference numerals refer to like features of FIGS. 1-4, another embodiment of a system 110 is configured for forming a flange 12 at an end 14 of a tube 16. System 110 includes components similar in most respects to those of system 10 (FIGS. 1-4), the description of which may be referred to for an understanding of system 110 as well.

System 110 includes a second rotatable cam 120 disposed about first roller 20 and rotatable about axis 20a of the first roller 20. The position of second rotatable cam 120 along axis 22a is determined by the position of a second adjustment collar 123 threadably engaged with a threaded portion 125 of first roller 20. In this regard, second adjustment collar 123 prevents movement of the second rotatable cam 120 away from the tube 16. Moreover, rotation of second rotatable cam 120 is facilitated by a handle 74a projecting therefrom and similar to handle 74. Second rotatable cam 120 includes a second cam surface 122 oriented such that rotation of second rotatable cam 120 advances second cam surface 122 in a direction along axis 20a. More particularly, the second cam surface 122 can be advanced against a distal portion 124 at end 14 of tube 16 to further define the flange 12. In this regard, advancement of second cam surface 122 bends the distal portion 124 in a direction transverse to a first leg or portion 126 of the flange 12. Advancement of the second cam surface 122 to bend distal portion 124 may be limited by a second limiting surface 127 of collar 18.

With further reference to FIG. 5, and by way of example, the second limiting surface 127 may be connected to or be integrally formed with lip 56 of collar 18 (as shown in FIG. 5). Moreover, second limiting surface 127 is oriented such that it defines an acute angle relative to end face 84, thereby permitting formation of a flange 12 having a distal leg or portion 124 oriented at an acute angle relative to first leg or portion 126 of the flange 12. Alternatively, the second limiting surface 127 may be coupled to or be integrally formed with another suitably chosen structure and/or be oriented at any angle relative to end face 84. Alternatively also, system 110 may include no second limiting surface 127 at all.

Figure 6:
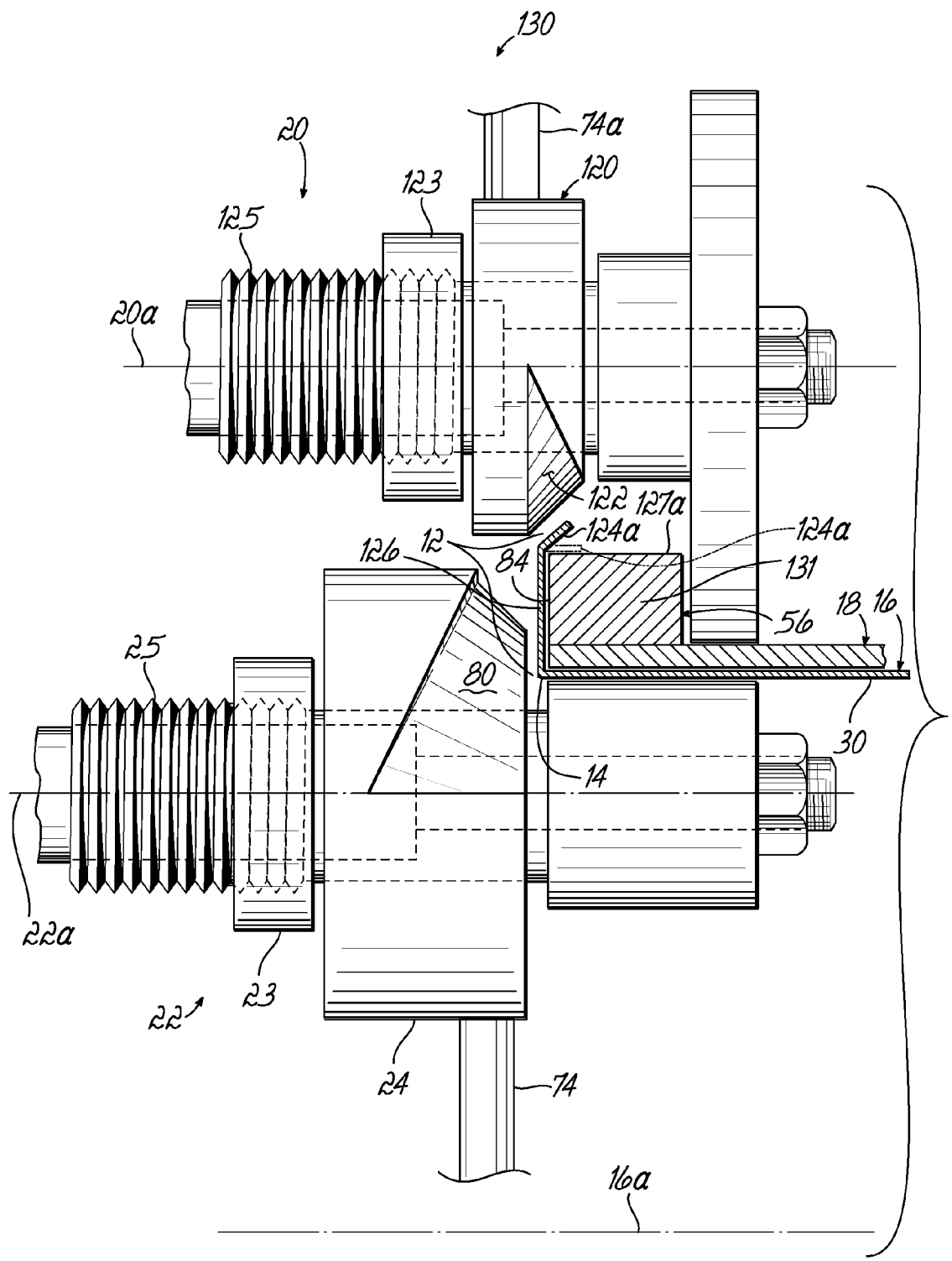
FIG. 6 is an elevational, partial cross-sectional view of a flange-forming system according to another embodiment of the present invention.

With reference to FIG. 6, in which like reference numerals refer to like features of the embodiment of FIG. 5, another embodiment of a flange-forming system 130 is illustrated, that is similar in most respects to system 110 of FIG. 5. In this regard, the description of system 110 may be referred to for an understanding of system 130 as well. System 130 includes a flange support structure 131 defining a second limiting surface 127a that is oriented generally orthogonal to end face 84 of lip 56. Accordingly, system 130 is capable of forming a flange 12 having first and second legs or portions 126, 124a that are generally orthogonal to one another. In this regard, FIG. 6 shows a first position of second leg portion 124a in solid lines and a subsequent position in phantom.

Figure 7:
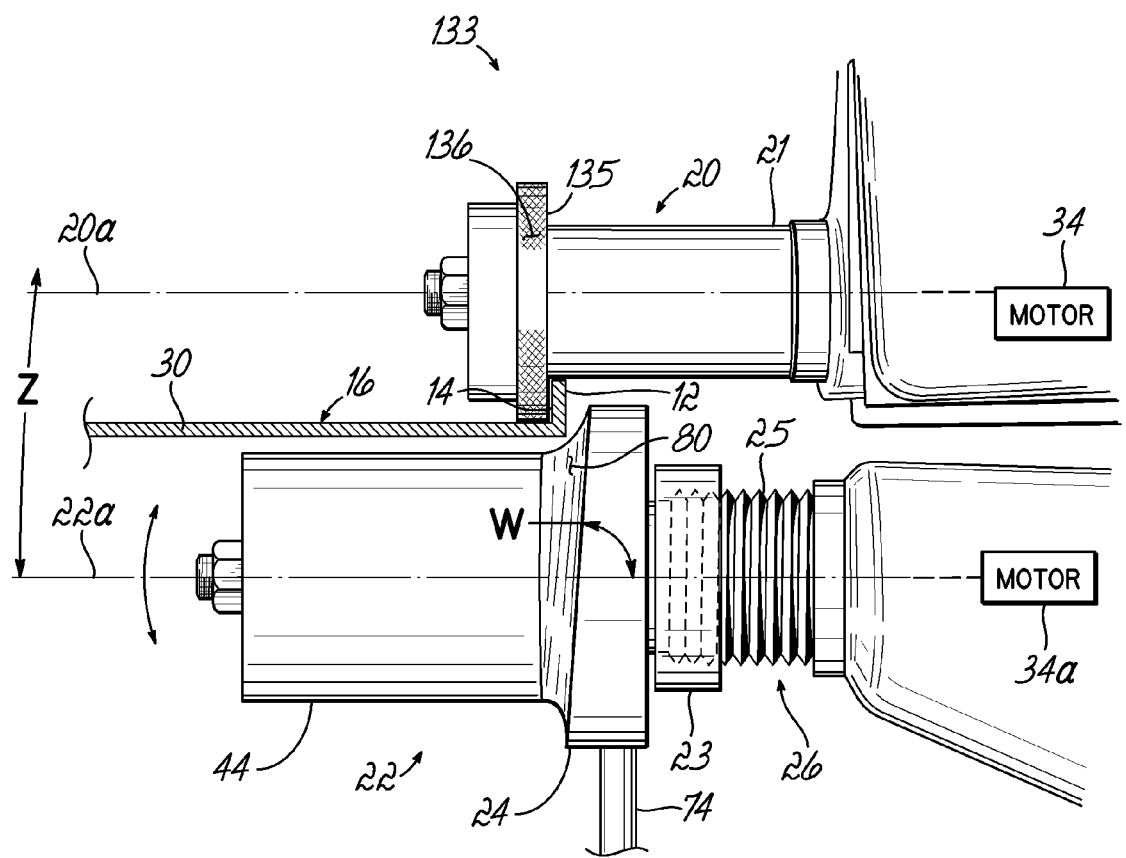
FIG. 7 is an elevational view of a flange-forming system according to another embodiment of the present invention.

With reference to FIG. 7, in which like reference numerals refer to like features in FIGS. 1-2, another embodiment of a flange-forming system 133 is illustrated, that is similar in most respects to system 10 of FIGS. 1-2, but unlike system 10, includes no collar at all. A wheel 135 is disposed on a first roller 20 of the system and is configured to frictionally drive the tube 16. In this regard, the wheel 135 may have a textured surface 136, as shown, or a surface otherwise configured to frictionally rotate tube 16 by engaging wall 30 thereof. Other aspects of the flange-forming process enabled by system 133 are similar to those of system 10 (FIGS. 1-2), the description of which may be referred to for an understanding of the process enabled by system 133 as well.

Figure 8:
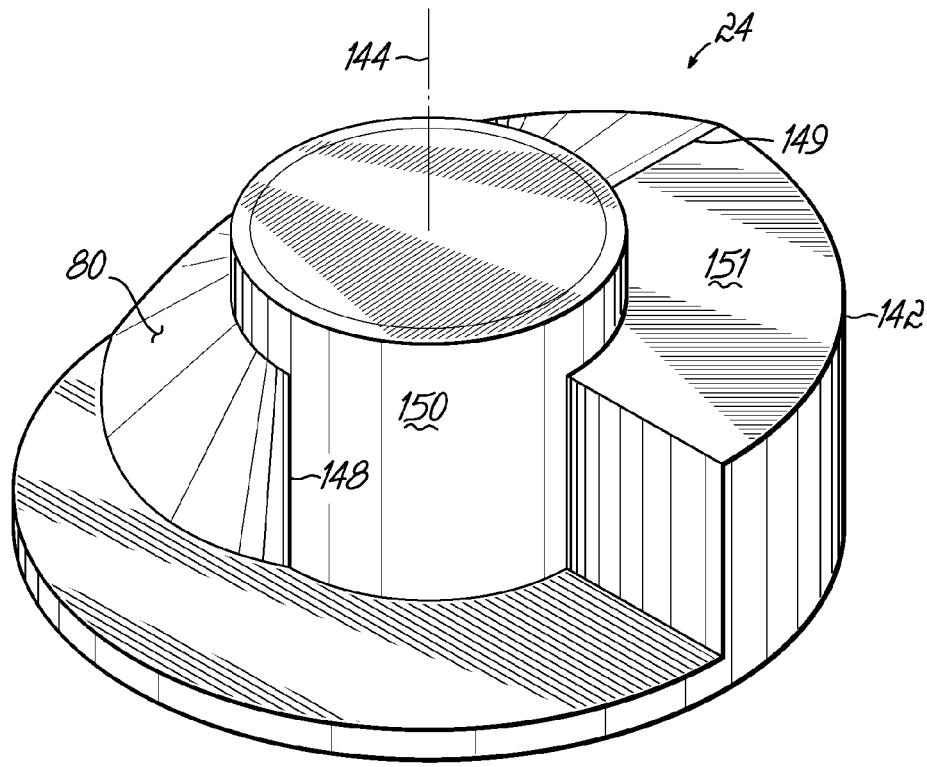
FIG. 8 is a perspective view of a rotatable cam in accordance with the principles of the present invention.
Figure 9:
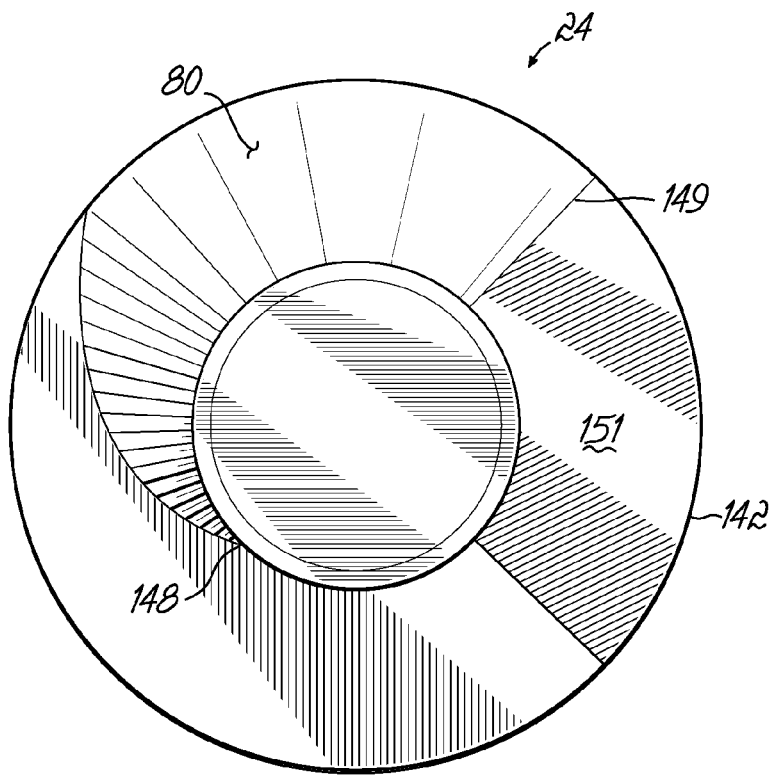
FIG. 9 is a planar view of the rotatable cam of FIG. 8.

With reference to FIGS. 8-11, exemplary configurations of each of the first and second rotatable cams 24, 120 are respectively depicted. With particular reference to FIGS. 8-9, the rotatable cam 24 is a generally cylindrical structure defining an outer circumferential perimeter 142 disposed about a main axis 144. In this regard, the rotatable cam 24 rotates about main axis 144 to cause the cam surface 80 thereof to advance against a tube, as explained above in regards to the embodiment of FIGS. 1-2. Cam surface 80 extends circumferentially about and axially along main axis 144, between a first edge 148 and a second edge 149.

First edge 148 lies generally on a cylindrical surface 150 of the rotatable cam 24, being therefore generally parallel to the main axis 144. By contrast, second edge 149 is oriented substantially orthogonal to the main axis 144, lying on a distal surface 151 of the rotatable cam 24, and is therefore oriented orthogonal to the first edge 148. The cam surface 80, accordingly, gradually and smoothly transitions from a first orientation at first edge 148, to a second orientation at second edge 149. This gradual transition provides for smooth, outward bending of the end portion 14 of tube 16, to thereby form the flange 12 (in the embodiment of FIGS. 1-2) or at least a first leg or portion 126 thereof (in the embodiment of FIG. 5). Cam surface 80 further extends radially to the outer perimeter 142 of the rotatable cam 24. In operation, the radial extension of cam surface 80 defines the length of the flange 12 (FIG. 1) or at least that of the first leg or portion 126 thereof (FIG. 5).

Figure 10:
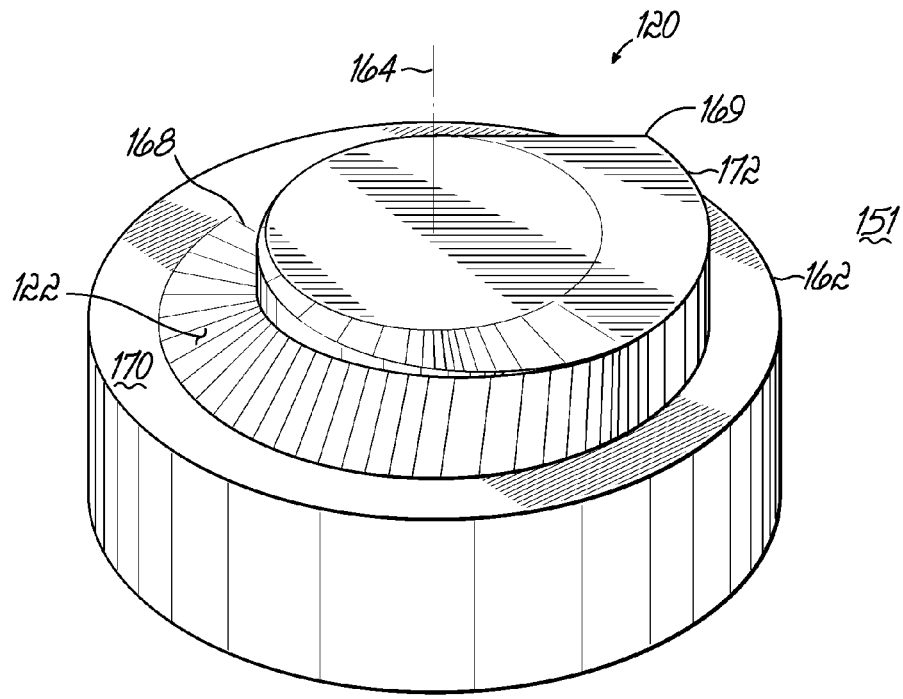
FIG. 10 is a perspective view of a rotatable cam in accordance with the principles of the present invention.
Figure 11:
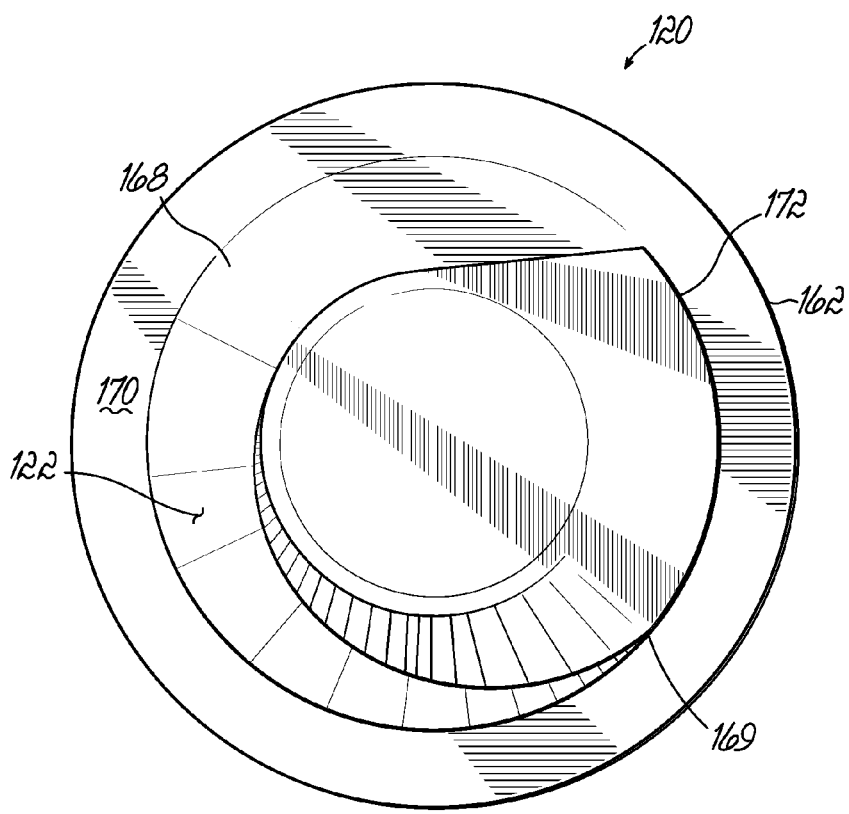
FIG. 11 is a planar view of the rotatable cam of FIG. 10.

With particular reference to FIGS. 10-11, the rotatable cam 120 is a generally cylindrical structure defining an outer circumferential perimeter 162 disposed about a main axis 164. In this regard, the rotatable cam 120 rotates about main axis 164 to cause cam surface 122 thereof to advance against a tube 16, as explained above in regards to the embodiment of FIGS. 5-6. Cam surface 122 extends circumferentially about and axially along main axis 164, between a first edge 168 and a second edge 169.

First edge 168 lies generally on a plane defined by a base surface 170 of the rotatable cam 120, being therefore generally orthogonal to the main axis 164. By contrast, second edge 169 is oriented generally substantially parallel to the main axis 164 and therefore orthogonal to the first edge 168. The cam surface 122, accordingly, gradually and smoothly transitions from a first orientation at first edge 168, to a second orientation at second edge 169. This gradual transition provides for smooth, outward bending of distal portion 124 of tube 14, to thereby form the second leg or portion 124, 124a of flange 12 (FIGS. 5-6). Cam surface 122 further extends radially to define an inner perimeter 172, lying within the area defined by outer perimeter 162. In this regard, therefore, cam surface 122 does not extend to the outer perimeter 162. In operation, the radial extension of cam surface 122 defines the length of the second leg or portion 124, 124a of formed flange 12.

Figure 12A:
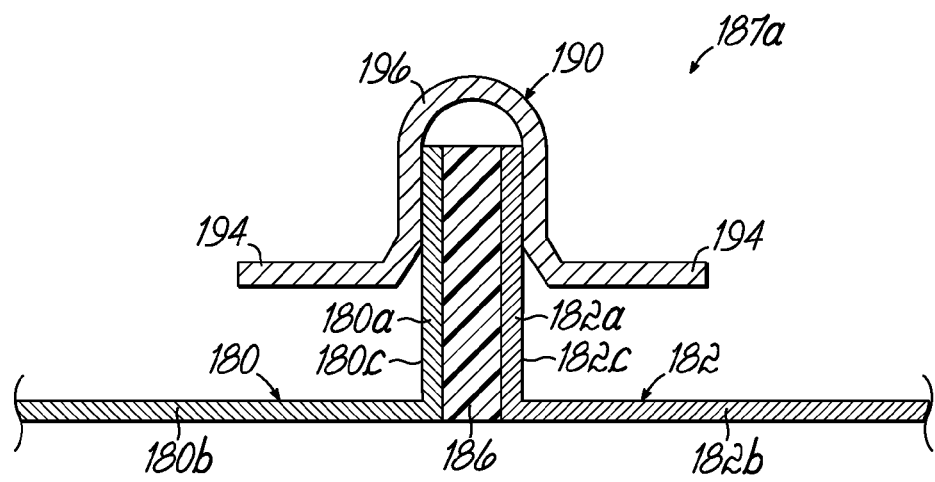
FIGS. 12A-12Q are cross-sectional views of different embodiments of juncture assemblies according to the principles of the present invention.
Figure 12B:
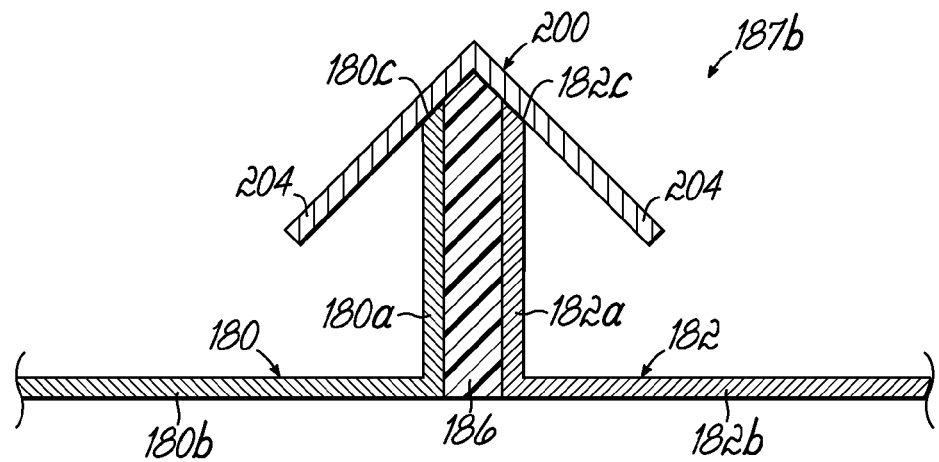
Figure 12C:
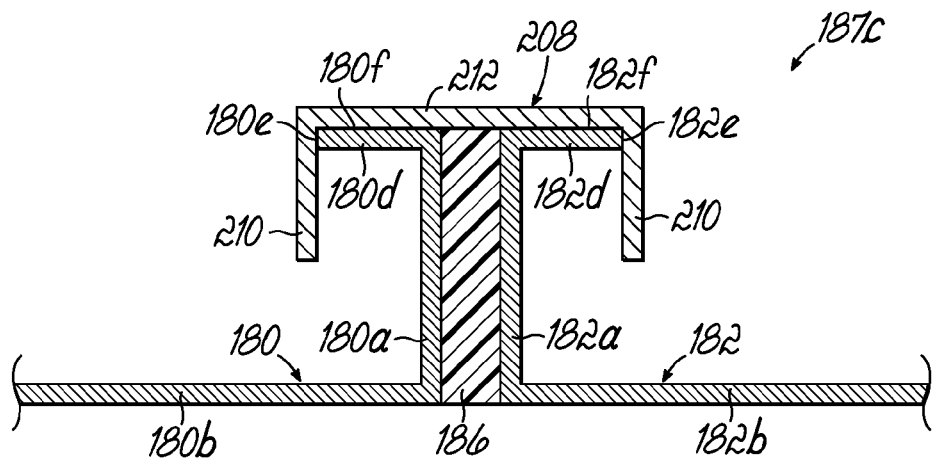
Figure 12D:
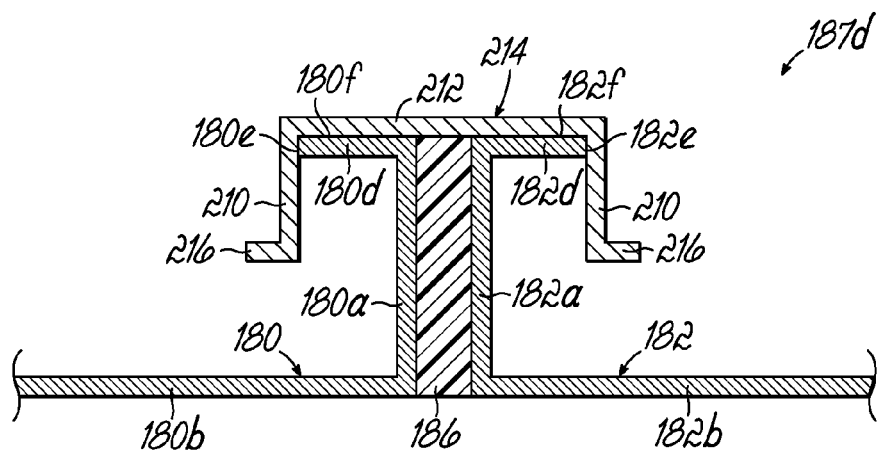
Figure 12E:
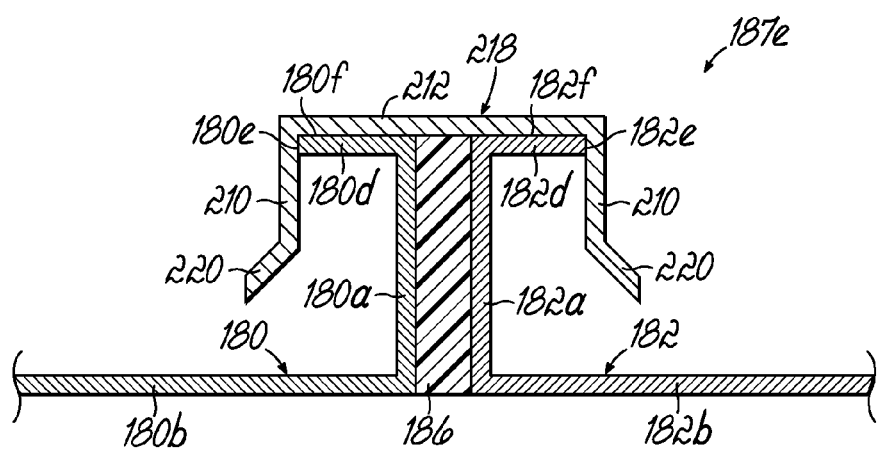
Figure 12F:
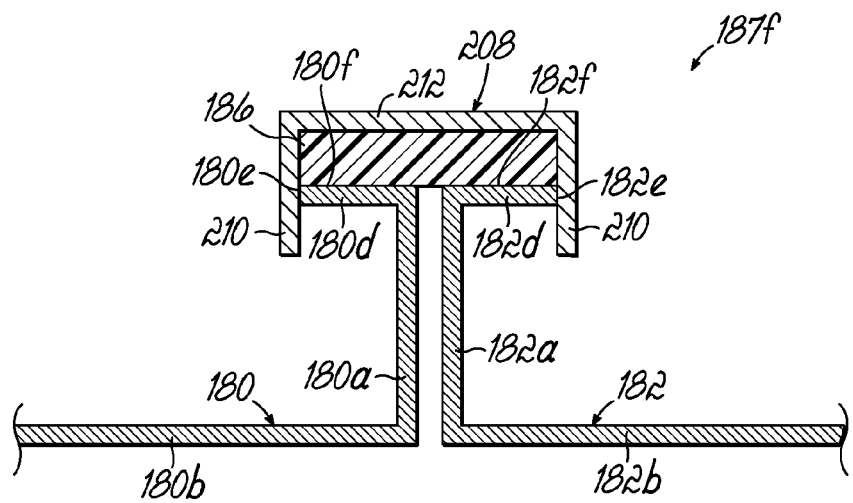
Figure 12G:
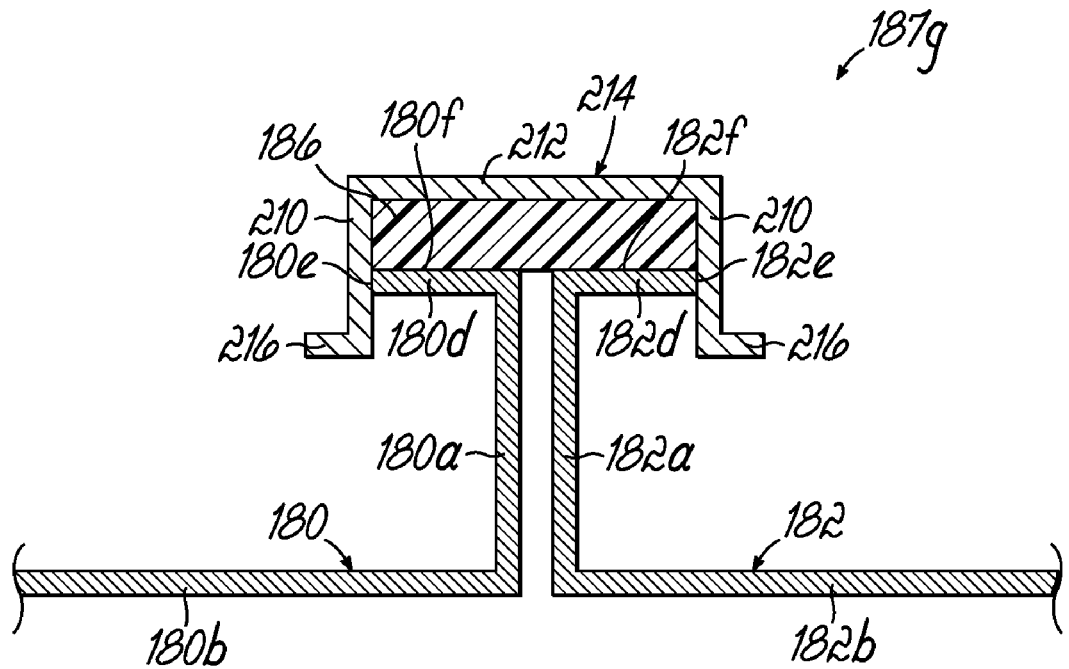
Figure 12H:
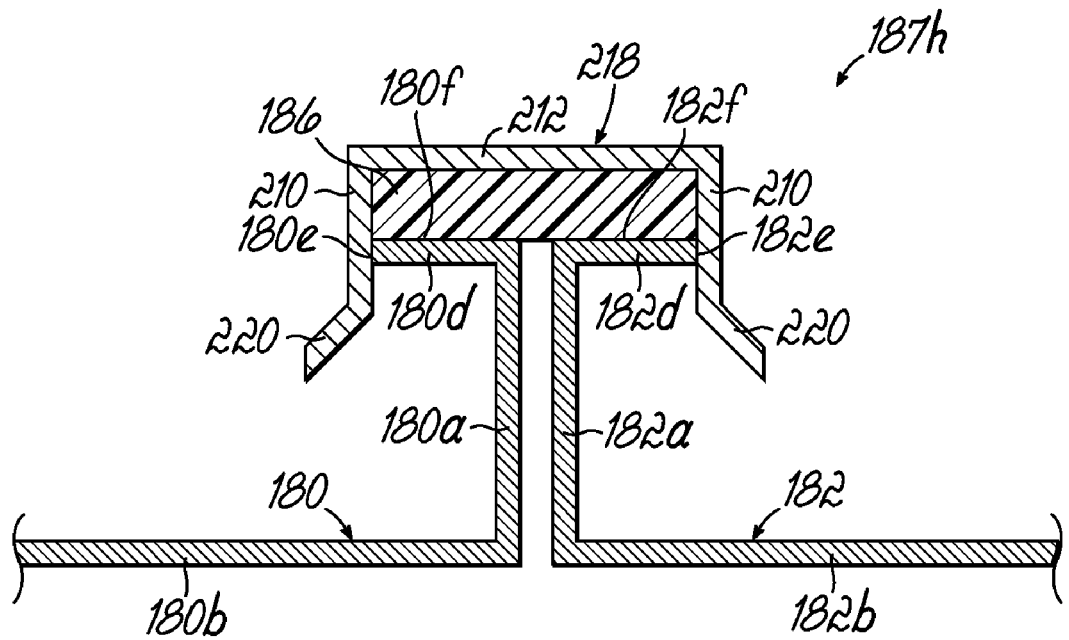
Figure 12I:
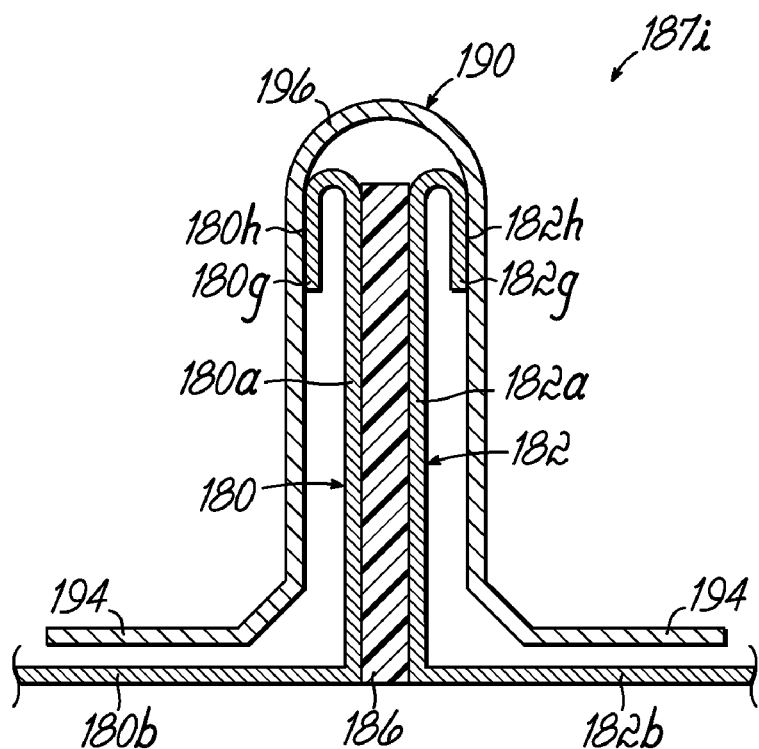
Figure 12J:
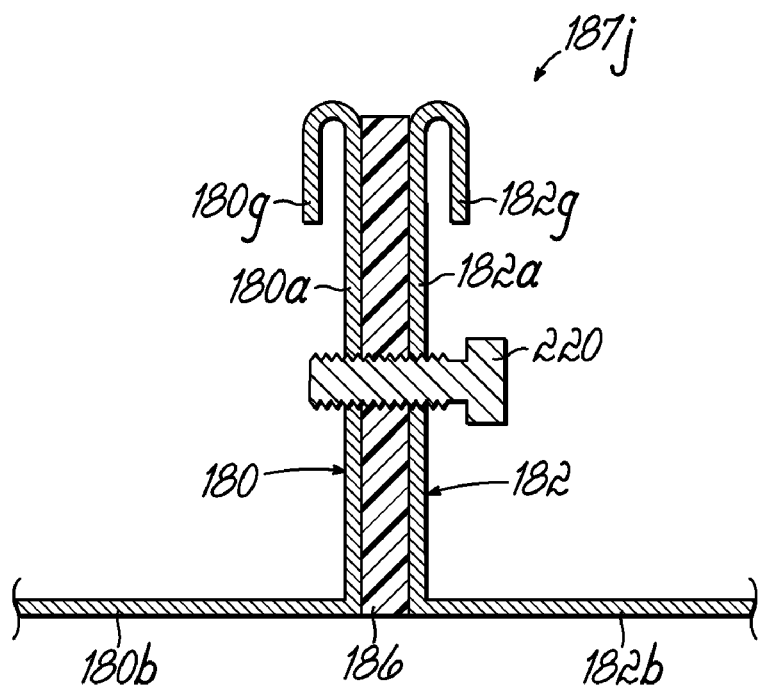
Figure 12K:
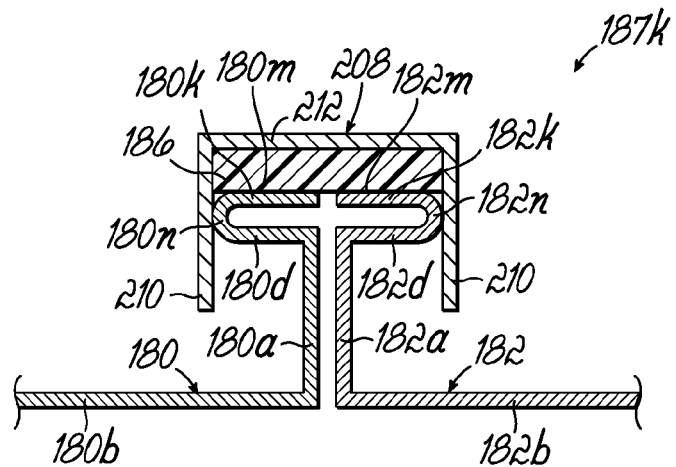
Figure 12L:
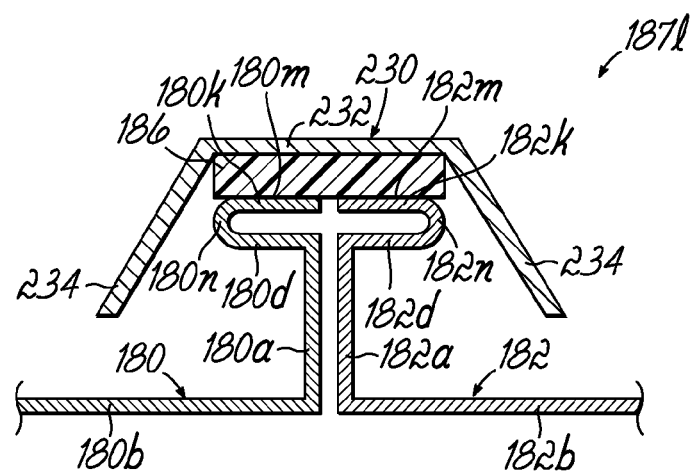
Figure 12M:
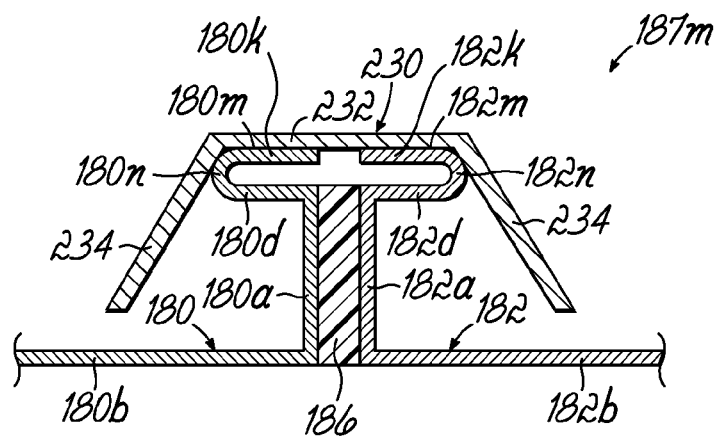
Figure 12N:
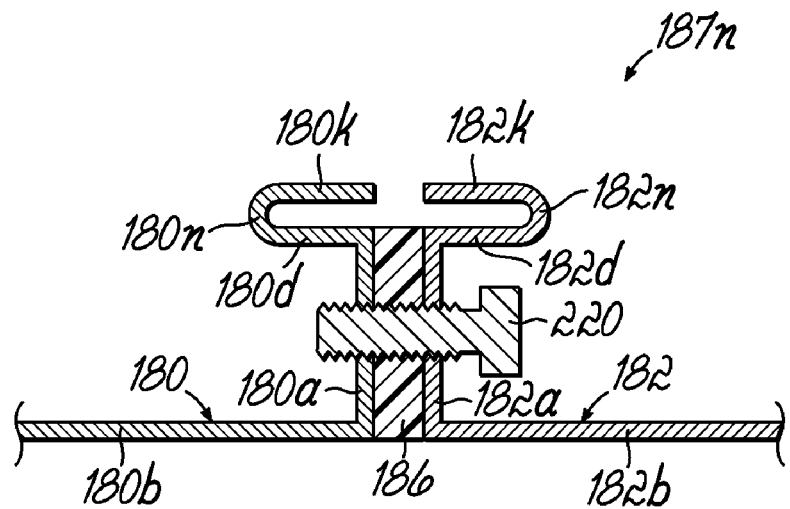
Figure 12O:
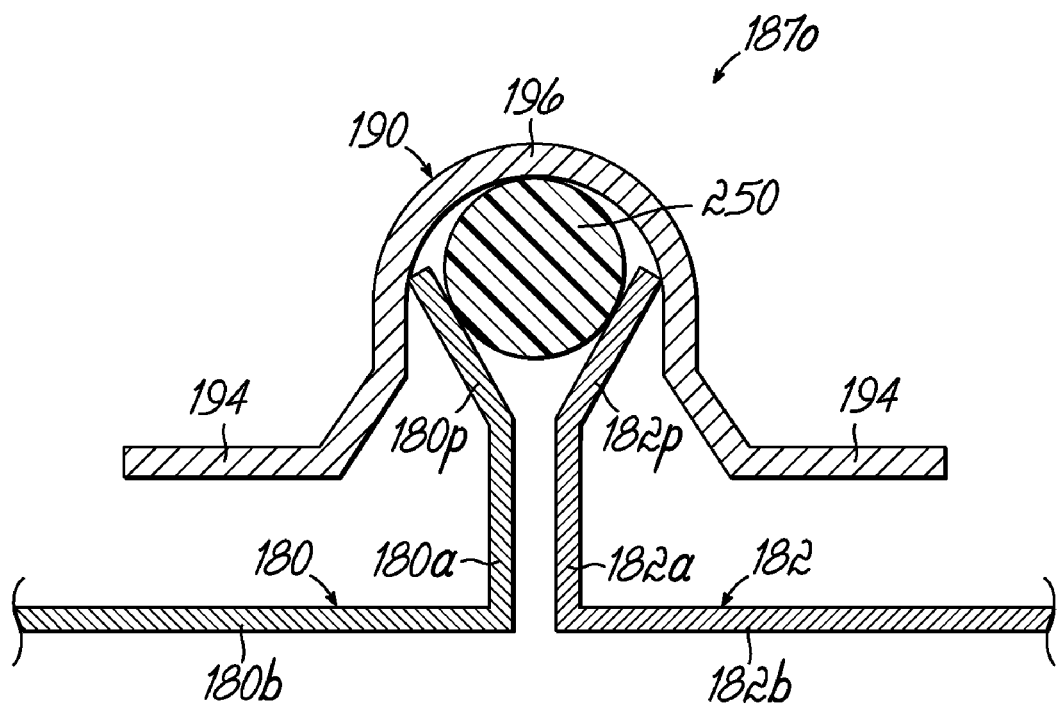
Figure 12P:
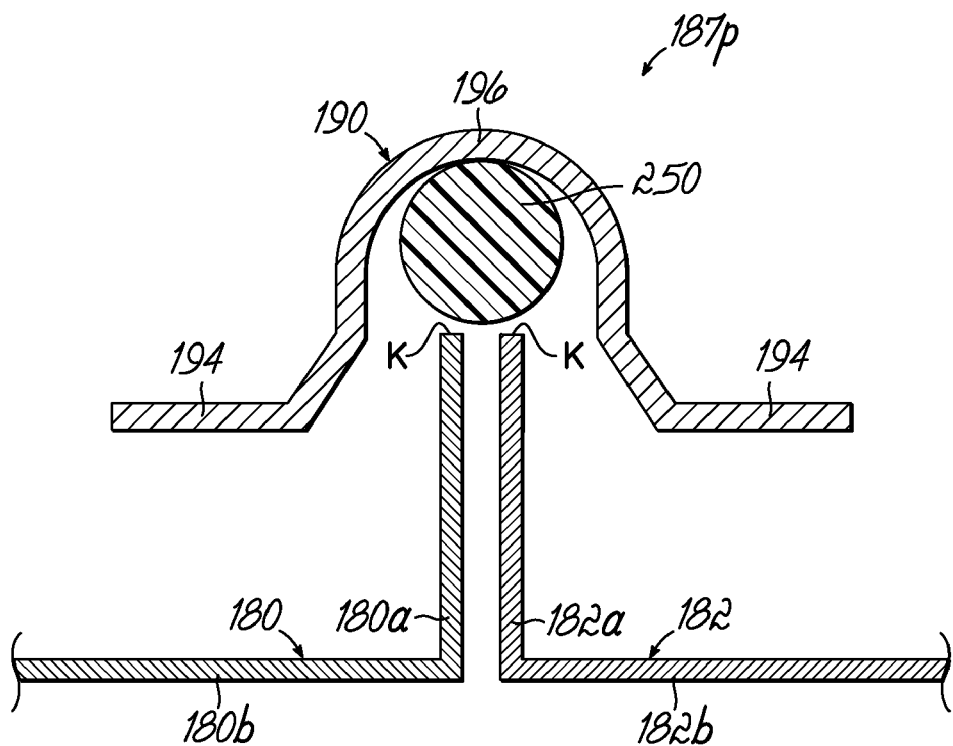
Figure 12Q:
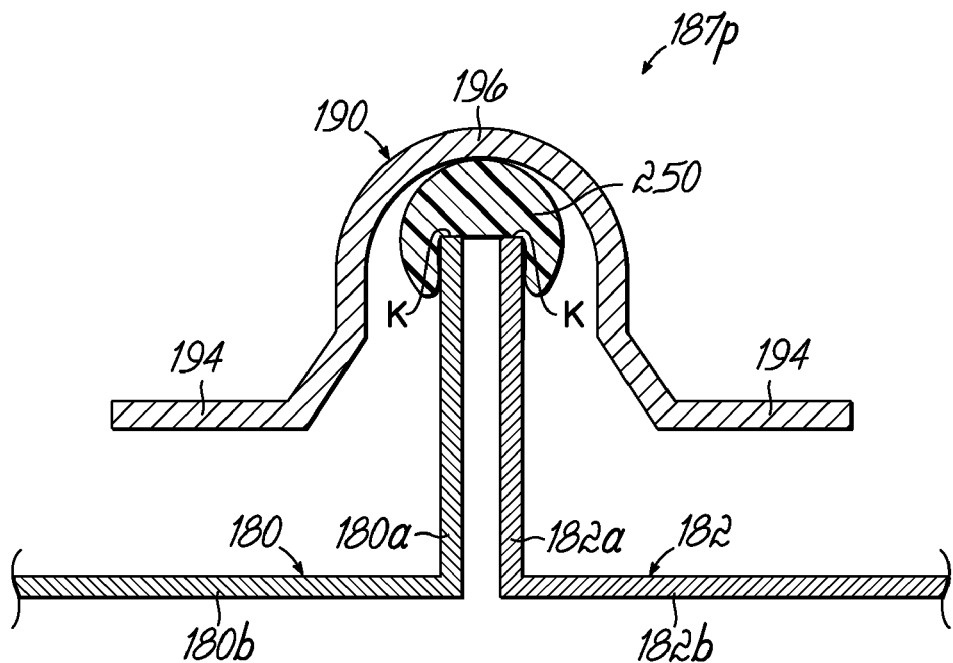

With reference to FIGS. 12A-12Q, different embodiments of flange juncture assemblies are depicted, some of the features of which are facilitated by the systems described above. For ease of understanding, like features in these embodiments have like numerals.

With reference to FIGS. 12A and 12B, first and second flanges 180, 182 are positioned in a confronting relationship such that they may be joined with one another. Each of the first and second flanges 180, 182 is defined by a single leg

180*a*, 182*a* extending generally orthogonal to a main tube wall 180*b*, 182*b*. The juncture assembly includes a gasket member 186 disposed in a gap defined between legs 180*a*, 182*a*. Gasket member 186 has a generally rectangular cross-section, such as, for example and without limitation, rectangular. The cross-sectional shape of the gasket member 186 is suitably chosen such that it includes flat surfaces facing each of the legs 180*a*, 182*a*. Accordingly, gasket member 186 is configured to prevent travel of fluids through the gap between legs 180*a*, 182*a*. For example, and without limitation, gasket member 186 prevents travel of liquids such as water and gases such as processed air, return air or particle-carrying air streams into and/or out of the ductwork of which the flanges 180, 182 form part.

With particular reference to FIG. 12A, a juncture assembly 187*a* includes a clamp member 190 disposed over flanges 180, 182, contacting and applying a compressive force against outer surfaces 180*c*, 182*c* thereof, to thereby couple flanges 180, 182 to one another. Clamp member 190 is defined by clamp legs 194 extending generally parallel to main tube walls 180*b*, 182*b*, and a loop portion 196 formed between and joining clamp legs 194. Clamp member 190, and more particularly loop portion 196 thereof, prevents travel of fluid through the gap between first legs 180*a*, 182*a* and through or around gasket member 186.

With particular reference to FIG. 12B, a juncture assembly 187*b* includes a generally V-shaped clamp member 200 disposed over flanges 180, 182, contacting and applying a compressive force against outer surfaces 180*c*, 182*c* thereof, to thereby couple flanges 180, 182 to one another. Clamp member 200 is defined by clamp legs 204 extending so as to define an acute angle relative to main tube walls 180*b*, 182*b*. Clamp member 200 prevents travel of fluid through the gap between first legs 180*a*, 182*a* and through or around gasket member 186.

With particular reference to FIGS. 12C-12H, each of the embodiments shown therein includes, in addition to first legs 180*a*, 182*a*, a pair of second legs 180*d*, 182*d* respectively extending from each of the first legs 180*a*, 182*a*. In these illustrative embodiments, each of the second legs 180*d*, 182*d* is oriented substantially orthogonal to respective first legs 180*a*, 182*a*. This is, however, not intended to be limiting, as second legs 180*d*, 182*d* may alternatively be oriented to define an acute or obtuse angle relative to first legs 180*a*, 182*a*.

With particular reference to FIG. 12C, a juncture assembly 187*c* includes a generally C-shaped clamp member 208 defined by opposed legs 210 and a center portion 212. Clamp member 208 is disposed over flanges 180, 182, contacting and applying a compressive force against ends 180*e*, 182*e* of second legs 180*d*, 182*d*, thereby coupling flanges 180, 182 to one another. Clamp member 208 also contacts outermost surfaces 180*f*, 182*f* of second legs 180*d*, 182*d*. Clamp member 208, and more particularly center portion 212 thereof, prevents travel of fluids through the gap between first legs 180*a*, 182*a* and through or around gasket member 186.

With particular reference to FIG. 12D, a Juncture assembly 187*d* is similar to juncture assembly 187*c* (FIG. 12C) and includes a clamp member 214 similar to clamp member 208 but further including end portions 216 extending from legs 210 and oriented generally parallel to main tube walls 180*b*, 182*b*.

With particular reference to FIG. 12E, a juncture assembly 187*e* is similar to juncture assembly 187*d* (FIG. 12D) and includes a clamp member 218 similar to clamp member 214 but further including end portions 220 that are oriented such as to define an acute angle relative to main tube walls 180*b*, 182*b*.

With particular reference to FIG. 12F, a juncture assembly 187*f* has components that are similar to those of juncture assembly 187*c* (FIG. 12C) but where the gasket member 186 is disposed over outermost surfaces 180*f*, 182*f* of second legs 180*d*, 182*d*. In this regard, accordingly, clamp member 208 contacts only ends 180*e*, 182*e*, applying a compressive force against them to thereby couple flanges 180, 182 to one another.

With particular reference to FIG. 12G, a juncture assembly 187*g* combines aspects of the embodiments of FIGS. 12D and 12F. More particularly, juncture assembly 187*g* includes the general structure of juncture assembly 187*f* (FIG. 12F) and the clamp member 214 of juncture assembly 187*d* (FIG. 12D). Accordingly, the structure and function of juncture assemblies 187*d*, 187*f* may be referred to for an understanding of juncture assembly 187*g* as well.

With particular reference to FIG. 12H, a juncture assembly 187*h* combines aspects of the embodiments of FIGS. 12E and 12F. More particularly, Juncture assembly 187*h* includes the general structure of juncture assembly 187*f* (FIG. 12F) and the clamp member 218 of juncture assembly 187*e* (FIG. 12E). Accordingly, the structure and function of juncture assemblies 187*e*, 187*f* may be referred to for an understanding of juncture assembly 187*h* as well.

With particular reference to FIGS. 12I-12J, each of the embodiments shown therein includes, in addition to first legs 180*a*, 182*a*, a pair of second legs 180*g*, 182*g* respectively extending from each of the first legs 180*a*, 182*a* but oriented so as to define an angle of about 180° relative to each of the first legs 180*a*, 182*a*. The junction between each of the first legs 180*a*, 182*a* and each of the second legs 180*g*, 182*g* is depicted as a loop, although this is not intended to be limiting but rather merely exemplary.

With particular reference to FIG. 12I, a juncture assembly 187*i* includes a clamp member 190 similar in structure and function to that of FIG. 12A. Clamp member 190 contacts and applies a compressive force against outer surfaces 180*h*, 182*h* of second legs 180*g*, 182*g*, thereby coupling flanges 180, 182 to one another.

With particular reference to FIG. 12J, a juncture assembly 187*j* is similar in structure to juncture assembly 187*i* (FIG. 12I) but includes no clamp member at all. Instead, a connector or fastener, such as a bolt 220 couples flanges 180 and 182 to one another, thereby also mechanically fastening gasket member 186 to first legs 180*a*, 182*a*.

With particular reference to FIGS. 12K-12N, each of the embodiments shown therein includes, in addition to first legs 180*a*, 182*a* and second legs 180*d*, 182*d*, a pair of third legs 180*k*, 182*k* respectively extending from each of the second legs 180*d*, 182*d* and oriented generally transverse (e.g., orthogonal) to first legs 180*a*, 182*a*. The junction between each of the second legs 180*d*, 182*d* and each of the third legs 180*k*, 182*k* is depicted as a loop 180*n*, 182*n*, although this is not intended to be limiting but rather merely illustrative.

With particular reference to FIG. 12K, a juncture assembly 187*k* includes a gasket member 186 disposed over outer surfaces 180*m*, 182*m* of third legs 180*k*, 182*k* as shown. A C-shaped clamp member 208 is disposed over gasket member 186 and applies a compressive force against loops 180*n*, 182*n*, thereby coupling flanges 180 and 182 to one another. FIG. 12K$_2$ shows a juncture assembly 187*k*$_2$ similar to juncture assembly 187*k* but including a clamp member 214 similar to the clamp members 214 of the embodiments of FIGS. 12D and 12G.

With particular reference to FIG. 12L, a juncture assembly 187*l* similar to juncture assembly 187*k* (FIG. 12K) but includes a clamp member 230 having a central portion 232 and two opposed legs 234, each defining an acute angle relative to central portion 232.

With particular reference to FIG. 12M, a juncture assembly 187*m* combines the clamp member 230 of juncture assembly 187*l* (FIG. 12L) with a flange structure including a gasket member 186 placed between the first legs 180*a*, 182*a* similarly in this regard, for example, to the embodiment of FIG. 12A.

With particular reference to FIG. 12N, a juncture assembly 187*n* is similar to juncture assembly 187*m* (FIG. 12M) but includes no clamp member at all. Instead, a connector or fastener, such as a bolt 220 couples flanges 180 and 182 to one another, thereby also mechanically fastening gasket member 186 to first legs 180*a*, 182*a*.

With particular reference to FIG. 12O, a juncture assembly 187*o* includes, in addition to first legs 180*a*, 182*a*, a pair of second legs 180*p*, 182*p* respectively extending from each of the first legs 180*a*, 182*a* and oriented so as to define an acute angle relative to each of the first legs 180*a*, 182*a*. Moreover, an angle between second legs 180*p*, 182*p* defines a recess configured to accept a gasket member 250 having a cross-section other than one including flat surfaces (e.g., gasket member 86 of FIGS. 12A-12N). In this exemplary embodiment, for example, gasket member 250 is depicted having a circular cross-section, although this is not intended to be limiting. A clamp member 190 is disposed to contact and apply compressive forces against gasket member 250, as well as second legs 180*p*, 182*p*, thereby coupling flanges 180, 182 to one another.

With continued reference to FIG. 12O, and similarly to the embodiments of FIGS. 12A-12M, the clamp member 190 and the position of gasket member 250 jointly prevent travel of fluids through the gap between first legs 180*a*, 182*a* and through or around gasket member 250.

With particular reference to FIGS. 12P-12Q, a juncture assembly 187*p* includes a gasket member 250 (similar to the gasket member of FIG. 12O), that is disposed adjacent the ends "k" of the first legs 180*a*, 182*a*. As shown in FIG. 12Q, the gasket member 250 is deformable about and conforms to the radial ends "k" to thereby prevent access, for example, by fluids such as water, to the space between the first legs 180*a*, 182*a*. Gasket member 250 deforms, for example, by action of clamp member 190, which thereby secures the gasket member 250 to the first legs 180*a*, 182*a*. and further secures the flanges 180, 182 to one another.

With reference to FIG. 13, in which like reference numerals refer to like features of FIGS. 1-7, another embodiment of a system 310 for forming a flange 12*a* at the end of a tube 16*a* is illustrated. In this regard, the description of the structure, relationship and functions of these like features in the embodiments of FIGS. 1-7 may be referred-to for an understanding of like features of system 310 as well. System 310 includes a second roller 302 having an extension element 313 that provides a stopping, limiting, or abutment surface 315 for limiting axial displacement of the rotatable cam 24 relative to the tube 16*a*. To this end, abutment surface 315 is generally aligned with end face 84 of collar 18. Moreover, extension element 313 provides a support surface 317 for the tube 16*a*, as shown in the figure.

The second roller 302 of this exemplary embodiment includes a depression in the form of a radially inwardly extending annular recess 321 that receives a radially inwardly protruding portion of the tube 16*a*. In this regard, the annular recess 321 of this embodiment has a generally rounded, concave cross-sectional profile that receives a complementarily-shaped radially inwardly annular protruding portion or bead 16*p* of tube 16*a* also having a generally rounded cross-sectional profile. Engagement of the annular recess 321 and annular protruding portion 16*p* with one another further restricts axial movement of the tube 16*a* relative to the collar 56. This restriction, in turn, maintains the end 14 of the tube 16*a* at a constant distance from the rotatable cam 24. The protruding portion 16*p* of the tube 16*a* defines an opposed annular recess 16*q* on the outer surface of the tube 16*a*.

With continued reference to FIG. 13, the formed flange 12*a* includes a generally U-shaped end 12*e* defining a relatively smooth outermost edge 12*t* of the flange 12*a* and, thus, a relatively smooth outermost edge 12*t* of the tube 16*a*. Exemplary methods for forming the end 12*e*, as well as the annular protruding portion 16*p* are discussed in further detail below. While the features of the exemplary second roller 302 are described in combination with a generally second stopping or limiting surface 127*a* as described with respect to the embodiment of FIG. 6, it is contemplated that the same could be alternatively combined with an angled second stopping or limiting surface 127, as described with respect to the embodiment of FIG. 5, as shown, for example, in FIG. 14. Likewise, it is contemplated that system 310 may alternatively have no extension element 313 at all or have a different structure providing support for tube 16*a* and/or providing an abutment surface for restricting axial movement of rotatable cam 24.

Figure 15:
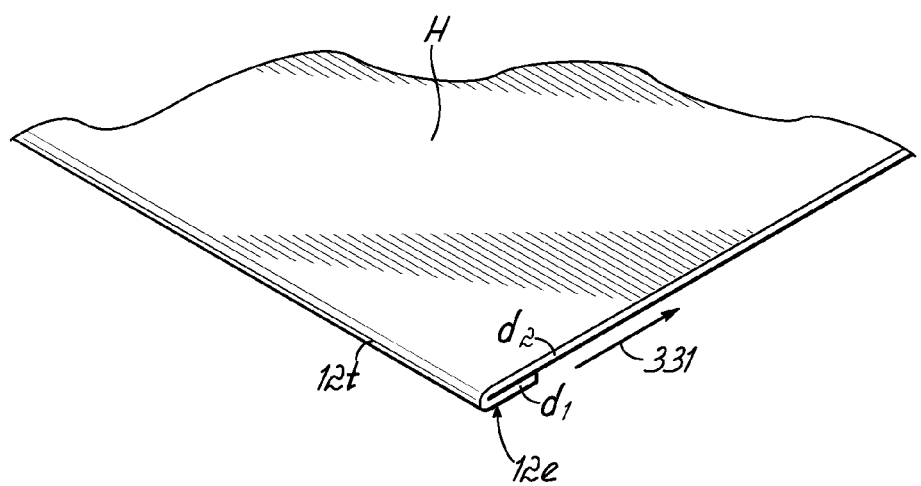
FIG. 15 is partially broken away perspective view of a sheet of metal with a bent portion.
Figure 16:
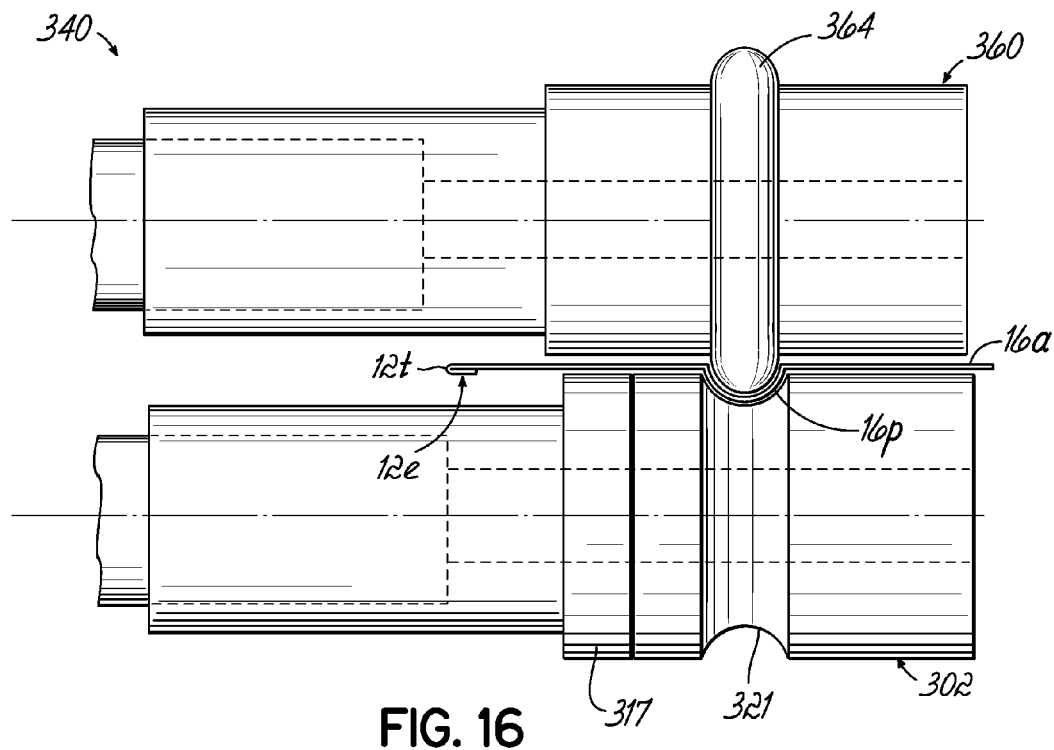
FIG. 16 is an elevational, partial cross-sectional view of a flange-forming system according to another embodiment of the present invention.
Figure 17:
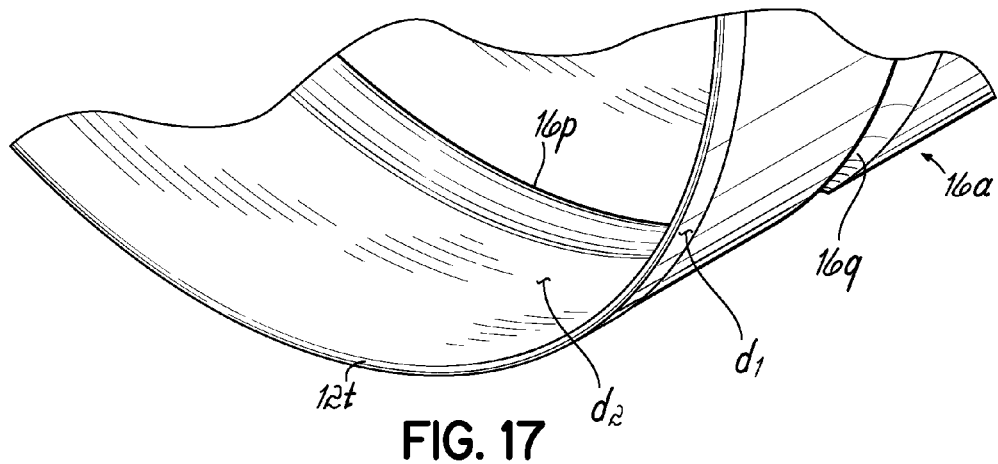
FIG. 17 is a partially broken-away perspective view of a tube.

With reference to FIGS. 15, 16, and 17, exemplary methods are illustrated for forming the generally U-shaped end 12*e* and the annular protruding portion 16*p* of tube 16*a*. With particular reference to FIG. 15, a sheet of metal H is provided and an edge thereof is bent into a generally U-shaped profile as shown. In this regard, accordingly, the resulting product is a sheet of metal H having a first portion $d_1$ that is bent in a first direction (arrow 331) relative to a second portion $d_2$. Although not shown, the sheet of metal H is then formed into a tube. The resulting tube, thus, includes a relatively smooth, generally U-shaped outermost edge 12*t*.

With particular reference to FIGS. 16-17, in which like reference numerals refer to like features of FIGS. 1-14, an exemplary system 340 is similar to systems 10, 110, 130, 133 and 310 (FIGS. 1-7 and 13-14), the description of which may be referred to for an understanding of system 340 as well. System 340 includes a third roller 360 that is selectively engageable with second roller 302 to form the protruding portion 16*p* of tube 16*a*. More specifically, tube 16*a* is engaged between second roller 302 and third roller 360, as shown. Third roller 360 includes a radially outwardly extending protrusion or bead 364 having the form of a ring of a generally convex profile and circumferentially disposed thereabout. Protrusion 364 is in registration with the annular recess 321 of the second roller 302. The second and third rollers 302, 360 are moved into engagement with one another such that their rotation results in rotation of tube 16*a*.

Figure 14:
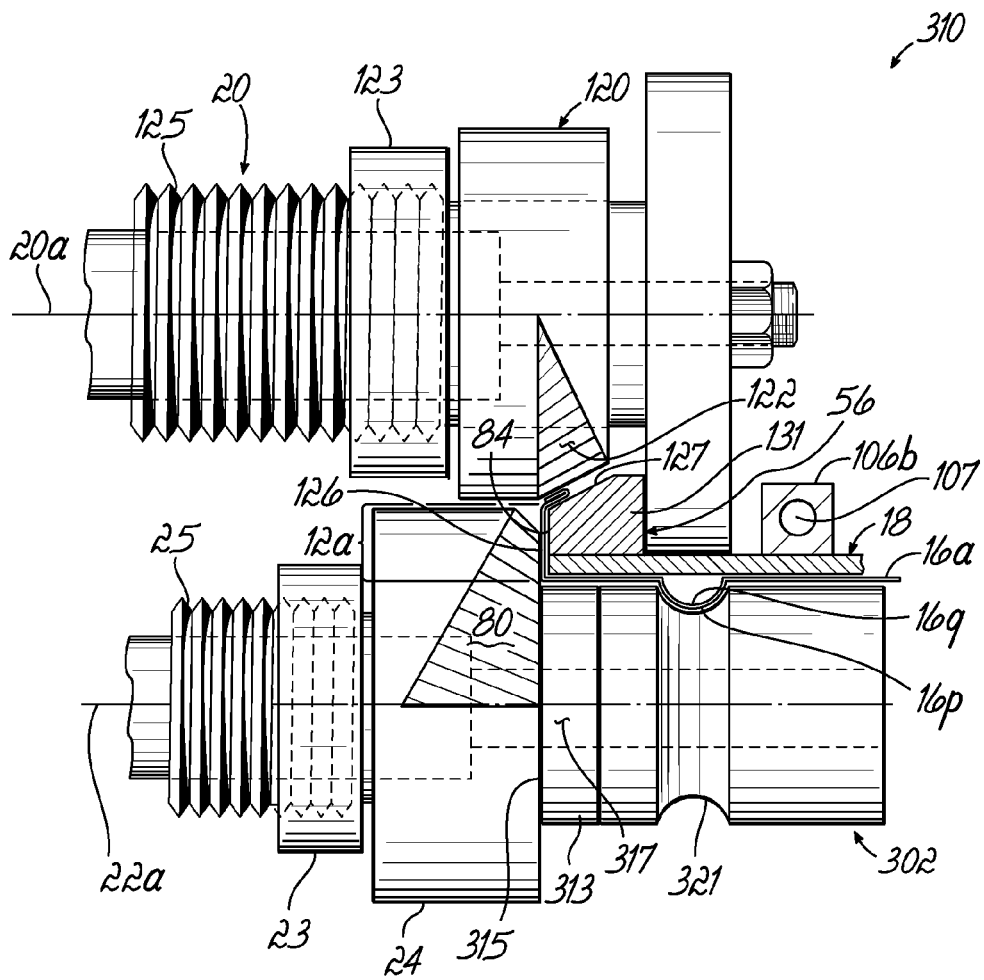
FIG. 14 is an elevational, partial cross-sectional view of a flange-forming system according to another embodiment of the present invention.

During this rotation, the third roller 360 is gradually moved into further engagement with second roller 302 such that the protrusion 364 is received, through the tube 16*a*, into annular recess 321. This movement, in turn, deforms the portion of tube 16*a* lying between the protrusion 364 and annular recess 321, thereby reshaping such portion into the annular protruding portion 16*p* of tube 16*a*, as shown in FIG. 17. The resulting tube 16*a* may then be processed as shown in FIGS. 13 and 14, to form the remainder of the flange 12*a*. It is contemplated that one or both of the second and third rollers 302, 360 may be movable relative to the other of the second and third rollers 302, 360. For example, and without limitation, the second roller 302 may be movable toward the third roller 360 while the third roller 360 is relatively static, or vice versa.

Figure 18:
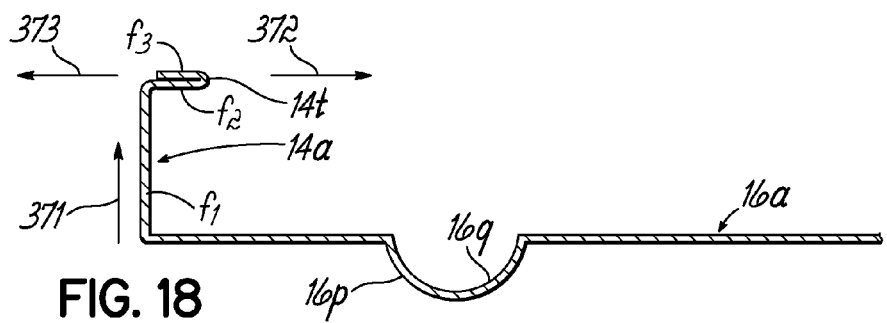
FIG. 18 is a partial schematic view of a tube and flange formed at an end thereof.

The methods described in the exemplary embodiments of FIGS. 13-17, accordingly, and with further reference to FIG. 18, contemplate, for example and without limitation, forming a flange 12a by bending a first portion $f_1$ thereof in a first direction (arrow 371) to thereby form a first segment of the flange 12a. The methods further contemplate bending a second portion $f_2$ relative to the first portion $f_1$ in a second direction (arrow 372) and bending a third portion $f_3$ relative to the second portion $f_2$ in a third direction (arrow 373). In the embodiment of FIG. 18, the second and third directions (arrows 372, 373) are generally parallel to one another, although this is intended to be merely exemplary rather than limiting.

In the embodiment of FIG. 18, moreover, the first and second directions (arrows 371, 372) are transverse to one another and more particularly generally orthogonal to one another. This relationship between the first and second directions is likewise intended to be exemplary rather than limiting. In the contemplated methods, moreover, bending of the third portion $f_3$ is effected prior to bending of the second portion $f_2$ relative to the first portion $f_1$, although this order of bending of the different portions is similarly intended to be exemplary rather than limiting.

The resulting exemplary tube 16a and flange 12a of FIG. 18 includes a relatively smooth outermost edge 12t of the flange 12a. Moreover, the generally U-shaped profile of the end 12e of flange 12a lends structural rigidity to the flange 12a. The exemplary tube 16a also includes an annular protruding portion 16p adjacent the flange 12a that lends structural rigidity to the end portion of tube 16a.

With reference to FIGS. 19, 20, 21A, 21B, 22A, 22B, 23A, 23B, and 24, different embodiments of air duct assemblies are illustrated and described. The formation of at least some of the components of these assemblies is facilitated by the flange-forming systems and methods described above.

Figure 19:
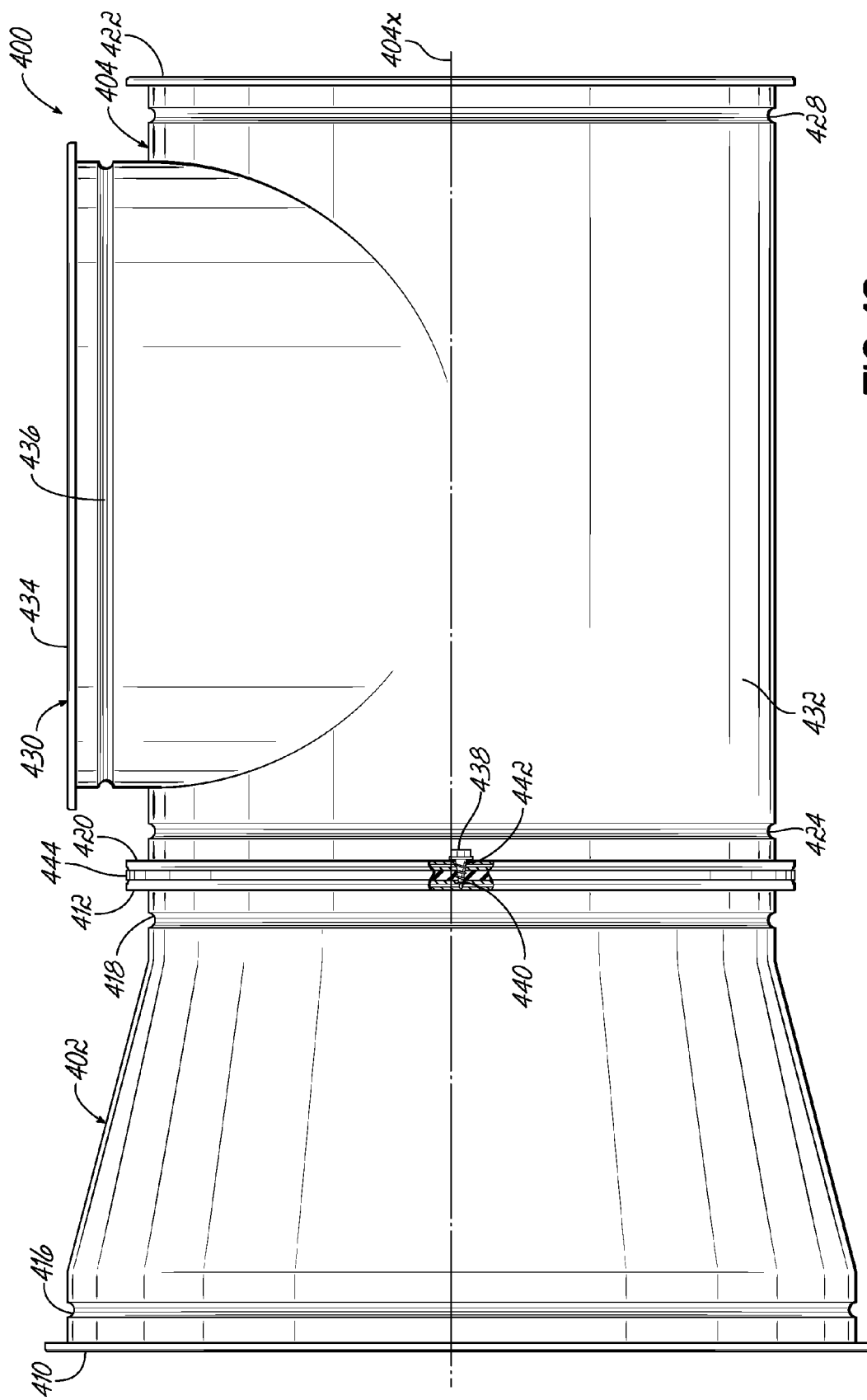
FIG. 19 is an elevational view of an air duct assembly.

With particular reference to FIG. 19, an air duct assembly 400 includes an air duct fitting 402 which could, for example be a spiral air duct fitting, coupled to a T-shaped tube fitting 404 extending generally along a longitudinal axis 404x. Air duct fitting 402 has a generally frustoconical profile to thereby define a reducer-type fitting and includes first and second flanges 410, 412 formed at opposite ends thereof. A pair of annular depressions or recesses 416, 418 are located respectively adjacent each of the flanges 410, 412 and are configured to receive respective gasket members, as described in further detail below.

The T-shaped tube fitting 404 likewise includes first and second flanges 420, 422 at opposite ends thereof and first and second annular depressions or recesses 424, 428 respectively adjacent each of the flanges 420, 422. A lateral tube end 430 extends generally transverse to axis 404x and extends from the body 432 of the tube fitting 404. Lateral tube end 430 includes a respective flange 434 and annular recess 436. Fittings 402 and 404 are coupled to one another through engagement of the respective flanges 412, 420, which are in confronting relationship with one another, via one or more fasteners such as metal screws 438 (only one shown) inserted through corresponding holes 440, 442 in the flanges 412, 420. A generally annular gasket member 444 is disposed between the flanges 412, 420 and prevents or restricts the travel of fluid from the exterior and into the interior of fittings 402 and 404. To this end, the metal screws 438 likewise penetrate through the thickness of the gasket member 444 to thereby secure the same relative to the flanges 412, 420.

Although not shown, a barrel clamp or similar structure may be placed over the confronting flanges 412, 420 to further restrict the travel of fluid into the interior portions of fittings 402, 404. The configuration of the barrel clamp may, for example, be similar to one or more of the clamp configurations shown in FIGS. 12A-12Q. Notably, the presence of the annular recesses 418, 424 respectively adjacent the flanges 412, 420 permits coupling of the fittings 402, 404 with redundant protection against the travel of fluid into the interior portions of fittings 402, 404. More specifically, the fittings 402, 404 may be coupled as described above with the gasket member 444 between the flanges 412, 420 and in addition through the clamp (not shown) disposed over the flanges, for example as shown in FIGS. 12A-12Q and with respective gasket members retained in each of the annular recesses 418, 424.

The fittings 402, 404 may be alternatively coupled without the gasket member 444 between the flanges 412, 420 and solely protect the interior portions of the fittings 402, 404 from fluids from the exterior. To this end, the gasket members (not shown) are retained in the annular recesses 418, 424 and the clamp (not shown) disposed over the gasket members and flanges 412, 420 to secure the flanges 412, 420 relative to one another.

Figure 20:
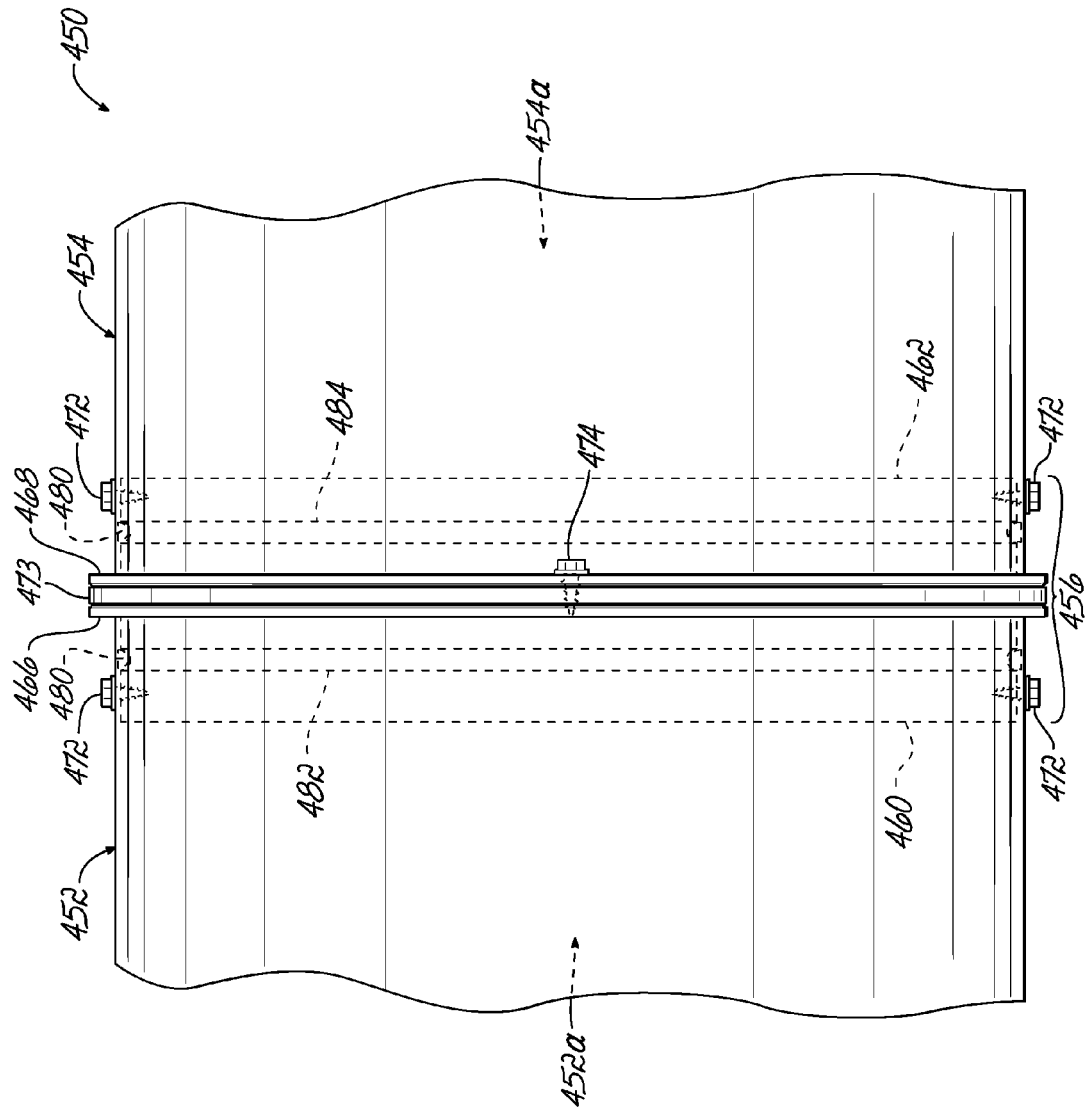
FIG. 20 is a partially broken away elevational view of another embodiment of an air duct assembly.

FIG. 20 further illustrates the above-discussed concept of redundant protection from liquid from the exterior. FIG. 20 shows an assembly 450 that includes first and second tubes 452, 454 joined together (i.e., coupled) through a tubular structure 456 partially disposed in the interior portions of the tubes 452, 454. Tube structure 456 includes respective first and second tubular body portions 460, 462 and respective flanges 466, 468 extending outwardly from the interior of the tubes 452, 454 and in confronting relationship with one another.

The tube structure 456 is secured relative to the first and second tubes 452, 454 through fasteners such as metal screws 472 extending through the tubes 452, 454 and through the tubular body portions 460, 462. A gasket member 473 is disposed between the confronting flanges 466, 468 through a fastener such as a metal screw 474 which also secures the flanges 466, 468 relative to one another.

With continued reference to FIG. 20, two gasket members 480 are each respectively retained in respective annular recesses 482, 484 of the tubular body portions 460, 462. In this regard, the gasket members 480 close the spaces between each of the tubular body portions 460, 462 and the corresponding tube 452, 454 associated therewith. In this regard, therefore, the gasket member 473 disposed between the flanges 473 presents a first line of defense against the travel of fluid into the interior portions 452a, 454a of the tubes 452, 454. The gasket members 480 present a second, redundant line of defense against the travel of fluid into the interior portions 452a, 454a.

Each of the gasket members 473, 480 is chosen for the particular application. One or both of these may, for example, have a round cross-section, a generally U-shaped cross section, or any other suitably chosen cross-section to provide the required type of protection (against fluid flow into the interior portions 452a, 454a) for the particular application.

With reference to FIGS. 21A-21B, another embodiment of an air duct assembly 500 includes an air duct 504 coupled to a flange fitting 508. Air duct 504 may, for example, and without limitation, be a spiral air duct. Flange fitting 508 includes a first tubular body portion 510 having a diameter smaller than that of air duct 504 such that it may be slid into the interior portion 504a as suggested by the general direction of relative movement indicated by arrows 512. A second tubular body portion 514, generally concentric with the first tubular body portion 510 of the fitting 508 is larger and is adjacent a flange 520 that projects from the second body portion 514. The second body portion 514 may, for example, have a diameter similar to that of the air duct 504. An intermediate portion 522 of the fitting 508 connects the first and second body portions 510, 514 to provide a transition between the two dimensionally (e.g., in diameter) different body portions 510, 514.

The first body portion 510 includes an annular recess 530 similar to the annular recesses described above with respect to the other embodiments, and configured to receive and retain a gasket member 532. The exemplary gasket member 532 of this exemplary embodiment has a generally U-shaped cross-section although this is merely illustrative rather than limiting. As shown in FIG. 21B, the air duct 504 is coupled to the flange fitting 508 through a fastener such as metal screws 535. When the air duct 504 and the flange fitting 508 are coupled to one another, the gasket member 532 is compressed, with the two legs defining the U-shaped cross-section collapsing and thereby also providing redundant protection against the travel of fluid into the interior portion 504a of air duct 504. More specifically, each of the legs 532a, 532b of the gasket member 532 is collapsed and remains in engagement with the inner surface of the air duct 504 to jointly provide at least two barriers in the path of travel of fluid into the interior portion 504a.

Figure 22B:
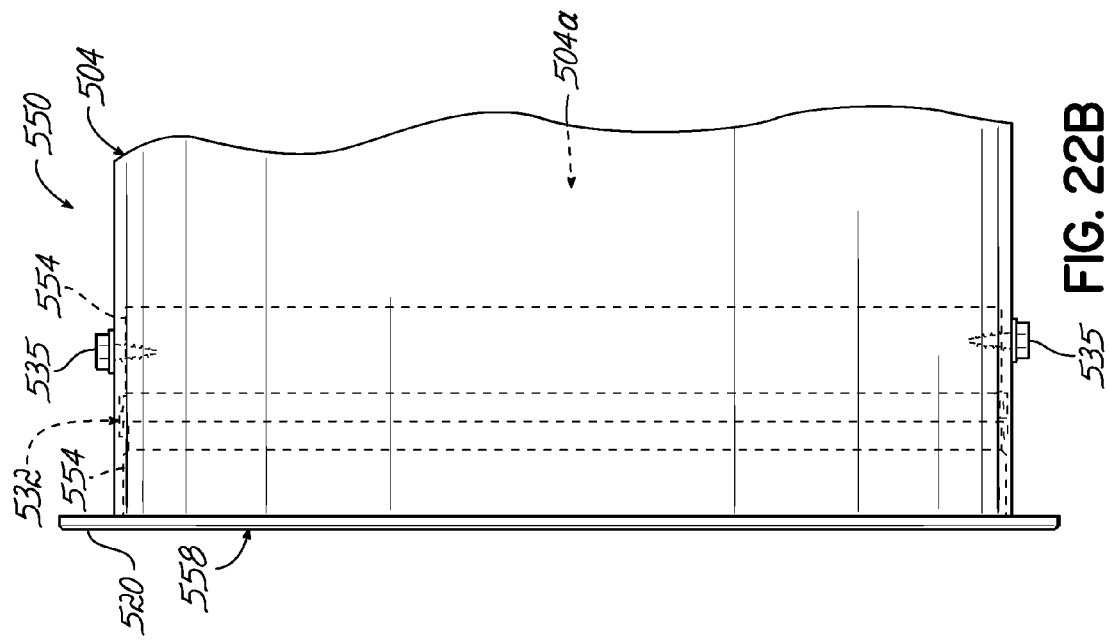
FIGS. 22A-22B are partially broken away elevational views of a different embodiment of an air duct assembly.
Figure 22A:
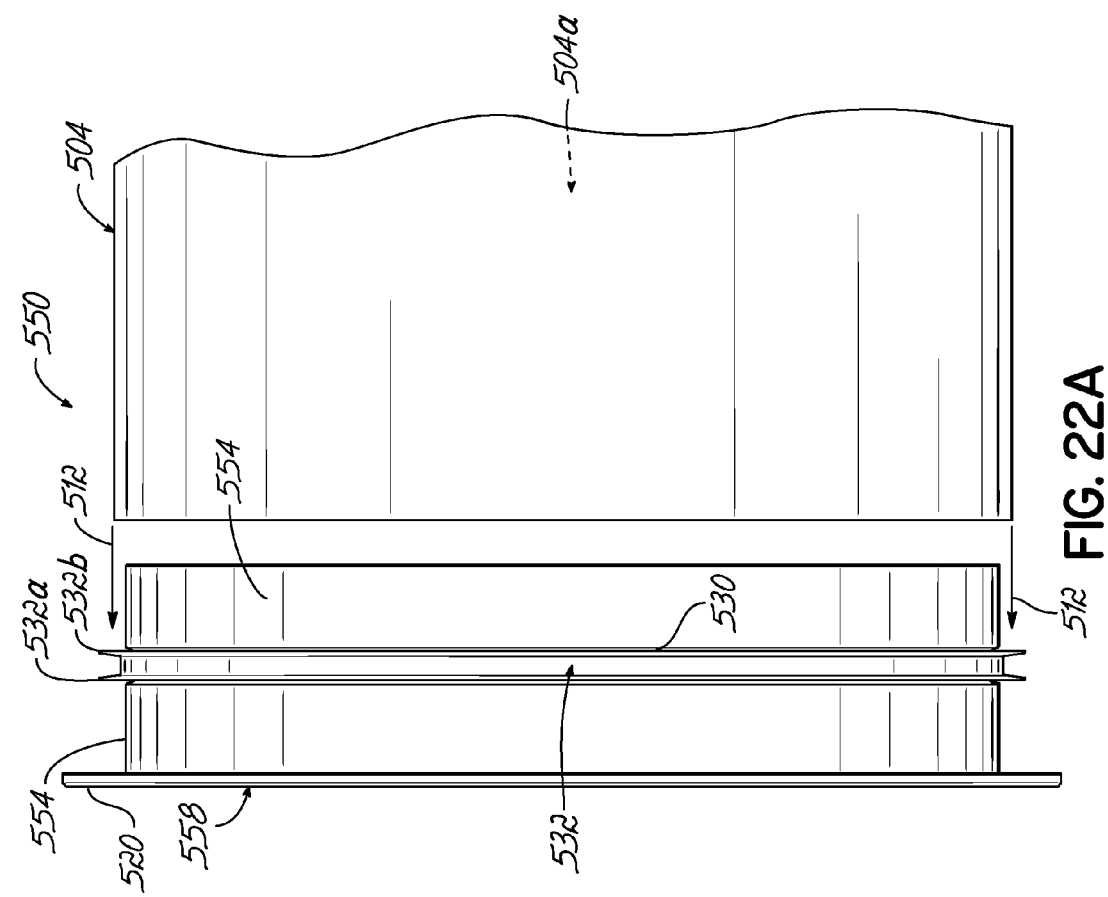

With reference to FIGS. 22A-22B, in which like reference numerals refer to like features in FIGS. 21A-21B, another embodiment of an air duct assembly 550 is very similar to air duct assembly 500 (FIGS. 21A-21B). Air duct assembly 550 does not include a flange fitting having first and second tubular body portions having different diameters but rather a flange fitting 558 having a pair of body portions 554 having substantially the same diameter. This diameter is smaller than the diameter of the air duct 504 such that the flange fitting 558 may be slid into the interior portion 504a as suggested by the general direction of relative movement indicated by arrows 512. Other functions and relationships between the different components of the air duct assembly 550 may be gathered from the description of similar components of the embodiment of FIGS. 21A-21B.

Figure 23B:
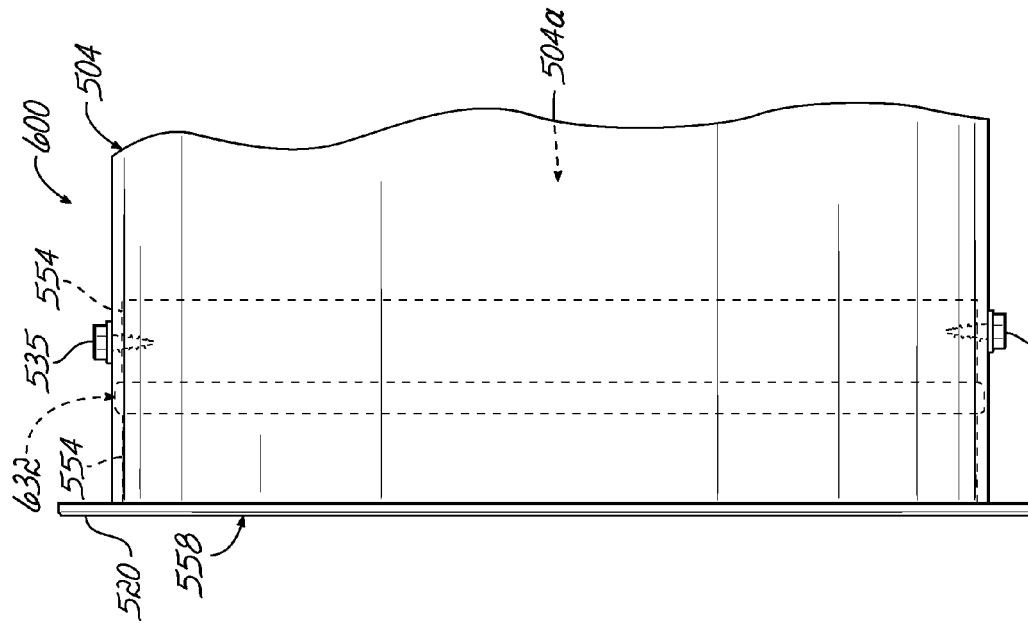
FIGS. 23A-23B are partially broken away elevational views of a different embodiment of an air duct assembly.
Figure 23A:
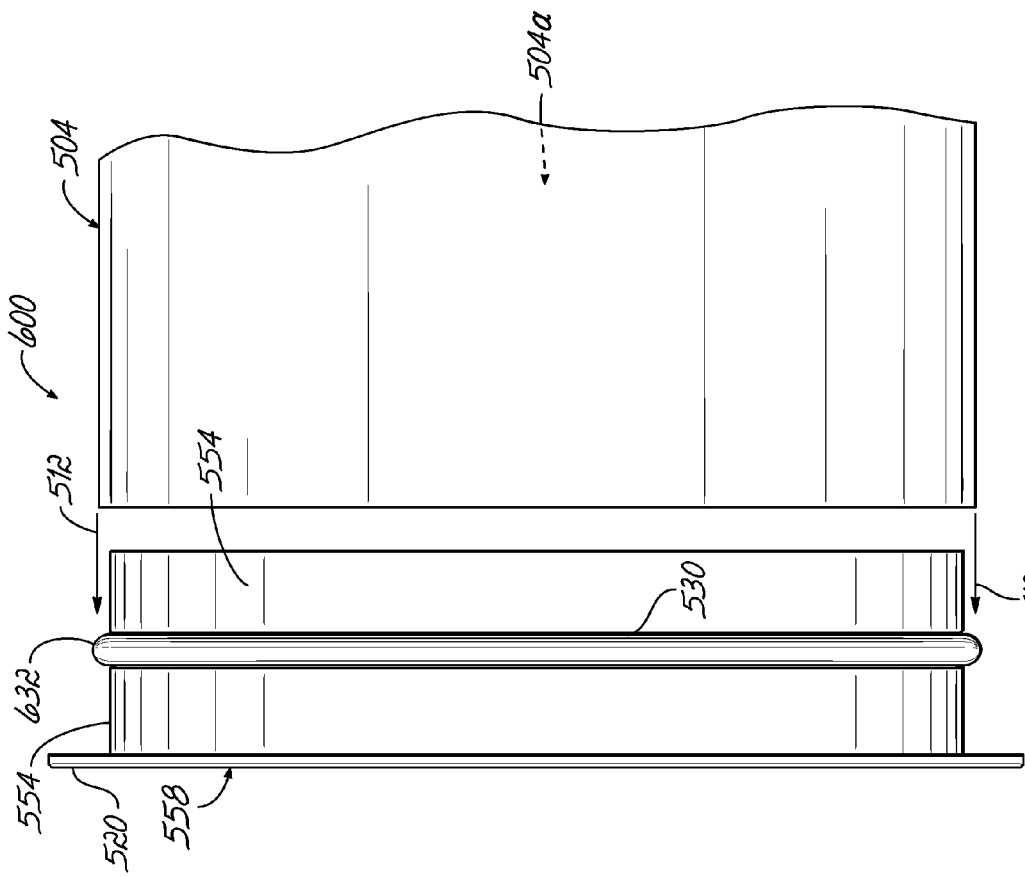

With reference to FIGS. 23A-23B, in which like reference numerals refer to like features of FIGS. 22A-22B, another embodiment of an air duct assembly 600 includes a gasket member 632 having a generally round cross-section. Other functions and relationships between the different components of the air duct assembly 600 may be gathered from the description of similar components of the embodiment of FIGS. 22A-22B. By way of contrast, the round cross-section of the gasket member 632 provides a contacting surface with the inner surface of the air duct 504 that is different from the two-point contact surface provided by the U-shaped gasket member 532 of the embodiments of FIGS. 21A-21B and 22A-22B.

Figure 24:
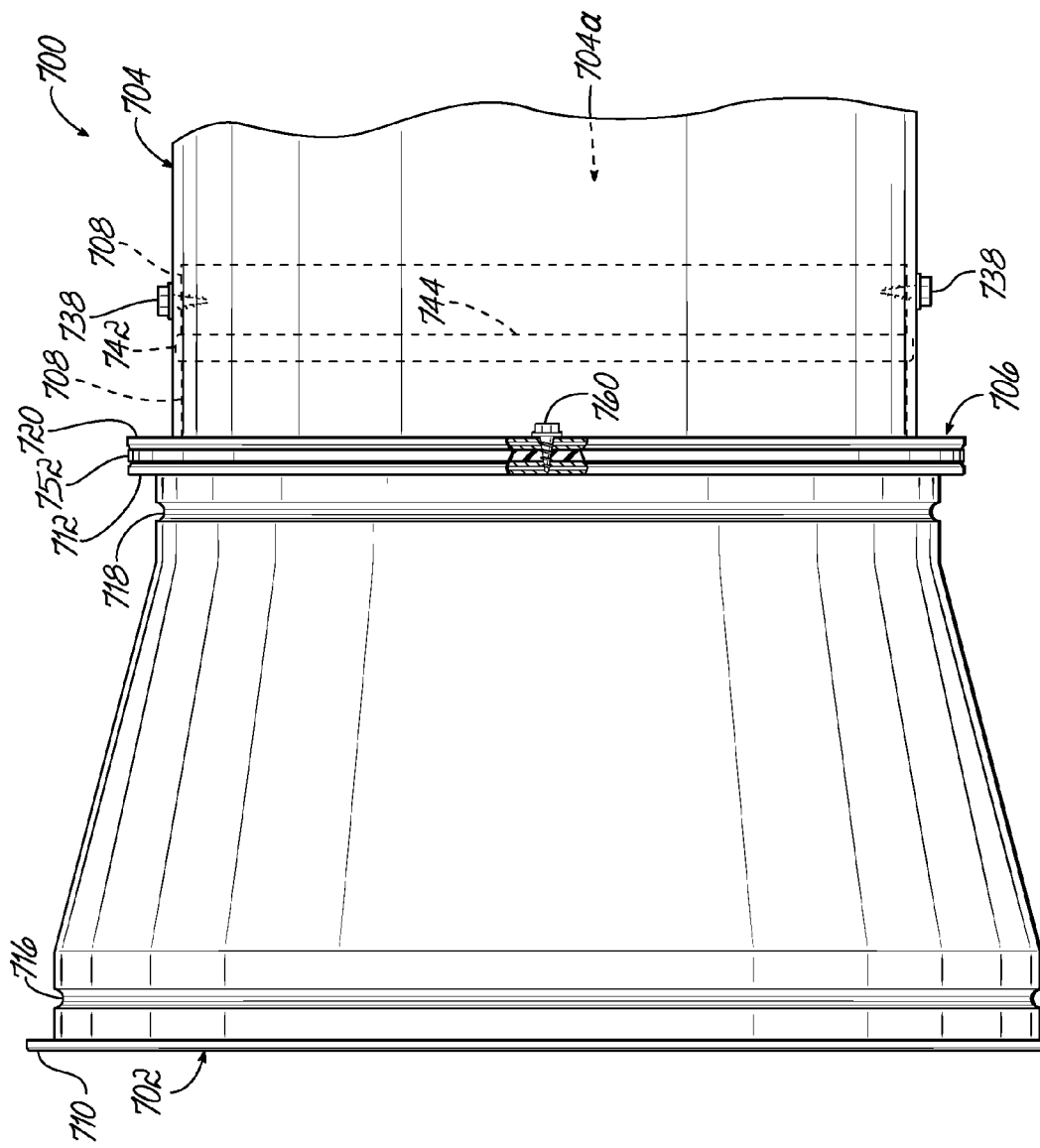
FIG. 24 is a partially broken away elevational view of yet another embodiment of an air duct assembly.

With reference to FIG. 24, another embodiment of an air duct assembly 700 includes an air duct fitting 702 which could, for example be a spiral air duct fitting, coupled to an air duct 704 through a flange fitting 706 that is partially disposed within the interior portion 704a of air duct 704. Air duct fitting 702 has a generally frustoconical profile to thereby define a reducer-type fitting and includes first and second flanges 710, 712 formed at opposite ends thereof. A pair of annular depressions or recesses 716, 718 are located respectively adjacent each of the flanges 710, 712 and are each configured to receive respective gasket members, as generally described above with respect to other similar embodiments.

The air duct 704 is a generally tubular structure and does not include a flange formed at the shown end thereof. In this regard, therefore, the flange fitting 706 provides a coupling of air duct 704 with the air duct fitting 702. To this end, flange fitting 706 includes a tubular body portion 708 that has a diameter smaller than the diameter of the air duct 704 such that the tubular body portion 708 may be slidingly received within the interior portion 704a of air duct 704. A flange 720 extends radially outwardly from the tubular body portion 708 and is disposed in confronting relationship with the flange 712 of the air duct fitting 702. Coupling between the flange fitting 706 and the air duct 704 is facilitated, in this embodiment, by one or more fasteners such as metal screws 738 inserted through air duct 704 and through the tubular body portion 708, as shown. A gasket member 742 is retained within an annular recess 744 of the flange fitting 706 that is adjacent the flange 720. A second gasket member 752 is disposed between the confronting flanges 712, 720 and is secured relative to these two flanges by a fastener such as a metal screw 760 in ways similar to the metal screw 438 described with reference to the embodiment of FIG. 19, above. Jointly, the gasket members 742 and 752 provide redundant protection from travel or flow of fluid from the exterior and into the interior portions 704a and 702a of the air duct 704 and air duct fitting 702, respectively.

Although not shown, a clamp may be applied over the flanges 712, 720 to further secure the coupling engagement between the second gasket member 752 relative to the flanges and to further secure air duct fitting 702 and flange fitting 706 relative to one another. The configuration of the clamp may, for example, take the form of one of the embodiments shown in FIGS. 12A-12Q, or alternatively, take the form of one of the embodiments of FIG. 25 or FIGS. 25A-25T, the details of which are described in further detail below. For ease of explanation, like reference numerals in FIGS. 25 and 25A-25T refer to similar features.

Figure 25:
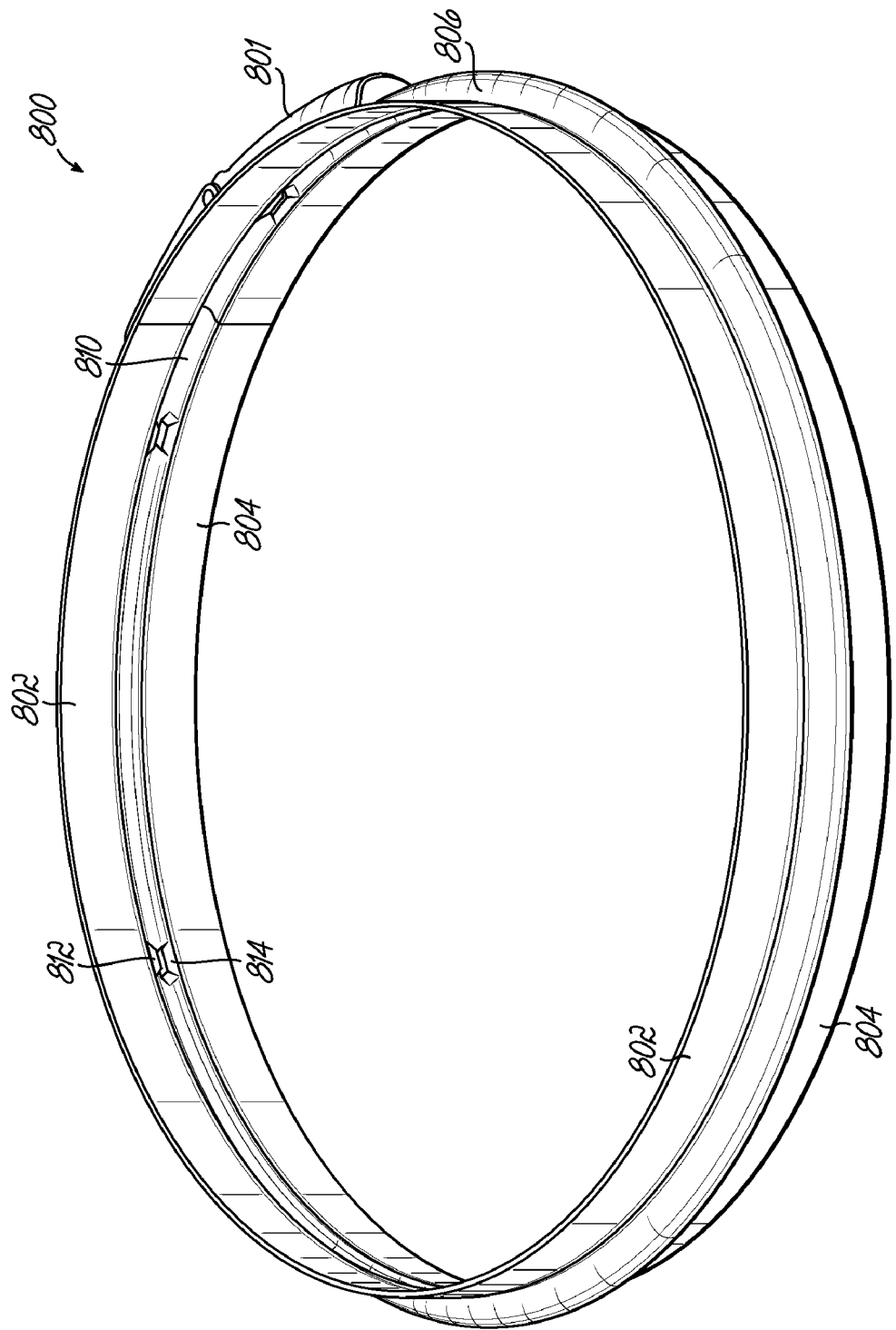
FIG. 25 is a perspective view of a clamp member in accordance with one embodiment of the present invention.

With particular reference to FIG. 25, an exemplary embodiment of a clamp member 800 is illustrated. Clamp member 800 includes a pair of lateral portions 802, 804 that are in confronting relationship with one another and which are joined to one another at a rounded portion or bead 806 of the clamp member 800. As used herein, the term "lateral portion" when referring to lateral portions 802, 804 is intended to include a substantial portion of the clamp member 800 on each side of a cross-sectional axis 800a of clamp member 800 and therefore is not intended to be limited to the portions of clamp member 800 schematically illustrated being generally rectilinear. A latch 801 allows selective opening and closing of the clamp member 800.

The lateral portions 802, 804 and bead 806 of clamp member 800 define a channel 810 which, as explained in further detail below, is configured to receive a pair of flanges of respective first and second tubes being secured to one another by the clamp member 800. The lateral portions 802, 804 extend so as to follow a generally close-ended path. In this embodiment, the lateral portions 802, 804 extend so as to follow a generally circular path or profile, although this is intended to be merely exemplary rather than limiting. Clamp member 800 includes a plurality of pairs of confronting restriction elements 812, 814 that are spaced from one another along the circumference of the generally circular clamp member 800. More specifically, and with further particular reference to FIGS. 25A-25B, the restriction elements 812, 814 extend into the channel 810 of the clamp member 800 and are disposed opposite one another across the cross-sectional axis 800a of clamp member 800. It is contemplated, however, that respective pairs of restriction elements 812, 814 may be instead offset from one another along the close-ended path of clamp member 800.

Figure 25A:
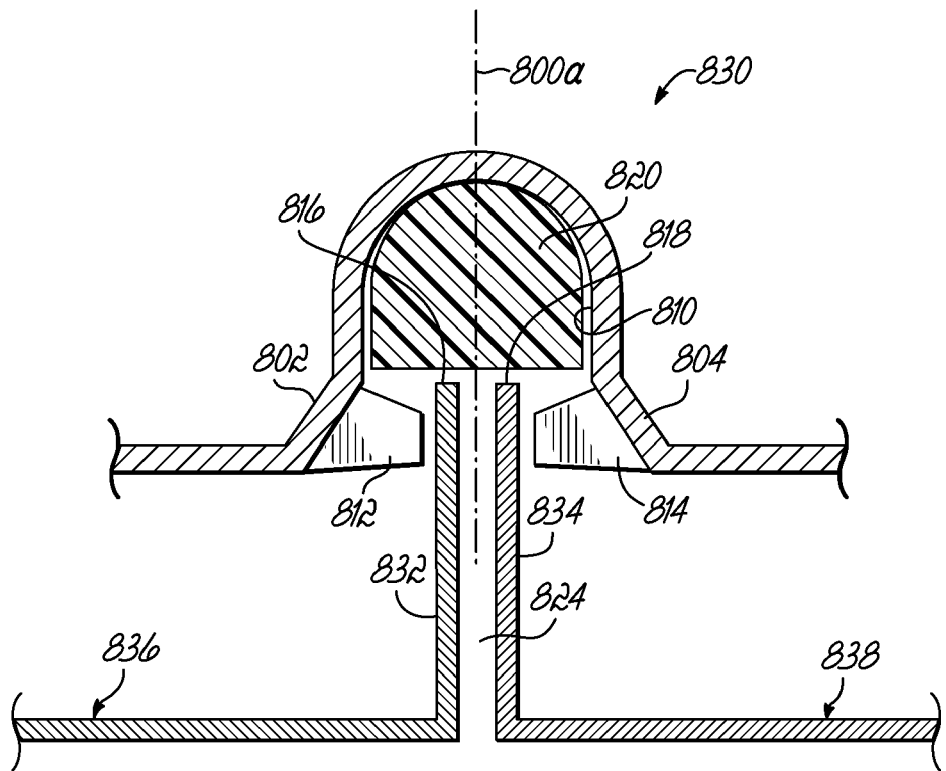
FIGS. 25A-25T are cross-sectional views of different embodiments of juncture assemblies according to the principles of the present invention.
Figure 25B:
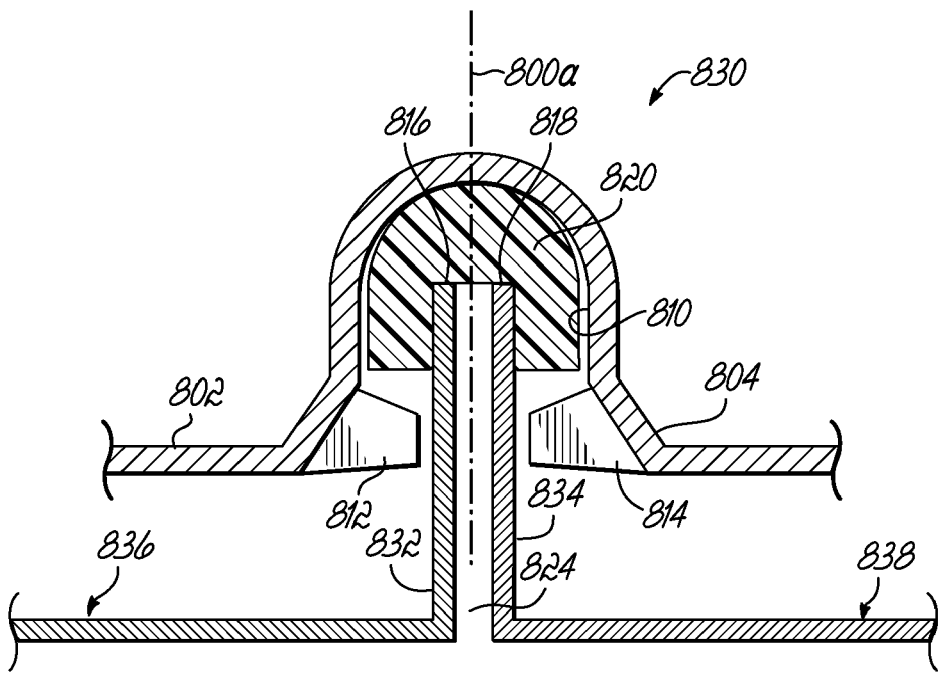

The restriction elements 812, 814 facilitate securing a gasket member 820 in place and facilitate positioning (e.g., centering) first and second flanges 832, 834 within channel 810. The gasket member 820 is positioned so as to prevent the flow of fluid through a gap 824 defined between the respective first and second flanges 832, 834 of the illustrated juncture assembly 830 of FIGS. 25A-25B. More specifically, and with particular reference to FIG. 25B, the gasket member 820 is deformable about the respective radial ends 816, 818 of the flanges 832, 834 to thereby restrict the flow of fluid between the interior of tubes 836, 838 and the surroundings. The gasket member 820 is made of a suitably chosen material, such as silicon, neoprene or ethylene propylene diene monomer ("EPDM") rubber, for example. As illustrated in FIGS. 25A and 25B, the restriction elements 812, 814 prevent the gasket member 820 from leaving the channel 810 of clamp member 800, thereby securing the gasket member 820 in place, relative to the first and second flanges 832, 834. More specifically, the orientation of the restriction elements 812, 814 within the channel 810 obstructs any downward movement (relative to the orientation in the figures) of gasket member 820. Moreover, the position of the restriction elements 812, 814 within channel 810 facilitate positioning of the flanges 832, 834 within channel 810. More specifically, in this embodiment, the restriction elements 812, 814 are positioned so as to leave a relatively narrow space between them, such that the flanges 834, 834 are more or less laterally centered within channel 810. Centering of the flanges 832, 834 within channel 810, in turn, facilitates continuous contact between the gasket member 820 and the ends 816, 818 of flanges 832, 834, which thereby minimizes the possibility of fluid flow through the gap 824.

Figure 26A:
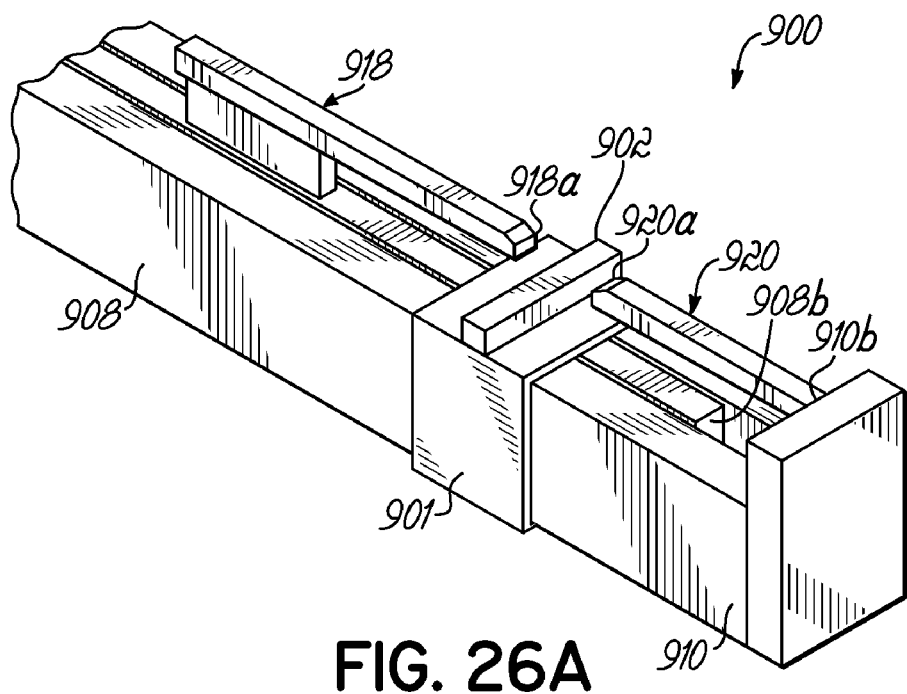
FIGS. 26A-26C illustrate an exemplary apparatus and method for forming restriction elements of the clamp member of FIGS. 25 and 25A-25T.
Figure 26B:
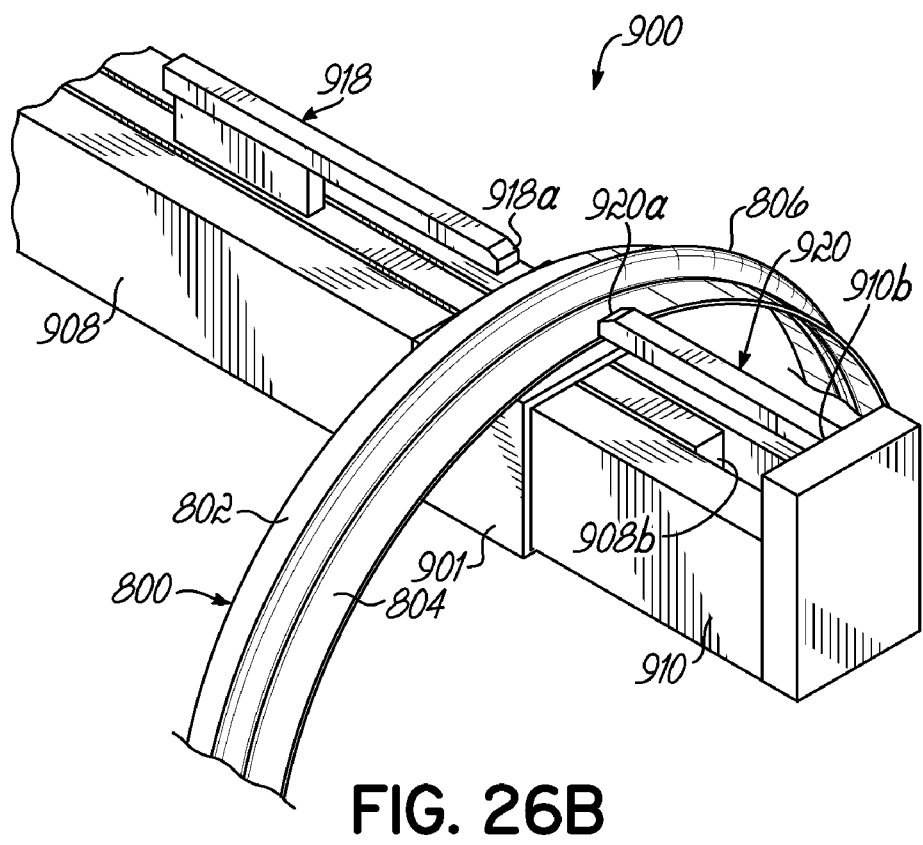
Figure 26C:
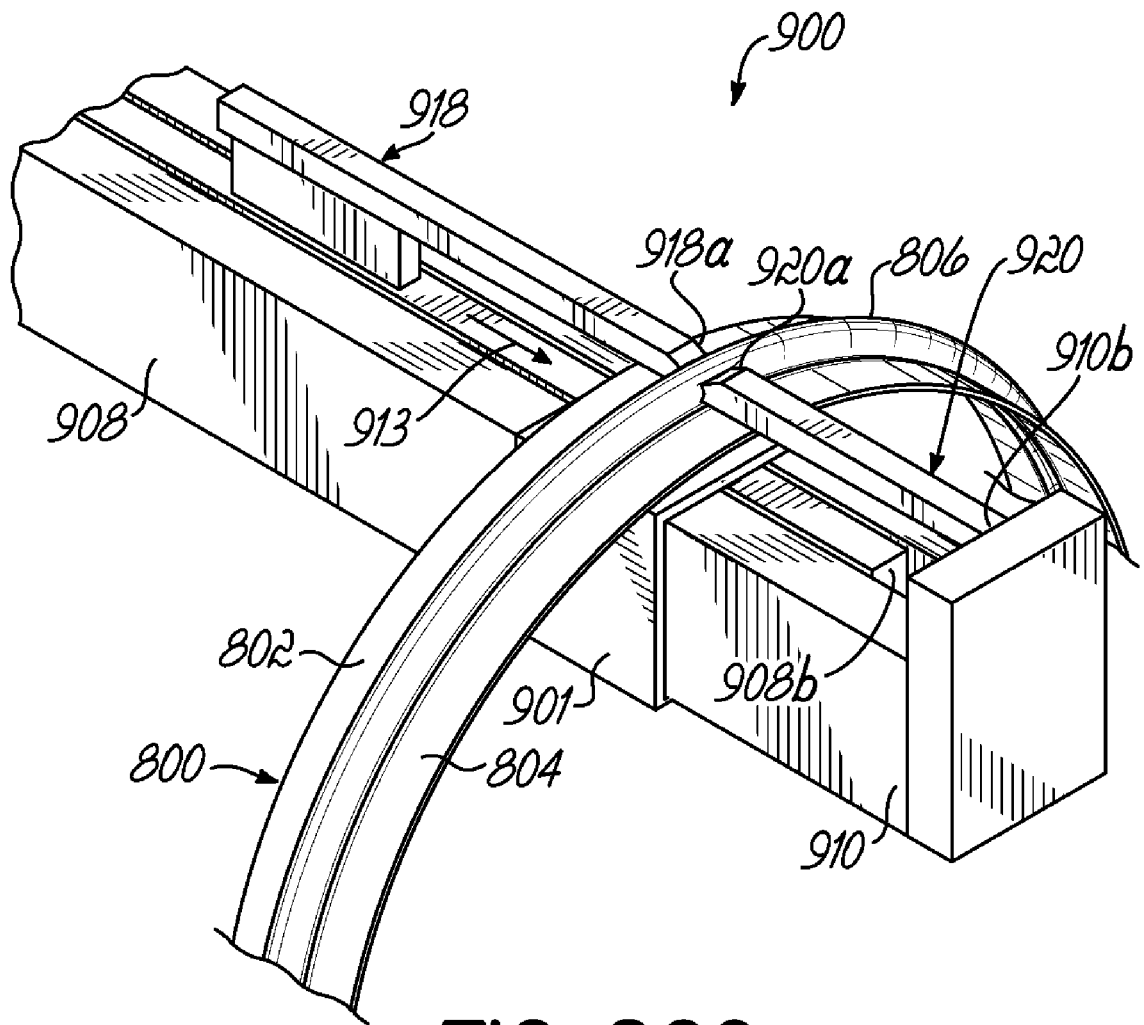

With reference to FIGS. 26A-26C, an exemplary apparatus and method are illustrated for forming the restriction elements 812, 814. To this end, a forming apparatus 900 includes a slidable block 902 supporting a protruding element 902 that is configured to be received within the channel 810 of clamp member 800 so as to restrict lateral movement of the clamp member 800 during the forming operation. First and second engaging portions 908, 910 are positioned, respectively on each side of the protruding element 902, and are movable (arrows 913, 914) relative to one another. In this regard, it is contemplated that both portions 908, 910 may be movable (e.g., slidably movable) toward and away from one another or only one of them may be movable toward and away from the other. In this particular embodiment, the second engaging portion 910 is static (e.g., fixed), while the first engaging portion 908 is movable toward and away from the second engaging portion 910. Each of the portions 908, 910 has a respective die 918, 920 having respective working ends 918a, 920a configured to engage the lateral portions 802, 804 of clamp member 800. In use, force applied by the working ends 918a, 920a against the lateral portions 802, 804, for example by actuation of a motor or manually-driven crank (not shown) driving one or both of the engaging portions 908, 910 of apparatus 900, deforms the lateral portions 802, 804 of clamp member, thus forming the restriction elements 812, 814.

In the embodiment illustrated in FIGS. 26A-26C, movement of the first engaging portion 908 (arrow 913) toward the fixed second engaging portion 910 (and toward the second die 920) first results in engagement of the first die 918 with the lateral portion 802 of clamp member 800. As a result of this engagement, the clamp 800 also moves toward the second engaging portion 910 by virtue of sliding motion of the slidable block 901 supporting the clamp member 800 through the protruding element 902. Movement of the slidable block 901 (arrow 913) stops when both of the dies 918, 920 engage respective ones of the lateral portions 802, 804 of the clamp member 800. Further movement of the first die 918 (arrow 913) results in the deformation of specific portions of the lateral portions 802, 804 of clamp member 800. Movement of the first die 918 is limited (e.g., stopped) when a lead wall 908b of the first engaging portion 908 reaches a wall 910b of the second engaging portion 910.

Each of the restriction elements 812, 814 of this embodiment has a generally quadrilateral cross-sectional profile (e.g., square, rectangular). In this regard, the restriction elements 812, 814 may, for example, be formed with respective dies having working ends 918a, 920a of generally quadrilateral cross-sectional shape.

Referring again to FIGS. 25A and 25B, the gasket member 820 of the illustrated embodiment has a generally half-round cross-sectional shape, although this is merely illustrative rather than intended to be limiting. In this regard, variations of the cross-sectional shape of the gasket member 820 are contemplated, as illustrated, for example, at FIGS. 25C and 25D, in which a gasket member 820a of a similar juncture assembly 830a is illustrated as having a generally rounded (e.g., circular, in this embodiment) cross-sectional shape.

Figure 25C:
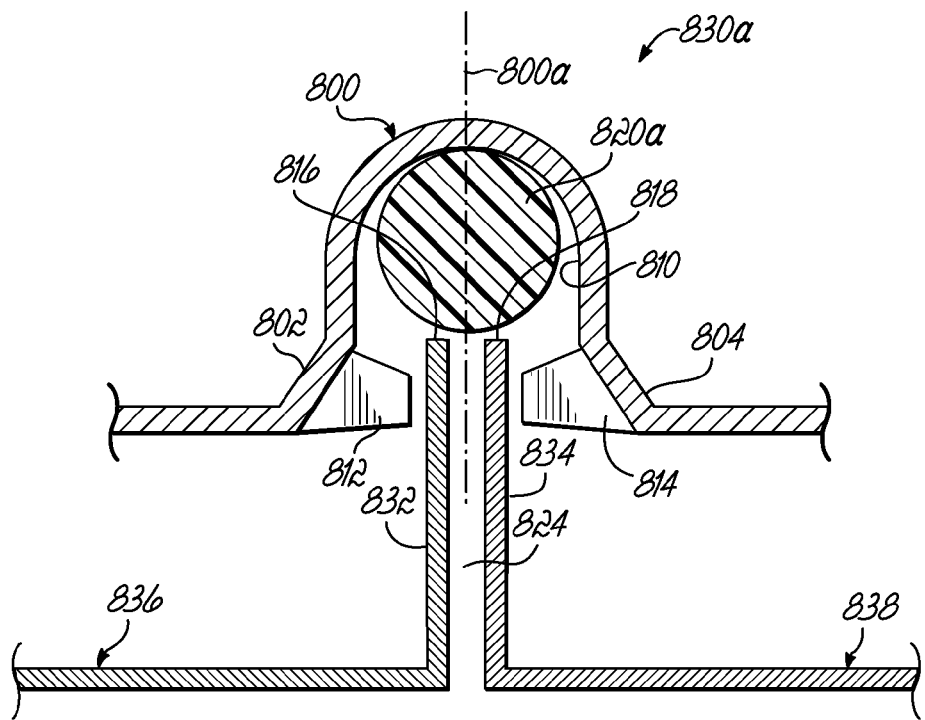
Figure 25D:
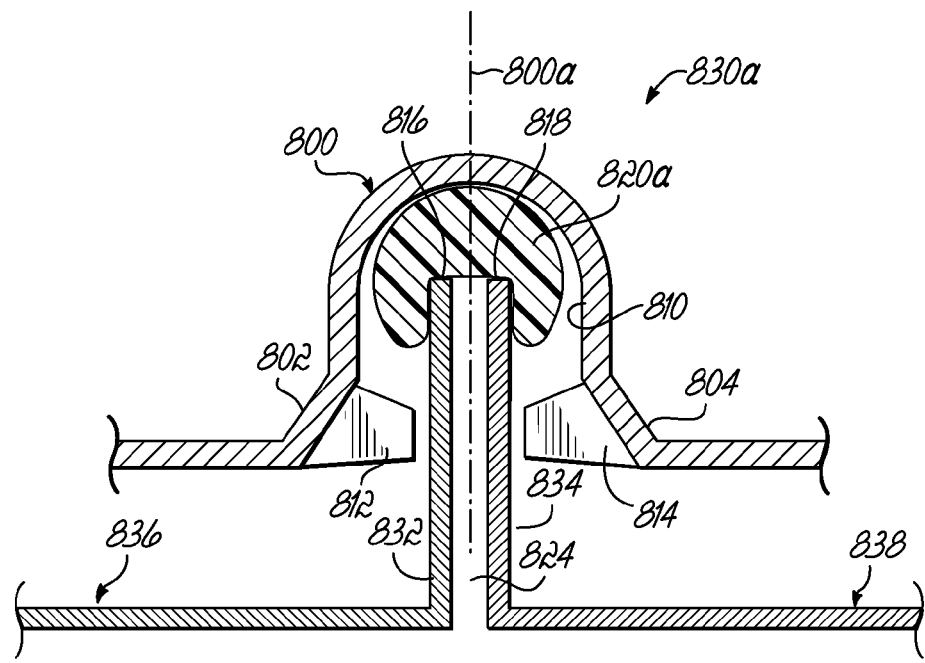
Figure 25E:
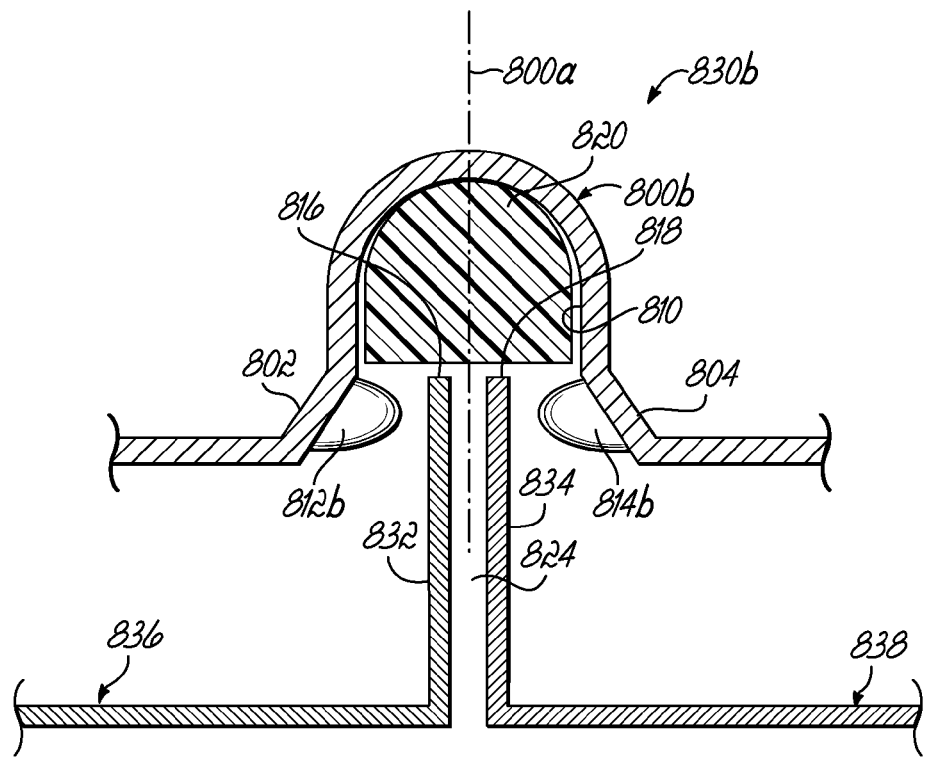
Figure 25F:
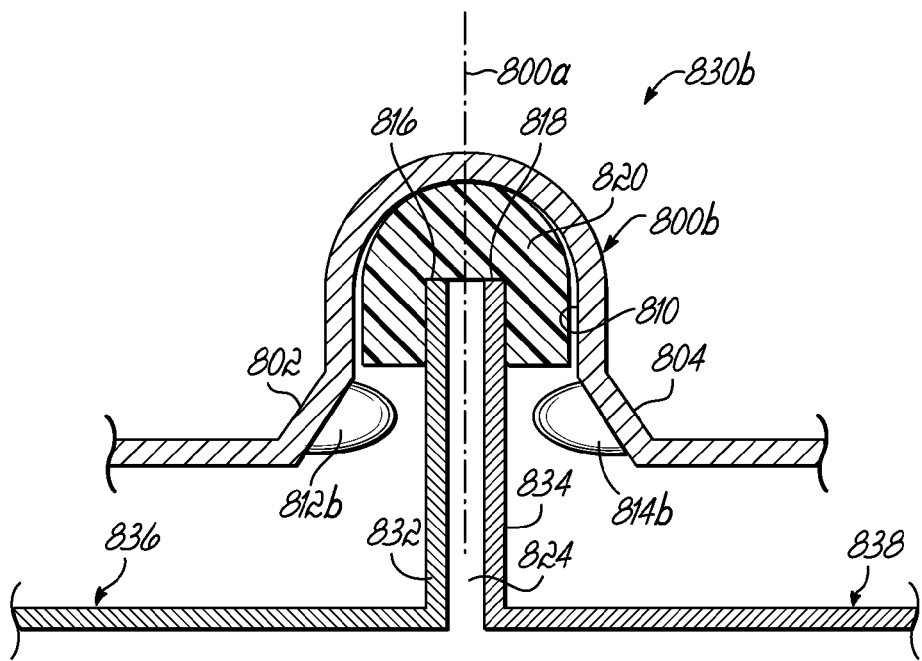

With particular reference to FIGS. 25E and 25F, another embodiments of a juncture assembly 830b is illustrated. In this embodiment, which is similar to the embodiment of FIGS. 25A, 25B, the restriction elements 812b and 814b of the illustrated clamp member 800b have a generally rounded cross-sectional profile, as compared to the generally quadrilateral cross-sectional profile of the restriction elements 812 and 814 of the junction assembly 830 of FIGS. 25A and 25B. The restriction elements 812b, 814b may be formed, for example, by deforming respective portions of the lateral portions 802, 804 of the clamp member 800b, for example, by using dies 918, 920 having respective working ends 918a, 920a (FIGS. 26A-26C) of generally rounded cross-sectional shape to deform such portions so as to define the protruding restriction elements 812b, 814b.

Figure 25G:
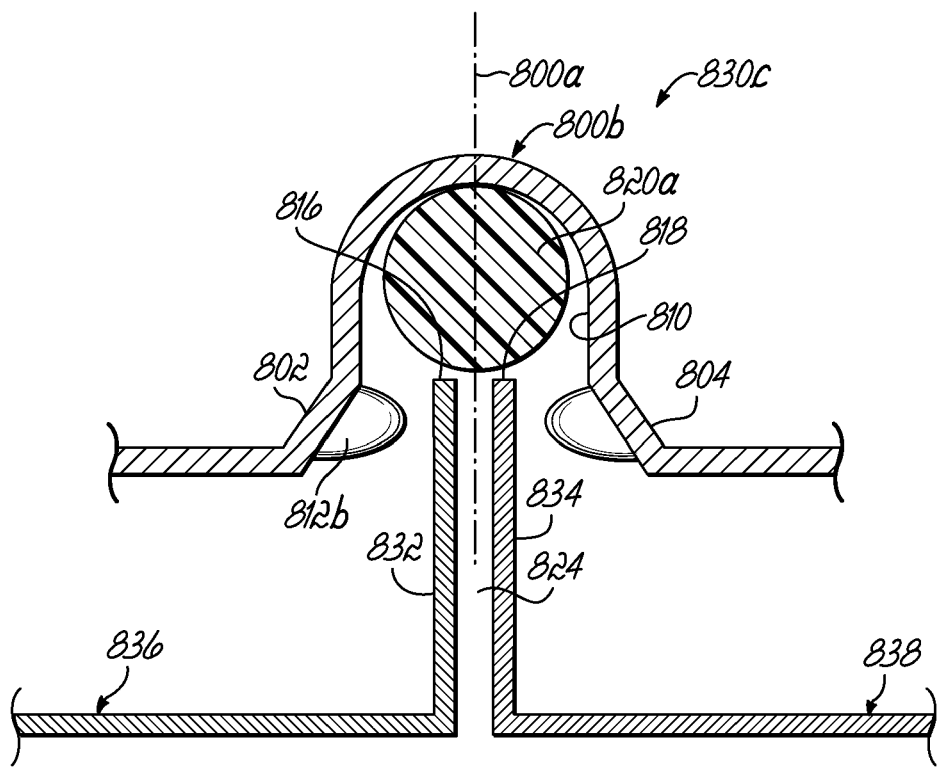
Figure 25H:
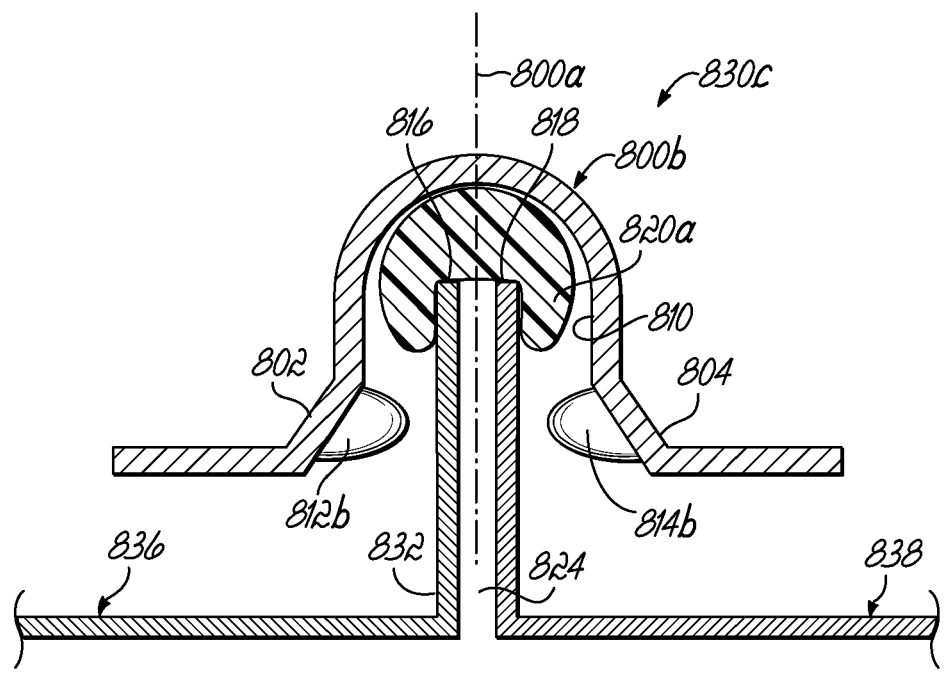
Figure 25I:
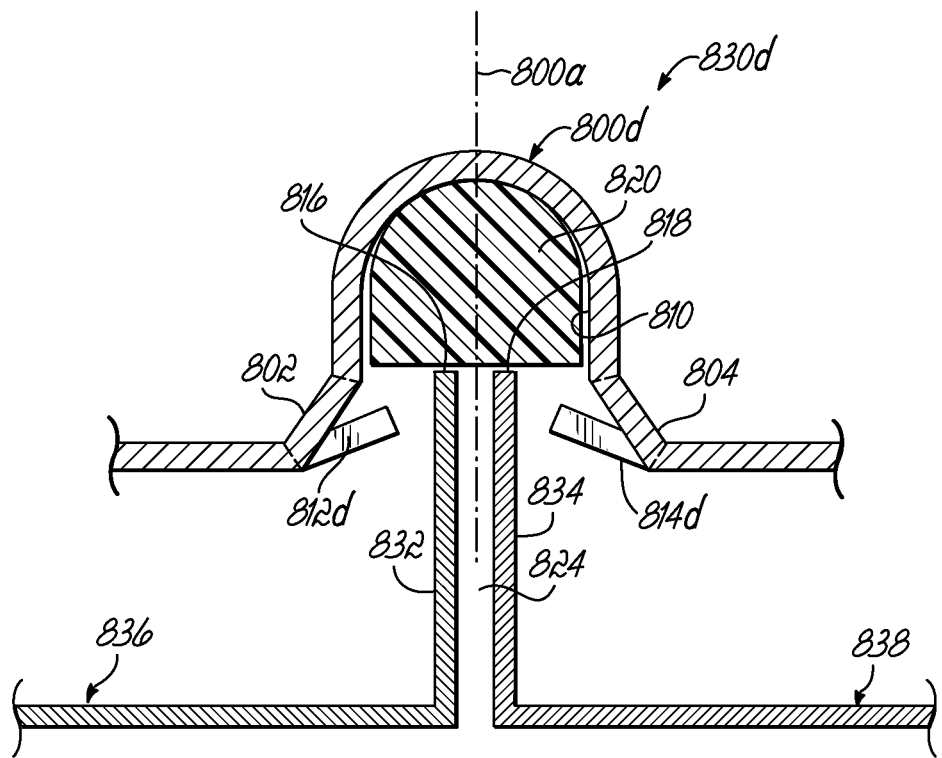
Figure 25J:
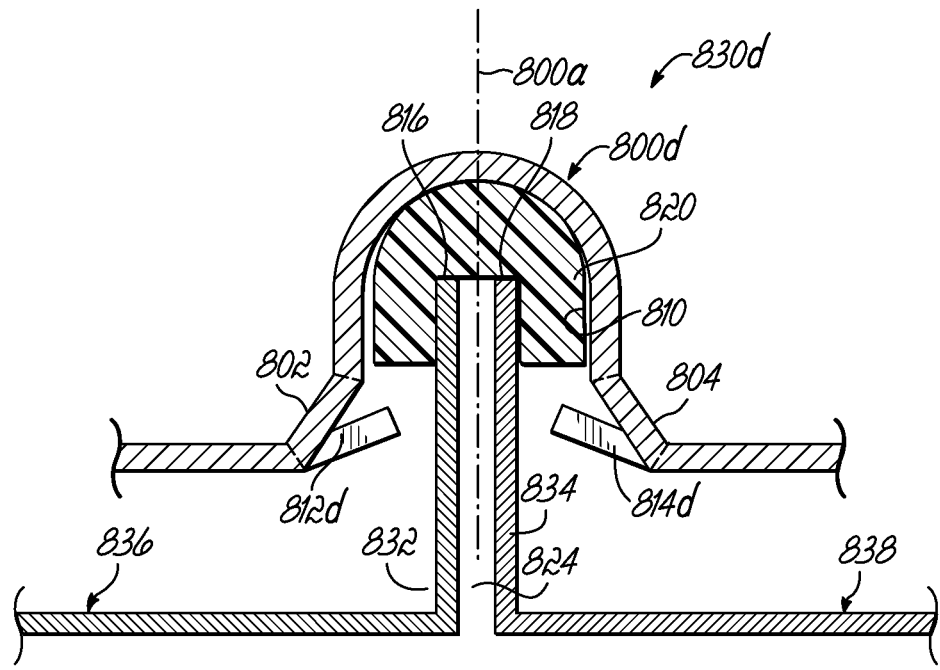

With particular reference to FIGS. 25G and 25H, a juncture assembly 830c is illustrated having a gasket member 820a that is similar in structure and functionality to the gasket member 820a of assembly 830a (FIGS. 25C, 25D). Referring now to FIGS. 25I and 25J, the illustrated juncture assembly 830d of those figures is similar to the juncture assembly 830 of FIGS. 25A and 25B. In this embodiment, the first and second restriction elements 812d and 814d are also formed by deforming respective portions of the lateral portions 802, 804 of the clamp member 800d illustrated in the figures. Notably in this embodiment, each of the restriction elements 812d, 814d is formed by opening a notch (illustrated in dotted lines) in each of the lateral portions 802, 804 and bending a portion of the lateral portions 802, 804 corresponding to the notch, so as to attain the illustrated orientation relative to the channel 810 and relative to the first and second flanges 832, 834.

Figure 25K:
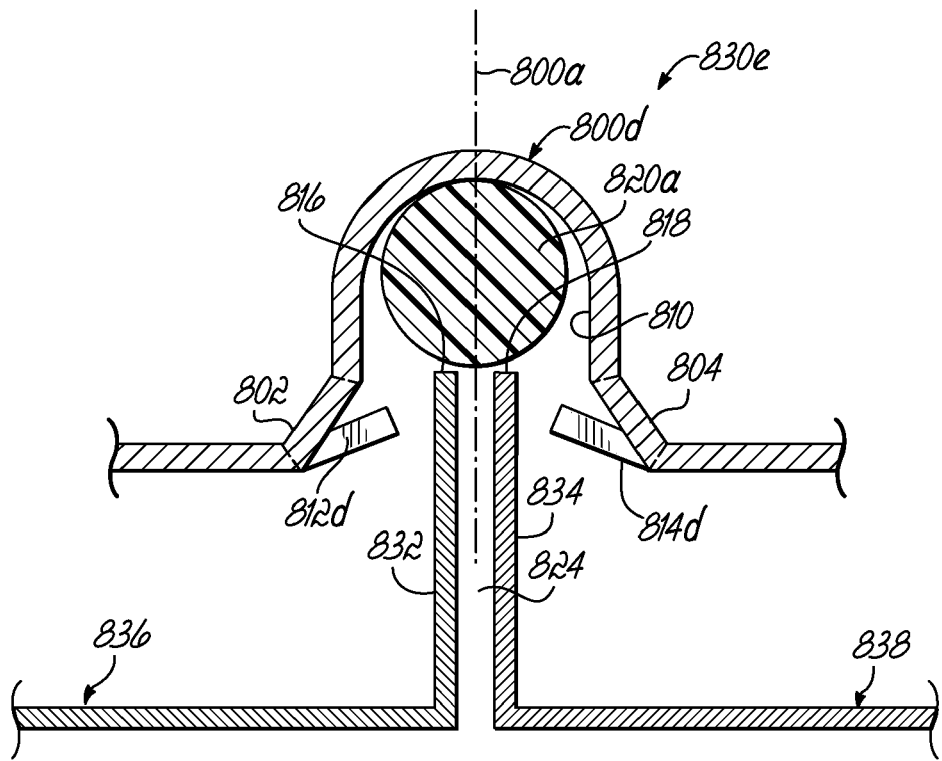
Figure 25L:
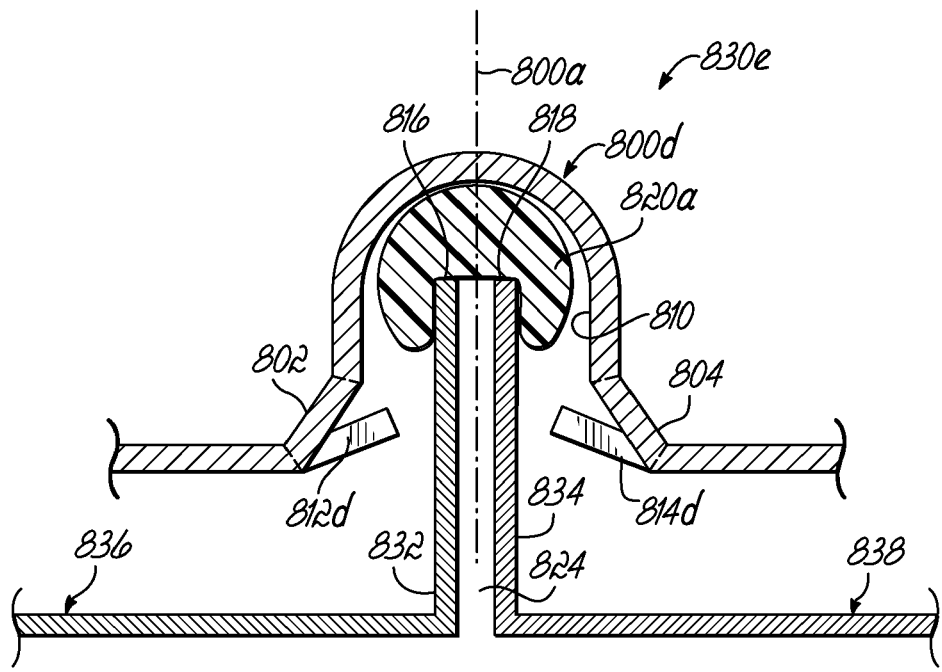
Figure 25M:
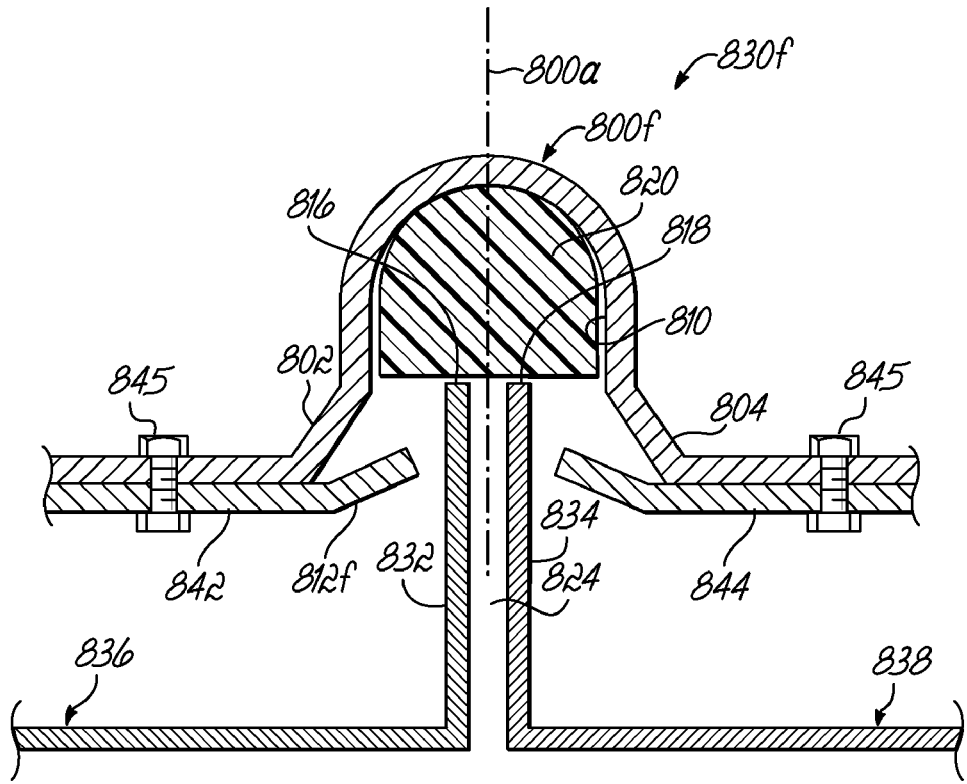
Figure 25N:
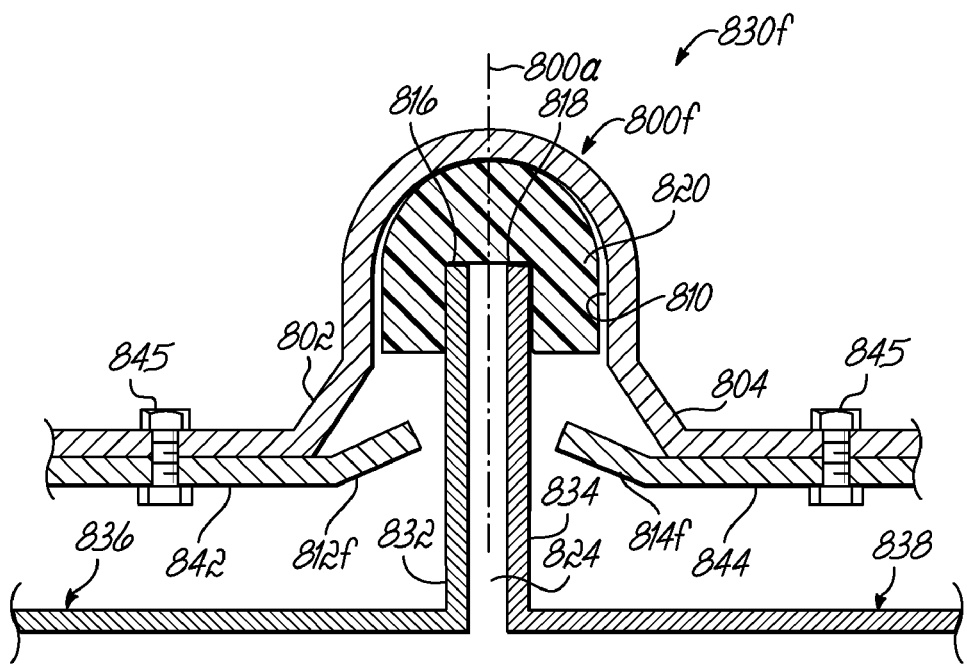

With reference to FIGS. 25K and 25L, a juncture assembly 830e is illustrated. Juncture assembly 830e is similar to juncture assembly 830d (FIGS. 25I, 25J), except that it has a rounded gasket member 820a, similar in that regard, to the gasket member 820a of FIGS. 25C, 25D, 25G, and 25H. In FIGS. 25M and 25N, another exemplary juncture assembly 830f includes a pair of restriction elements 812f and 814f that are defined by a bent portion of respective plates 842, 844, which are in turn coupled to each of the lateral portions 802, 804 of the clamp member 800f illustrated therein. More specifically, each of the plates 842, 844 is coupled respectively to each of the lateral portions 802, 804 by a suitably chosen fastener, such as a bolt 845 or a screw, for example. The bent portions of plates 842, 844 defining the restriction elements 812*f* and 814*f* are respectively oriented so as to extend into the channel 810 and toward the flanges 832, 834.

Figure 25O:
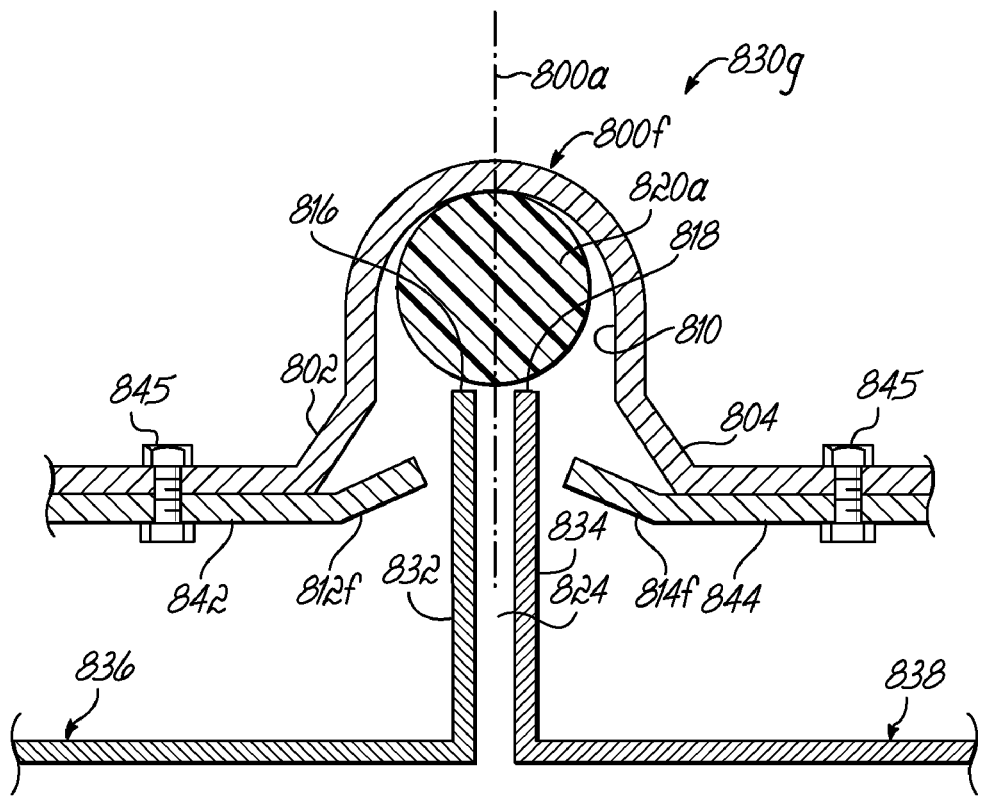
Figure 25P:
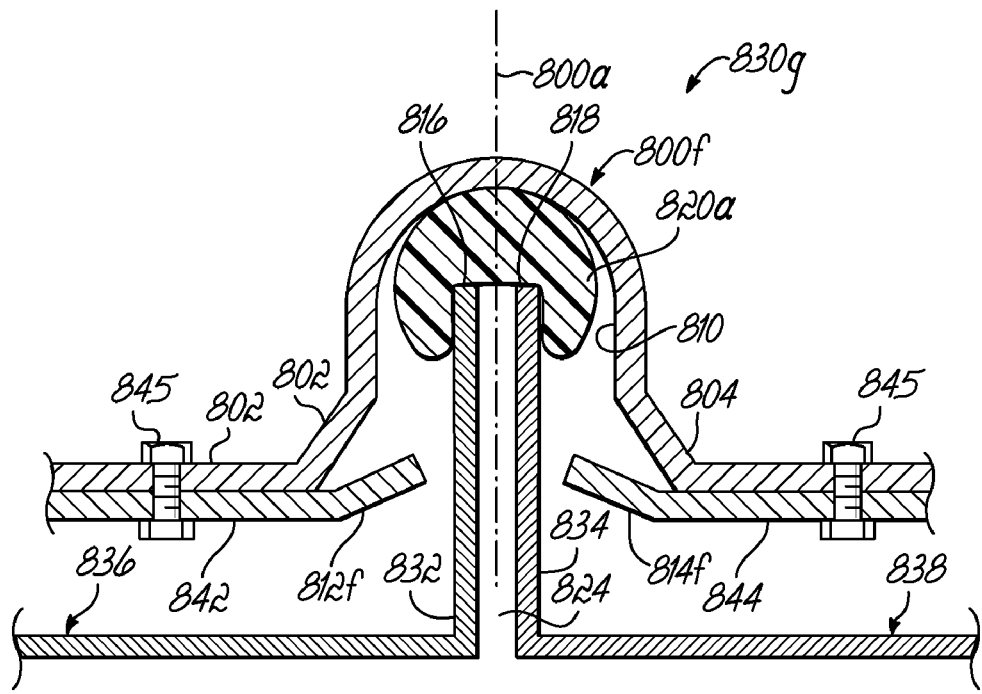

With reference to FIGS. 25O and 25P, a juncture assembly 830*g* is illustrated that is similar to the juncture assembly 830*f* (FIGS. 25M, 25N), except for the shape of the gasket member 820*a* therein. More specifically, the gasket member 820*a* of juncture assembly 830*g* has a shape similar to that of the gasket member 820*a* of FIGS. 25C, 25D, 25G, 25H, 25K, and 25L.

Figure 25Q:
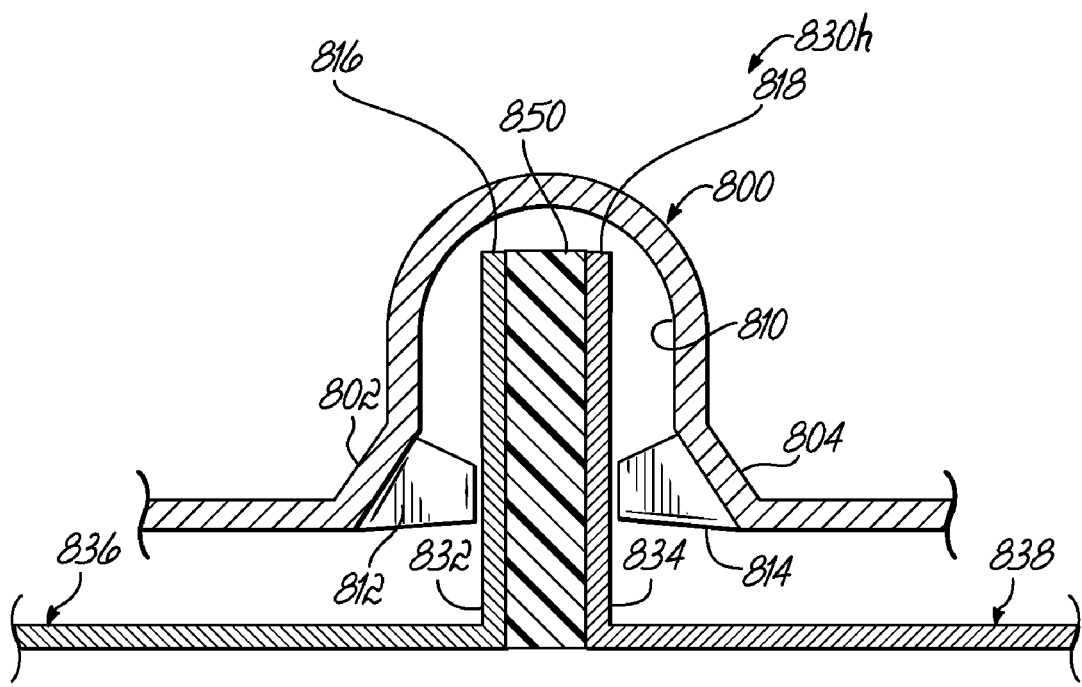

Referring now to FIG. 25Q, the illustrated juncture assembly 830*h* includes a gasket member 850 that is disposed between confronting portions of the flanges 832, 834, as illustrated in the figure. In this regard, the illustrated restriction elements 812, 814 extend into channel 810 and are arranged so as to position (e.g., laterally center) the flanges 832, 834 within channel 810 and are further positioned so as to contact the flanges 832, 834 to thereby secure the gasket member 850 in place (i.e., between the flanges 832 and 834). More specifically, for example, pressure applied by the restriction elements 812, 814 against the flanges 832, 834 might deform the gasket member 850 so as to define a tight fit between the gasket member 850 and the flanges 832, 834, thereby providing protection against the flow of fluid between the interior of the ducts (e.g., tubes) 836, 838 of which the flanges 832, 834 form part, and the surrounding environment.

Figure 25R:
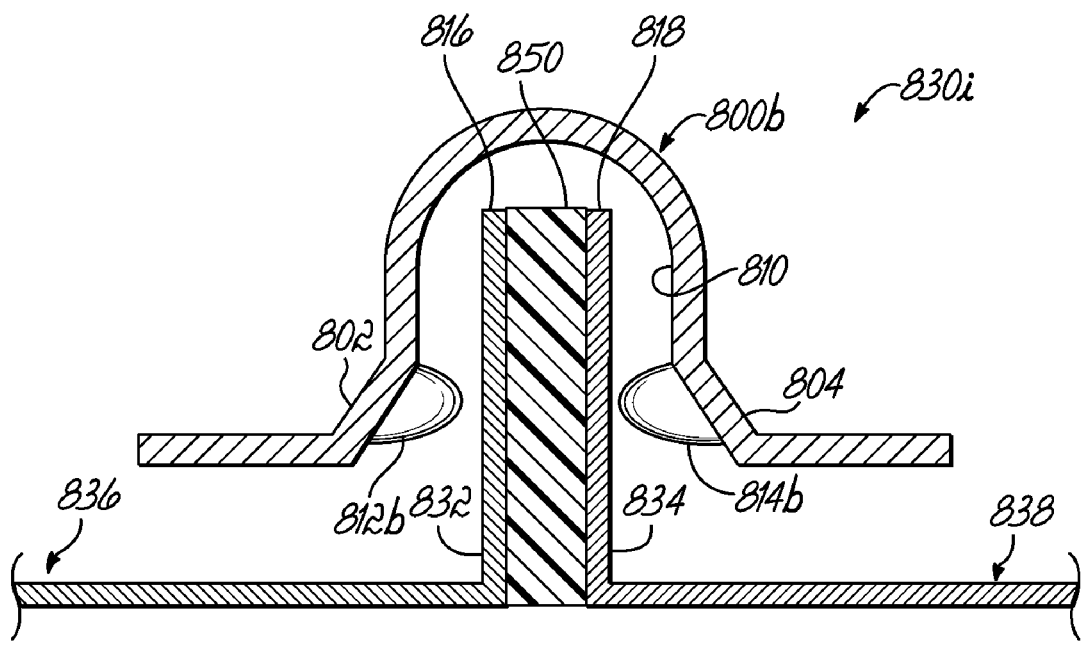
Figure 25S:
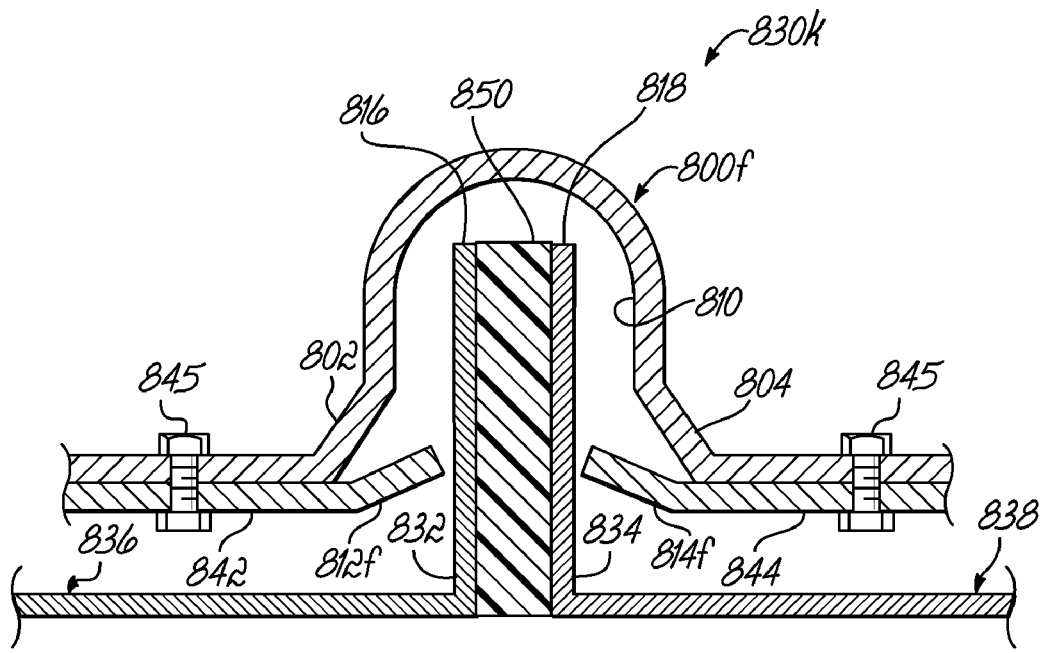
Figure 25T:
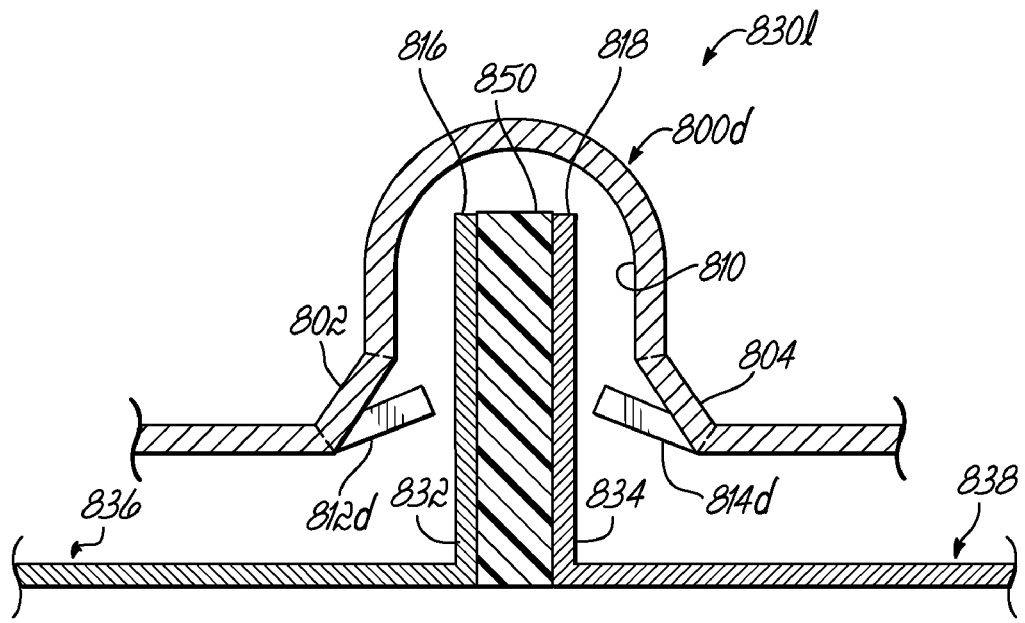

With reference to FIG. 25R, a juncture assembly 830*i* is similar to the juncture assembly 830*h* of FIG. 25Q, except that the restriction elements 812*b*, 814*b* thereof are similar to the restriction elements 812*b* and 814*b* of FIGS. 25E-25H. In FIG. 25S, the juncture assembly 830*k* illustrated therein is similar to the juncture assemblies 830*h*, 830*i* (FIGS. 25Q, 25R, respectively), except that the restriction elements 812*f*, 814*f* of this embodiment are similar to the restriction elements 812*f*, 814*f* of the embodiments of FIGS. 25M-25P. With reference to FIG. 25T, a juncture assembly 830*l* is similar to the embodiments illustrated in FIGS. 25Q, 25R, and 25S, except that the restriction elements 812*d*, 814*d* thereof are similar to the restriction elements 812*d* and 814*d* of the embodiments illustrated in FIGS. 25I-25L.

It should be readily appreciated that although certain embodiments and configurations of the invention are shown and described herein, the invention is not so limited. Moreover, any of the features and/or functions described above for any of the above embodiments may be combined with any other embodiments.

From the above disclosure of the general principles of the present invention and the preceding detailed description of exemplary embodiments, those skilled in the art will readily comprehend the various modifications to which this invention is susceptible. For example, while a spiral tube is depicted herein for the illustrative purposes, other types of tubes are contemplated. Therefore, this invention is intended to be limited only by the scope of the following claims and equivalents thereof.

What is claimed is:

1. A clamp assembly for joining first and second confronting flanges located at the longitudinal ends of respective first and second tubes, the flanges defining a gap therebetween, the assembly comprising:
a gasket member contacting the first and second flanges and configured to prevent flow of fluids through the gap; and
an annular clamp member including a first lateral portion and a second lateral portion confronting each other and defining a channel therebetween for receiving the first and second flanges, said first lateral portion including a first plurality of circumferentially spaced restriction elements extending into said channel and said second lateral portion including a second plurality of circumferentially spaced restriction elements extending into said channel for positioning the first and second flanges within said channel.

2. The clamp assembly of claim 1, wherein said first plurality of restriction elements and said second plurality of restriction elements are disposed on opposite sides of said channel across a cross-sectional axis of said clamp member.

3. The clamp assembly of claim 2, wherein said first plurality of restriction elements and said second plurality of restriction elements are disposed in confronting relationship with one another across the cross-sectional axis of said clamp member.

4. The clamp assembly of claim 2, wherein said clamp member extends along a generally close-ended path.

5. The clamp assembly of claim 4, wherein the close-ended path is generally circular.

6. The clamp assembly of claim 1, wherein said gasket member is disposed in the gap between the first and second flanges, said first plurality of restriction elements and said second plurality of restriction elements contacting the first and second flanges to retain said gasket member in place.

7. The clamp assembly of claim 1, wherein said gasket member is supported by respective first and second radial ends of the first and second flanges and is deformable about said first and second radial ends of the first and second flanges, said first plurality of restriction elements and said second plurality of restriction elements being positioned to prevent movement of said gasket member relative to said channel.

8. The clamp assembly of claim 7, wherein said gasket member has one of a generally round or a generally half-round cross-sectional profile when said gasket member is in its undeformed condition.

9. The clamp assembly of claim 1, wherein at least one of said first plurality of restriction elements or said second plurality of restriction elements includes a protruding deformed portion of said clamp member.

10. The clamp assembly of claim 9, wherein said protruding deformed portion has a generally rounded cross-sectional profile.

11. The clamp assembly of claim 9, wherein said protruding deformed portion has a generally quadrilateral cross-sectional profile.

12. The clamp assembly of claim 9, wherein at least one of said first plurality of restriction elements or said second plurality of restriction elements protrudes from a notch formed in said clamp member.

13. The clamp assembly of claim 1, wherein at least one of said first plurality of restriction elements or said second plurality of restriction elements includes a plate coupled to said clamp member and having a bent portion extending into said channel.

14. An annular clamp member for securing respective longitudinal ends of first and second tubes to one another, the longitudinal ends of the first and second tubes having respective first and second flanges, the clamp member comprising:
a first lateral portion and a second lateral portion confronting each other and defining a channel therebetween for receiving the first and second flanges therein; and
a first plurality of circumferentially spaced restriction elements supported by said first lateral portion and extending into said channel and a second plurality of circumferentially spaced restriction elements supported by said second lateral portion and extending into said channel, said first plurality of restriction elements and said second plurality of restriction elements being configured to position the first and second flanges within said channel.

15. The clamp member of claim 14, further comprising:
a gasket member located in said channel, said first plurality of restriction elements and said second plurality of restriction elements being positioned to prevent movement of said gasket member relative to said channel.

16. The clamp member of claim 14, wherein said first plurality of restriction elements and said second plurality of restriction elements are disposed on opposite sides of said channel across a cross-sectional axis of said clamp member.

17. The clamp member of claim 16, wherein said first plurality of restriction elements and said second plurality of restriction elements are disposed in confronting relationship with one another across the cross-sectional axis of said clamp member.

18. The clamp member of claim 16, wherein said clamp member extends along a generally close-ended path.

19. The clamp member of claim 18, wherein the close-ended path is generally circular.

20. The clamp member of claim 14, wherein said first plurality of restriction elements and said second plurality of restriction elements are positioned to contact the first and second flanges to thereby retain a gasket member in a gap defined between the first and second flanges.

21. The clamp member of claim 14, wherein at least one of said first plurality of restriction elements or said second plurality of restriction elements includes a protruding deformed portion of said clamp member, said protruding portion having one of a generally rounded cross-sectional profile or a generally quadrilateral cross-sectional profile.

22. The clamp member of claim 21, wherein at least one of said first plurality of restriction elements or said second plurality of restriction elements protrudes from a notch formed in said clamp member.

23. The clamp member of claim 14, wherein at least one of said first plurality of restriction elements or said second plurality of restriction elements includes a plate coupled to said clamp member and having a bent portion extending into said channel.

24. The clamp member of claim 14, wherein said first plurality of restriction elements and said second plurality of restriction elements are positioned to center the first and second flanges within said channel.

* * * * *